United States Patent
Liang et al.

(10) Patent No.: US 11,646,165 B2
(45) Date of Patent: May 9, 2023

(54) USE OF WASTED AND RECYCLED CARBON MATERIALS IN THE MANUFACTURE OF ELECTRODES

(71) Applicant: The Texas A & M University System, College Station, TX (US)

(72) Inventors: Hong Liang, College Station, TX (US); Swarn Jha, College Station, TX (US); Siddhi Gajanan Mehta, Bryan, TX (US)

(73) Assignee: The Texas A&M University System, College Station, TX (US)

(*) Notice: Subject to any disclaimer, the term of this patent is extended or adjusted under 35 U.S.C. 154(b) by 0 days.

(21) Appl. No.: 17/513,866

(22) Filed: Oct. 28, 2021

(65) Prior Publication Data
US 2022/0139640 A1 May 5, 2022

Related U.S. Application Data

(60) Provisional application No. 63/108,264, filed on Oct. 30, 2020.

(51) Int. Cl.
*H01G 11/46* (2013.01)
*H01G 11/56* (2013.01)
(Continued)

(52) U.S. Cl.
CPC ............ *H01G 11/46* (2013.01); *H01G 11/30* (2013.01); *H01G 11/34* (2013.01); *H01G 11/56* (2013.01); *H01G 11/86* (2013.01)

(58) Field of Classification Search
CPC ..................................................... H01G 11/52
See application file for complete search history.

(56) References Cited

U.S. PATENT DOCUMENTS

2010/0150814 A1* 6/2010 Gadkaree .............. C01B 32/318
    502/101
2021/0247692 A1* 8/2021 Zhang ..................... G03F 7/265

FOREIGN PATENT DOCUMENTS

CN      103680968 A  *  3/2014
CN      107814378 A  *  3/2018  .............. C09D 1/00

OTHER PUBLICATIONS

Farid et al., Fabrication and characterization of MnO2 based composite sheets for development of flexible energy storage electrodes, 2018, Ceramics International, 44, 11397-11401 (Year: 2018).*

(Continued)

*Primary Examiner* — Eric W Thomas
(74) *Attorney, Agent, or Firm* — Winstead PC

(57) ABSTRACT

In an embodiment, the present disclosure pertains to a method of creating a supercapacitor. The method includes forming an anode and a cathode, each composed of a substrate having at least one of a lignin, a lignin-based composite, activated carbon, a plant extract, a cellulose by-product, biofuel waste, one or more metals, a metal oxide, a monometallic tungstate, or a bimetallic tungstate, and sandwiching an electrolyte coated separator between the anode and the cathode. In an addition embodiment, the present disclosure pertains to an electrode composed of a particle-decorated lignin. In some embodiments, the particle-decorated lignin includes particles that can include, without limitation, $MnO_2$, $NiWO_4$, $MnO_2$, $NiCoWO_4$, $CoWO_4$, and combinations thereof. In a further embodiment, the present disclosure pertains to a supercapacitor made via the methods of the present disclosure.

14 Claims, 32 Drawing Sheets

(51) Int. Cl.
*H01G 11/30* (2013.01)
*H01G 11/86* (2013.01)
*H01G 11/34* (2013.01)

(56) References Cited

OTHER PUBLICATIONS

Jha et al., Design and Synthesis of Lignin-Based Flexible Supercapacitors, ACS Sustainable Chem. Eng. 2020, 8, 498-511 (Year: 2020).*

Jha et al., Bimetallic tungstate nanoparticle-decorated-lignin electrodes for flexible supercapacitors, 2020, Mater. Adv., 2020, 1, 2124-2135 (Year: 2020).*

Sengodan et al., A rational design of MnO2/CuO/r-GO hybrid and biomass-derived activated carbon for asymmetric supercapacitors, Journal of Energy Storage 50 (2022) 104625 (Year: 2022).*

Yu et al., Manganese dioxide nanorod arrays on carbon fabric for flexible solid-state supercapacitors, 2013, Journal of Power Sources 239, 2013, 64-71 (Year: 2013).*

Jha et al., Design and synthesis of high performance flexible and green supercapacitors made of manganese-dioxide decorated alkali lignin, 2020, Energy Storage, 2020; 2:e184, 1-14 (Year: 2020).*

* cited by examiner

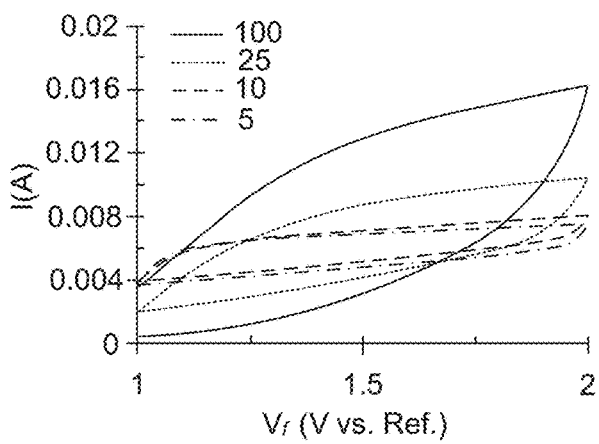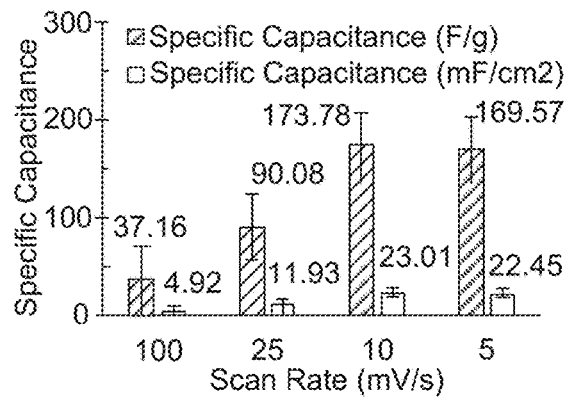
FIG.7A  FIG.7B
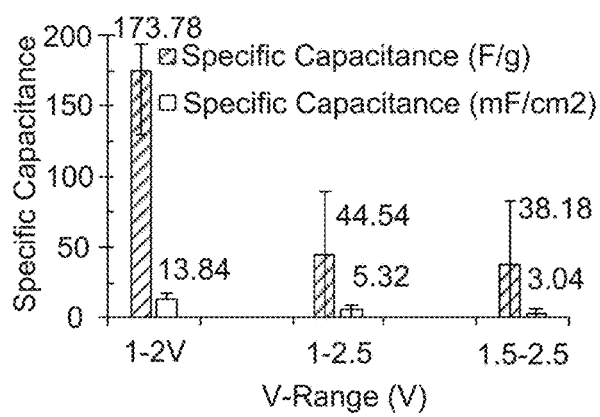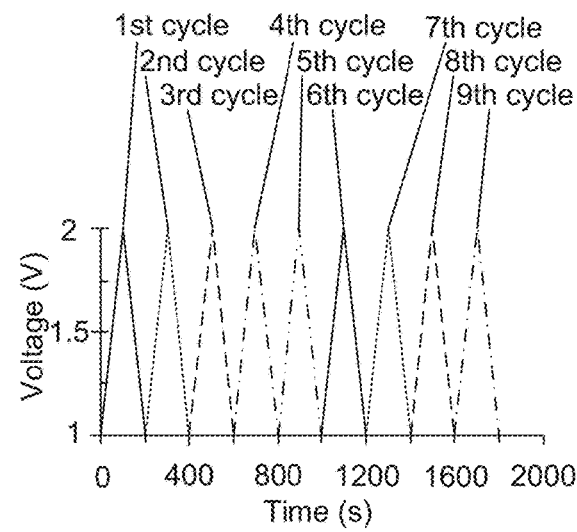
FIG.7C  FIG.7D
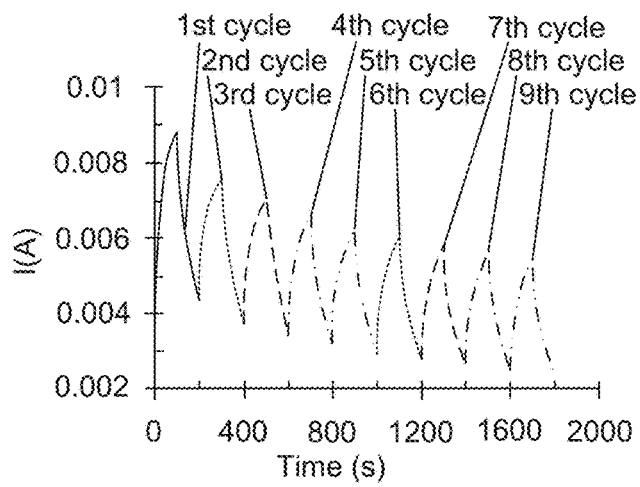
FIG.7E

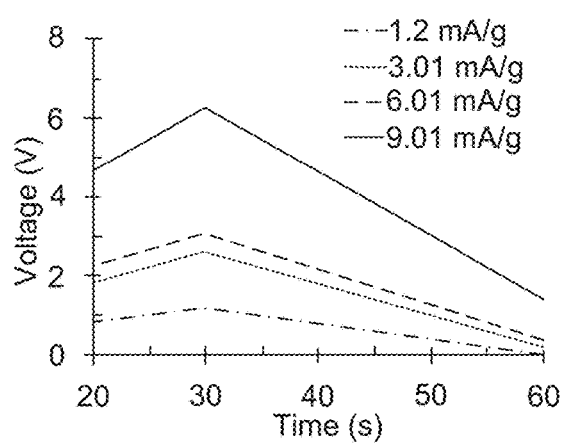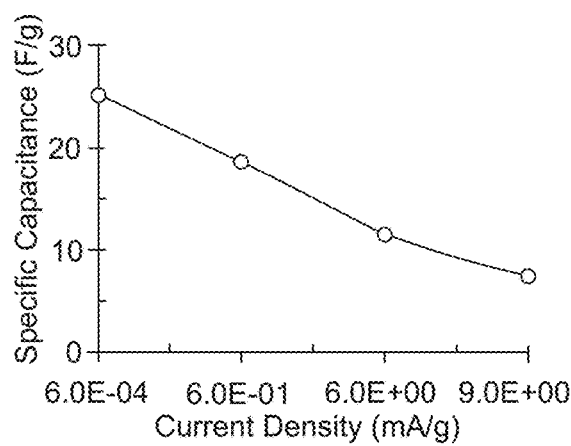
FIG.10A  FIG.10B
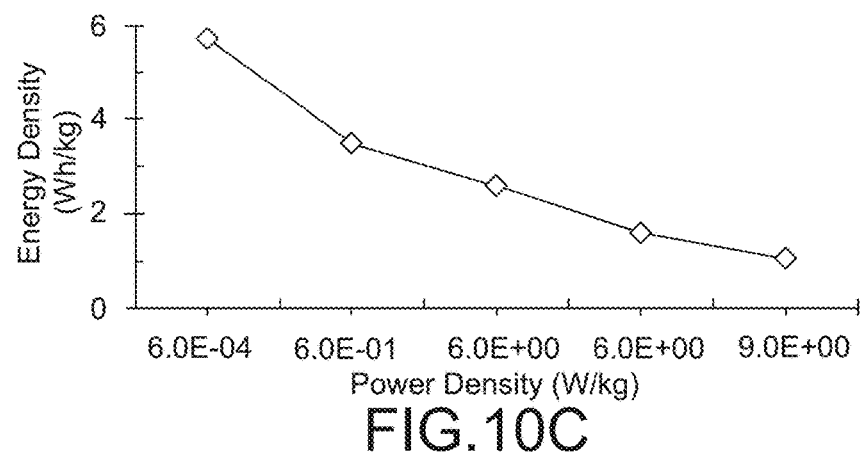
FIG.10C
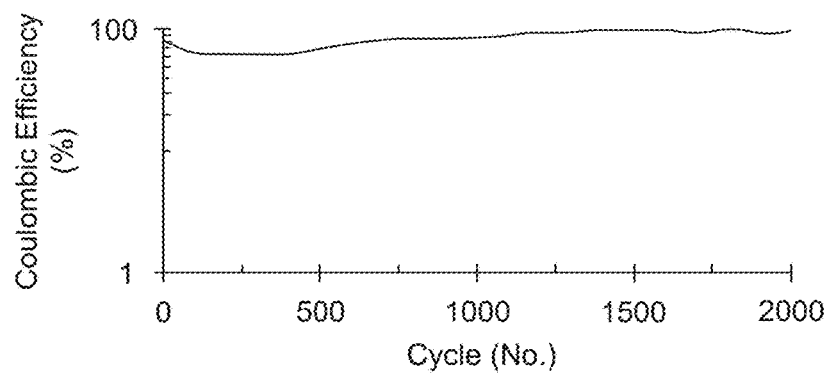
FIG.10D

USE OF WASTED AND RECYCLED CARBON MATERIALS IN THE MANUFACTURE OF ELECTRODES

CROSS-REFERENCE TO RELATED APPLICATIONS

This patent application claims priority from, and incorporates by reference the entire disclosure of, U.S. Provisional Application 63/108,264 filed on Oct. 30, 2020.

TECHNICAL FIELD

The present disclosure relates generally to electrodes and more particularly, but not by way of limitation, to use of wasted and recycled carbon materials in the manufacture of electrodes.

BACKGROUND

This section provides background information to facilitate a better understanding of the various aspects of the disclosure. It should be understood that the statements in this section of this document are to be read in this light, and not as admissions of prior art.

Energy storage devices include batteries and capacitors. Batteries can store large amounts of charge per unit volume but do not typically generate large current loads. Capacitors, on the other hand, are much more efficient at generating a large quantity of electric current within a short duration. Such a burst of electricity helps capacitors to quickly charge devices, unlike batteries, which discharge over a much longer period of time. Both batteries and capacitors store charge on electrodes, which are often constructed from metal plates. Supercapacitors, unlike basic capacitors, can be made in different sizes, shapes, and designs depending on an intended application. Furthermore, supercapacitor electrodes may be built with different materials. Often times, materials utilized in the production of capacitors and supercapacitors are toxic or environmentally harmful.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure pertains to a supercapacitor including an anode having a first substrate with at least one of a lignin (lig), a lignin-based composite, activated carbon (AC), a plant extract, a cellulose by-product, biofuel waste, one or more metals, a metal oxide, a monometallic tungstate, or a bimetallic tungstate, a cathode having a second substrate with at least one of a lignin (lig), a lignin-based composite, AC, one or more metals, a metal oxide, a monometallic tungstate, or a bimetallic tungstate, and an electrolyte coated separator sandwiched between the anode and the cathode.

In a further embodiment, the present disclosure pertains to an electrode composed of a particle-decorated lignin. In some embodiments, the particle-decorated lignin includes particles that can include, without limitation, $MnO_2$, $NiWO_4$, $NiCoWO_4$, $CoWO_4$, and combinations thereof.

In an additional embodiment, the present disclosure pertains to a method of creating a supercapacitor. In some embodiments, the method includes forming an anode having a first substrate with at least one of a lignin (lig), a lignin-based composite, activated carbon (AC), a plant extract, a cellulose by-product, biofuel waste, one or more metals, a metal oxide, a monometallic tungstate, or a bimetallic tungstate, forming a cathode having a second substrate with at least one of a lignin (lig), a lignin-based composite, AC, one or more metals, a metal oxide, a monometallic tungstate, or a bimetallic tungstate, and sandwiching an electrolyte coated separator between the anode and the cathode.

BRIEF DESCRIPTION OF THE DRAWINGS

A more complete understanding of the subject matter of the present disclosure may be obtained by reference to the following Detailed Description when taken in conjunction with the accompanying Drawings wherein:

(FIG. 4A) lignin and (FIG. 4B) AC.

FIGS. 7A-7E illustrate plots showing: a CV curve of the AC/lig-$MnO_2$ supercapacitor at various scan rates: 5, 10, 25, and 100 mV $s^{-1}$ (FIG. 7A); comparative histogram of specific capacitance versus scan rate (FIG. 7B); comparative histogram of specific capacitance versus voltage range at 10 mV $s^{-1}$ (FIG. 7C); plots of voltage vs. time (FIG. 7D); and current vs. time (FIG. 7E) from the CV experiment for the sample Orig 2x:x:y.

(FIG. 8A) variation of specific capacitance with cycles and (FIG. 8B) retention; and (FIG. 8C) specific capacitance versus cycles for the sample Orig 2x:x:y for 2000 cycles for voltage range 1-2 V at 6.01 mA $g^{-1}$.

FIGS. 10A-10D illustrate comparative plots of: (FIG. 10A) voltage vs. time at different current densities and (FIG. 10B) specific capacitance versus current density in the cyclic charge-discharge experiment at a charge current of 2 mA.

Also illustrated are a Ragone plot (FIG. 10C) and (FIG. 10D) Coulombic efficiency plot of the supercapacitor (Orig 2x:x:y sample).

Figure 11:
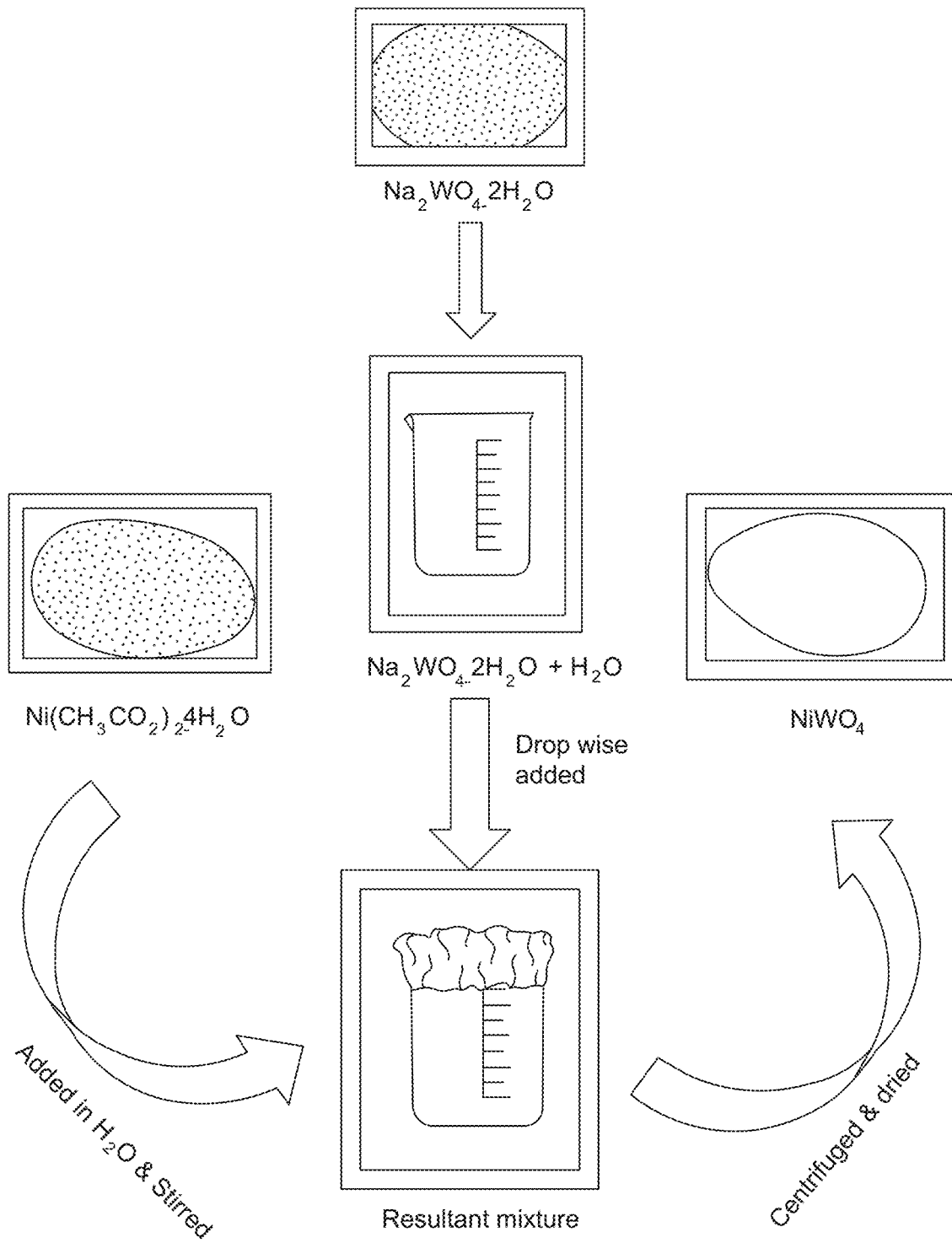

FIG. 11 illustrates a schematic representation of $NiWO_4$ synthetic procedure.

Figure 12A:
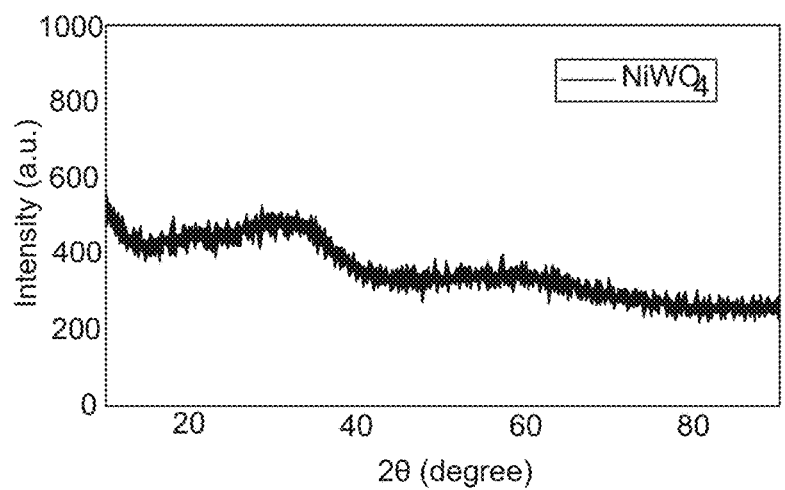
Figure 12B:
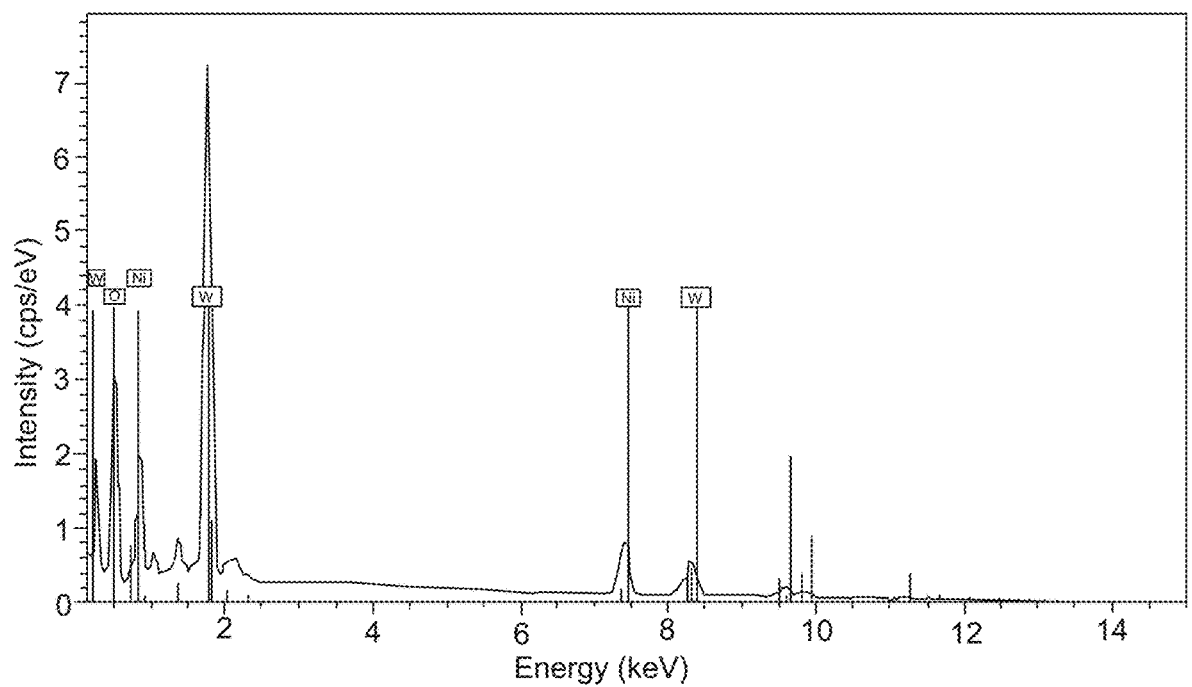

FIGS. 12A-12B illustrate XRD analysis of $NiWO_4$ nanoparticles (FIG. 12A) and the electron dispersive X-ray (EDS) spectrum of the $NiWO_4$ nanomaterials (FIG. 12B).

Figure 13A:
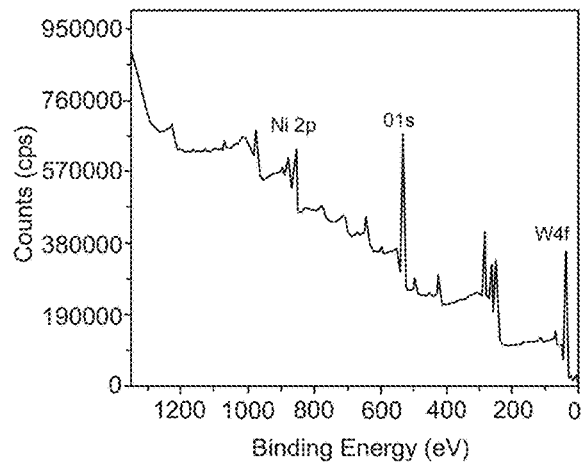
Figure 13B:
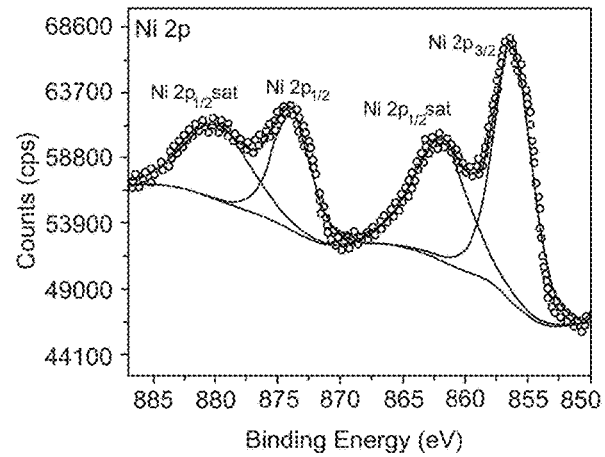
Figure 13C:
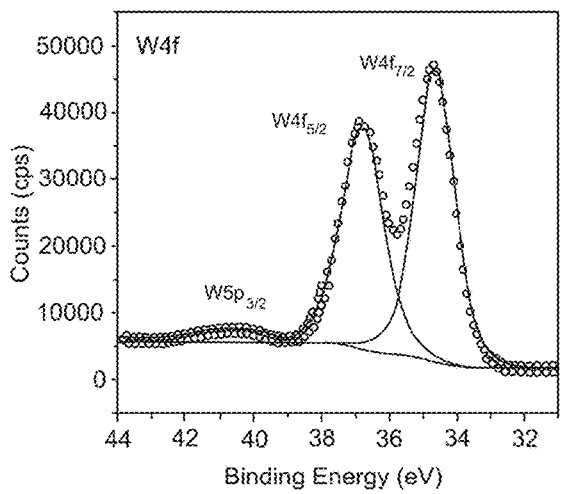
Figure 13D:
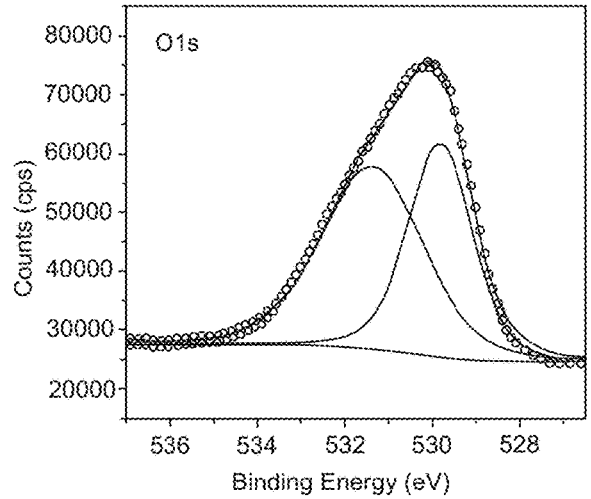

FIGS. 13A-13D illustrate the high-resolution XPS spectrum of the $NiWO_4$ nanomaterials; FIG. 13A is the survey spectrum of the $NiWO_4$ nanomaterials and FIG. 13B-FIG. 13D is the high-resolution spectrum of Ni 2p, W 4f, and 0 1s, respectively.

Figure 14:
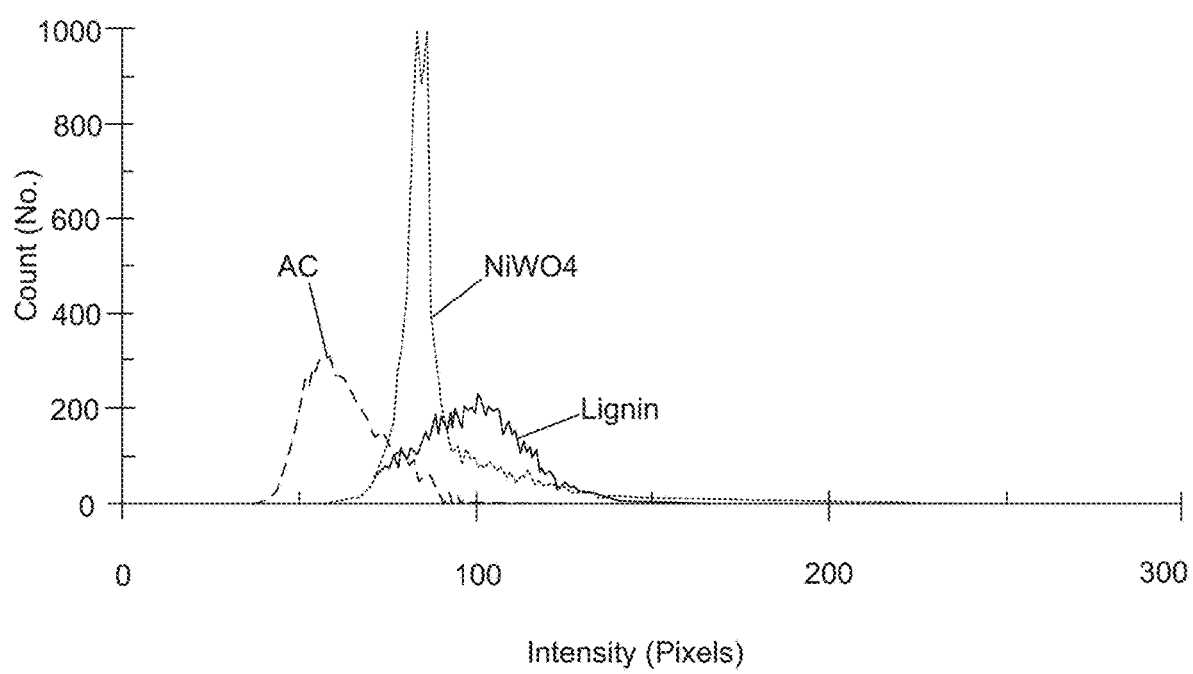

FIG. 14 illustrates comparative histogram plots of the number of particles (Y-axis) vs. intensity (pixels) for the AC and lignin-based supercapacitor electrodes, and the $NiWO_4$ nanoparticles based on high-resolution synchrotron X-ray tomographic images.

Figure 15A:
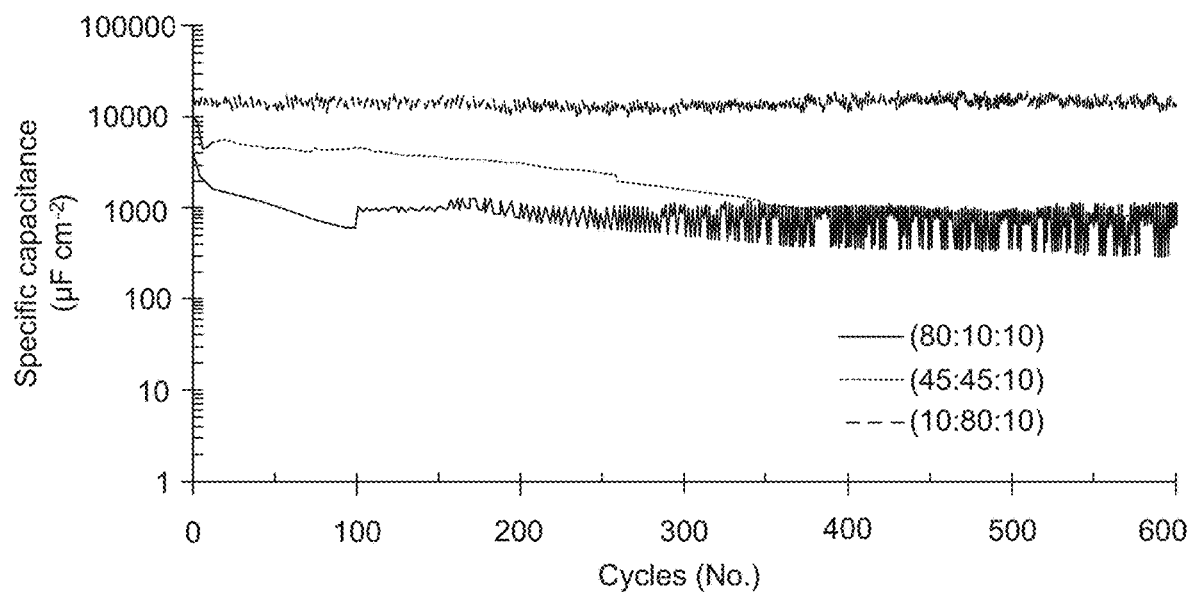
Figure 15B:
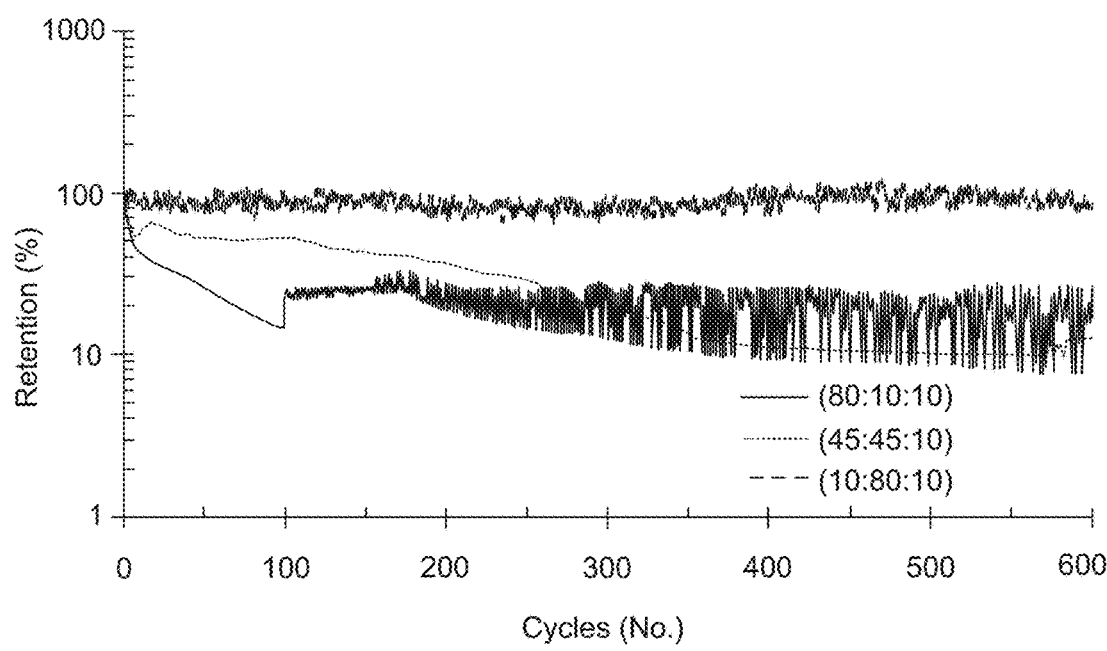

FIGS. 15A-15B illustrate plots for the variation of specific capacitance with cycles for the cycle charge-discharge (CCD) experiment at a current density of 0.13 A $g^{-1}$ for 600 cycles (FIG. 15A), and the retention comparison for the samples with different lig:$NiWO_4$:polyvinylidene difluoride (PVDF) ratios (FIG. 15B).

Figure 16A:
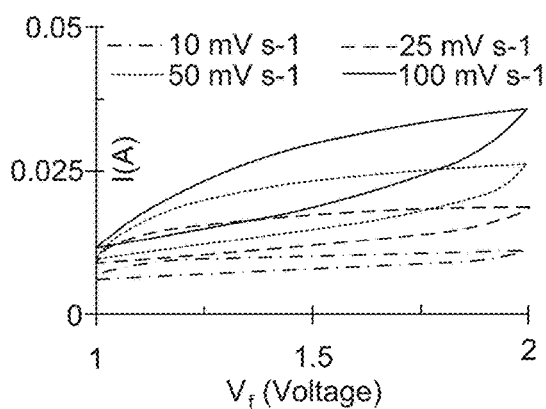
Figure 16B:
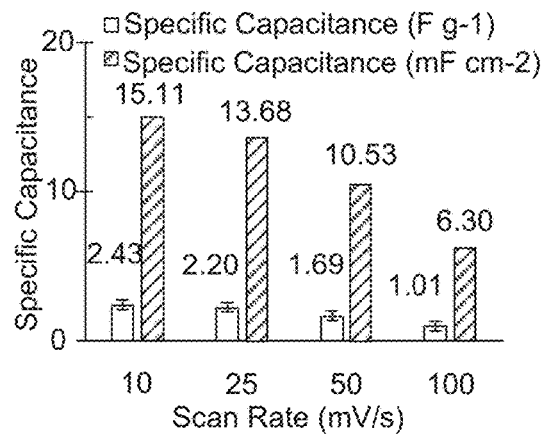

FIGS. 16A-16F illustrate for the lig-$NiWO_4$ supercapacitor (10:80:10 sample): cyclic voltammetry curve at various scan rates (FIG. 16A); comparative histogram of specific capacitance vs. scan rate (FIG. 16B); CV curves for different voltage ranges (FIG. 16C); comparative histogram of specific capacitance vs. voltage range at 10 mV $s^{-1}$ (FIG. 16D); voltage vs. time plots (FIG. 16E); and current vs. time plots (FIG. 16F) for the first nine cycles.

FIGS. 17A-17E illustrate plots for the lig:$NiWO_4$:PVDF ratio of 10:80:10: (FIG. 17A) specific capacitance vs. cycles, (FIG. 17B) retention, (FIG. 17C) electrochemical impedance spectroscopy (Nyquist plots), (FIG. 17D) specific capacitance vs. cycles for 5000 cycles, and (FIG. 17E) retention vs. cycles for 5000 cycles.

Figure 18A:
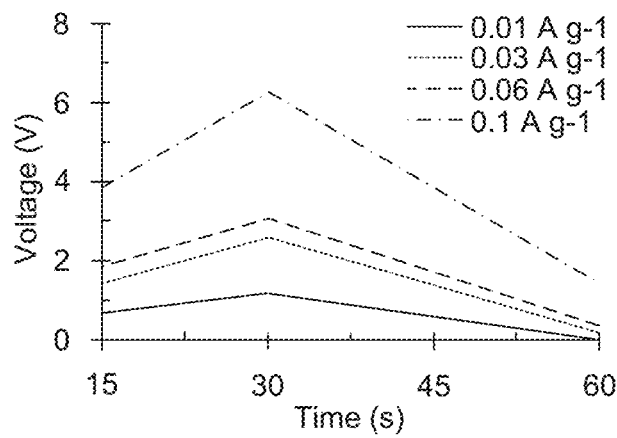
Figure 18B:
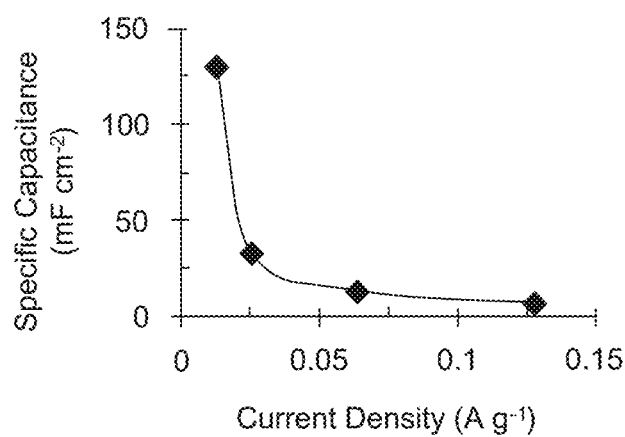
Figure 18C:
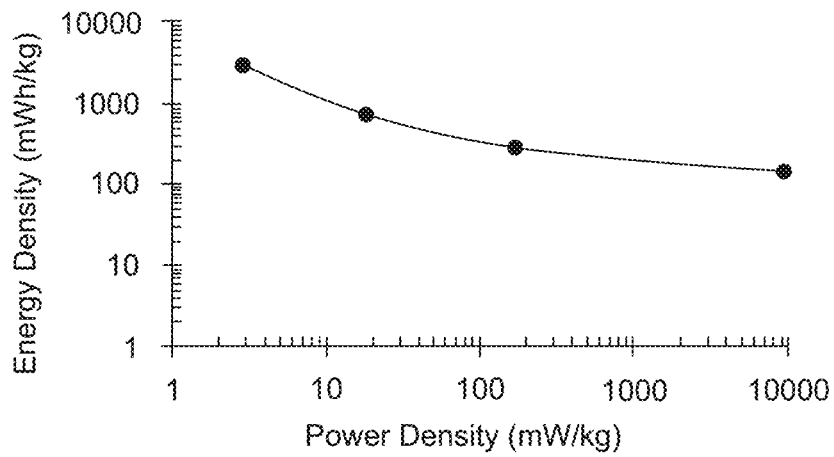

FIGS. 18A-18C illustrate comparative plots of (FIG. 18A) voltage vs. time at different current densities, (FIG. 18B) specific capacitance vs. current density in the cyclic charge-discharge experiment at a charge current of 2 mA, and (FIG. 18C) Ragone plot of the lig-$NiWO_4$ supercapacitor.

Figure 19:
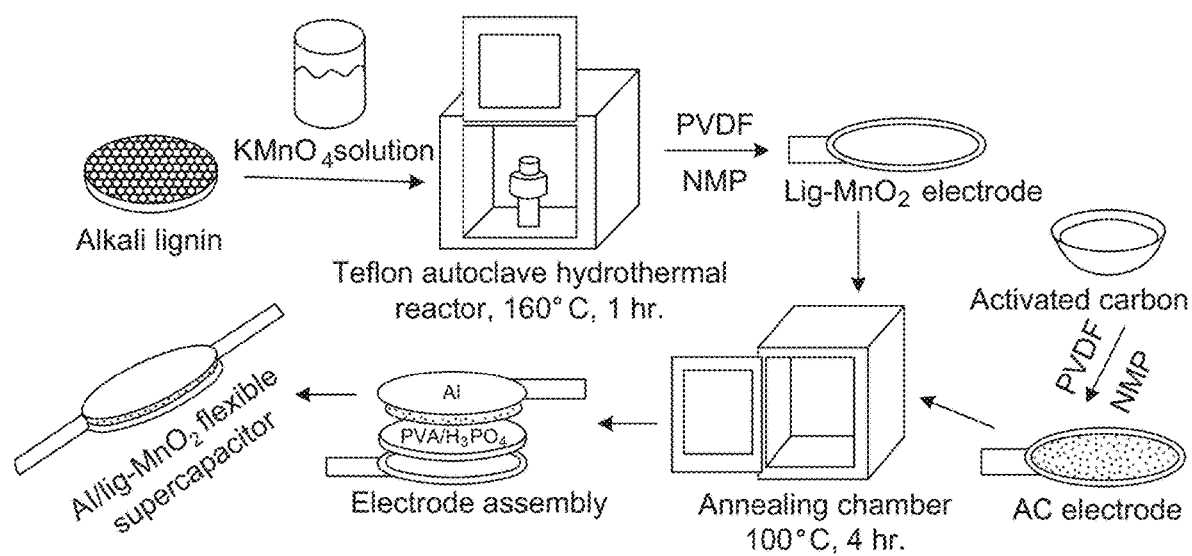

FIG. 19 illustrates a fabrication process of the lignin/$MnO_2$ supercapacitor.

FIGS. 20A-20E illustrate three-electrode tests for the AC and lig-$MnO_2$ electrodes: CV plots for the AC (FIG. 20A) and lig-$MnO_2$ (FIG. 20B) electrodes at varying scan rates. Voltage vs. time plots for the AC (FIG. 20C) and lig-$MnO_2$, (FIG. 20D) electrodes at varying current densities, and (FIG. 20E) the specific capacitance vs. current density plots for the AC and AC/lig-$MnO_2$ electrodes.

Figure 21A:
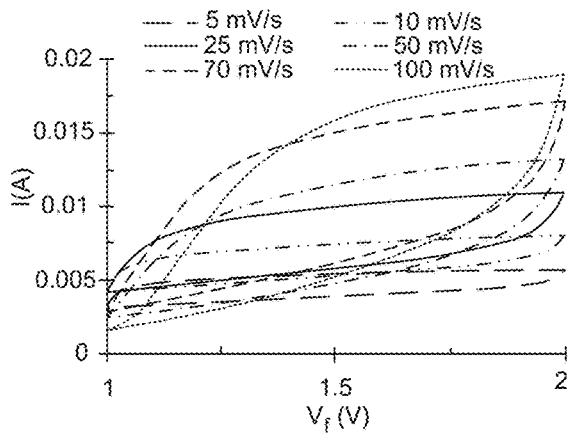
Figure 21B:
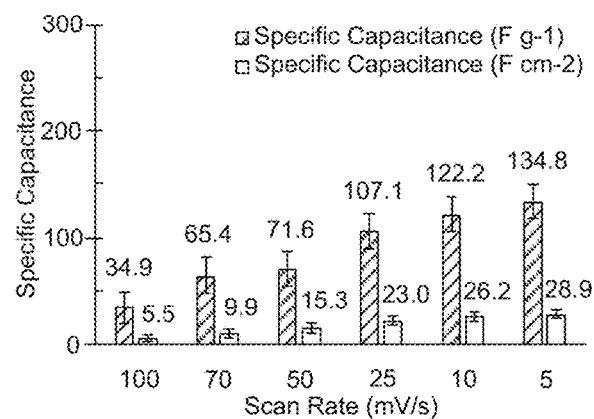

FIGS. 21A-21F illustrate a CV curve at different scan rates of lig/$MnO_2$ supercapacitor (FIG. 21A); comparison of specific capacitance vs. varying scan rates (FIG. 21B); CV plots of varying voltage windows (FIG. 21C); comparison of specific capacitances with varying voltage windows at a constant scan rate of 10 mVs$^{-1}$ (FIG. 21D); and, from the CV experiment, (FIG. 21E) the voltage-time curve and (FIG. 21F) the current-time curve.

Figure 22A:
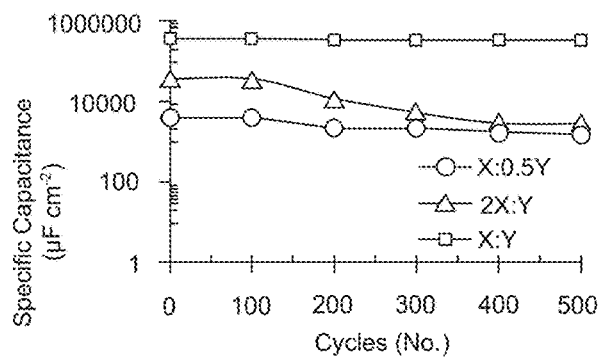
Figure 22B:
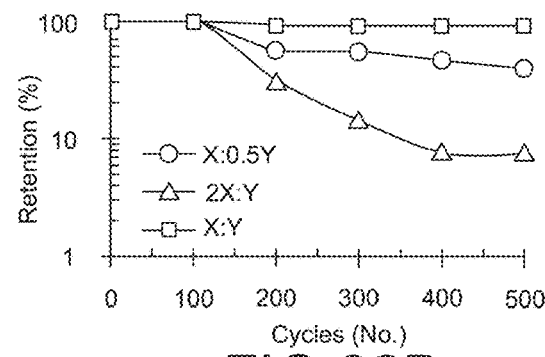
Figure 22C:
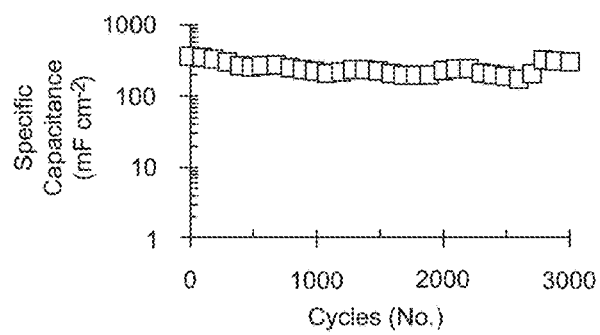
Figure 22D:
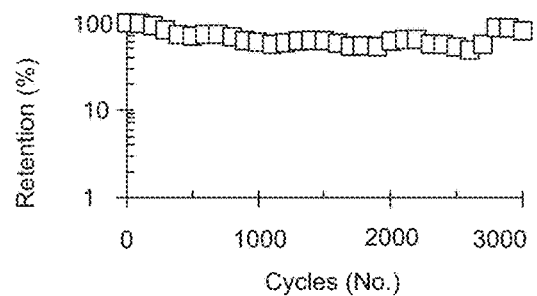
Figure 22E:
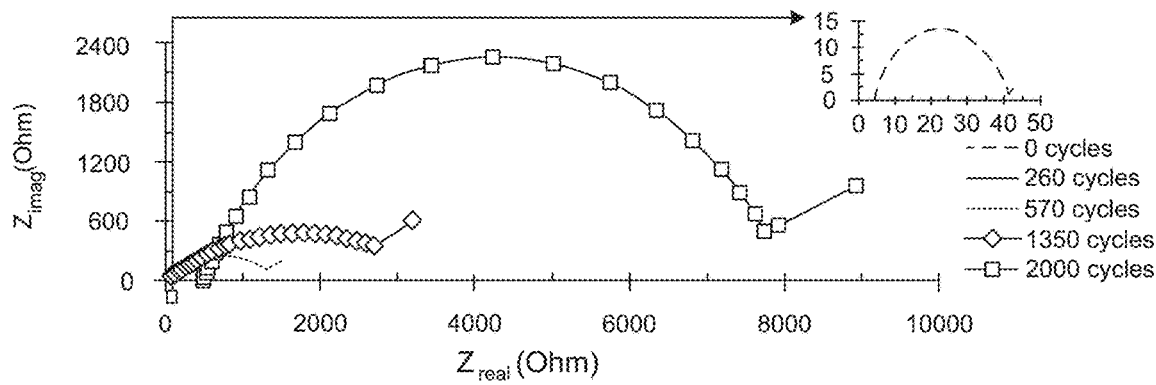
Figure 22F:
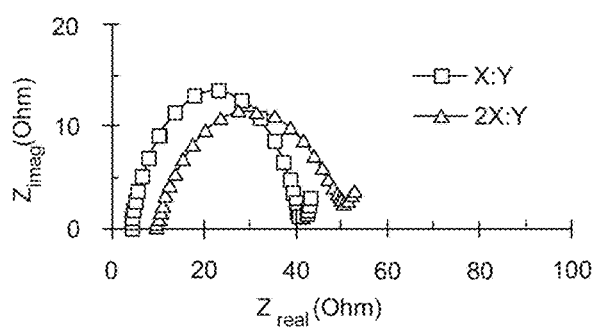
Figure 22G:
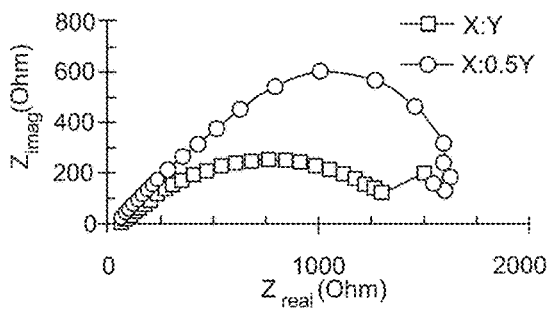

FIGS. 22A-22F illustrate for the CCD experiment at 40 mAg$^{-1}$ current density: plot of the changes of areal specific capacitance (FIG. 22A) and retention (FIG. 22B) with cycles for 500 cycles for samples X:Y, X:0.5Y and 2X:Y; plot of the change of areal specific capacitance (FIG. 22C) and capacitance retention (FIG. 22D) for the sample X:Y run for 3000 cycles; Nyquist plots of electrochemical impedance spectroscopy (EIS) test run for X:Y sample (FIG. 22E); Nyquist plots of the samples 2X:Y and X:Y for the first cycle (FIG. 22F); and Nyquist plots of samples 2X:Y and X:Y after 500 cycles (FIG. 22G).

Figure 23A:
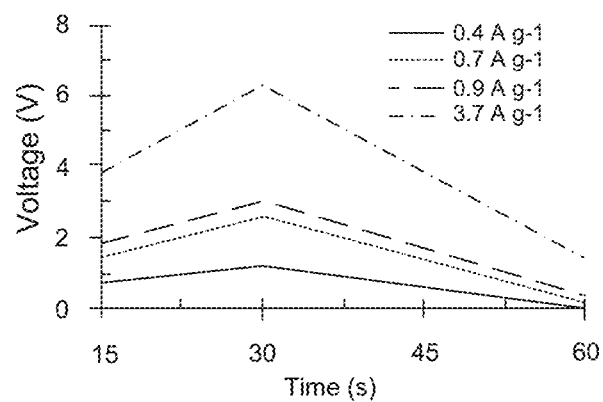
Figure 23B:
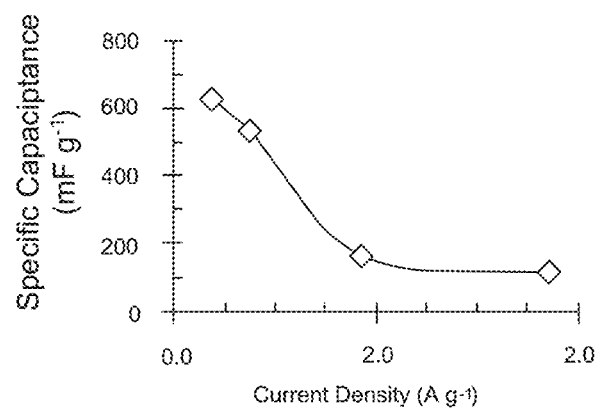
Figure 23C:
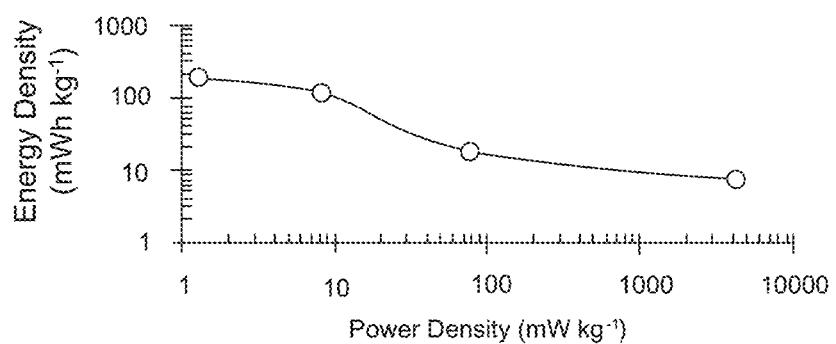

FIGS. 23A-23C illustrate for the lig/$MnO_2$ supercapacitor: (FIG. 23A) variation of voltage with time comparison at changing current densities; (FIG. 23B) variance of specific capacitances with discharge current density at 1 mA charge current; and (FIG. 23C) the Ragone plot.

Figure 24:
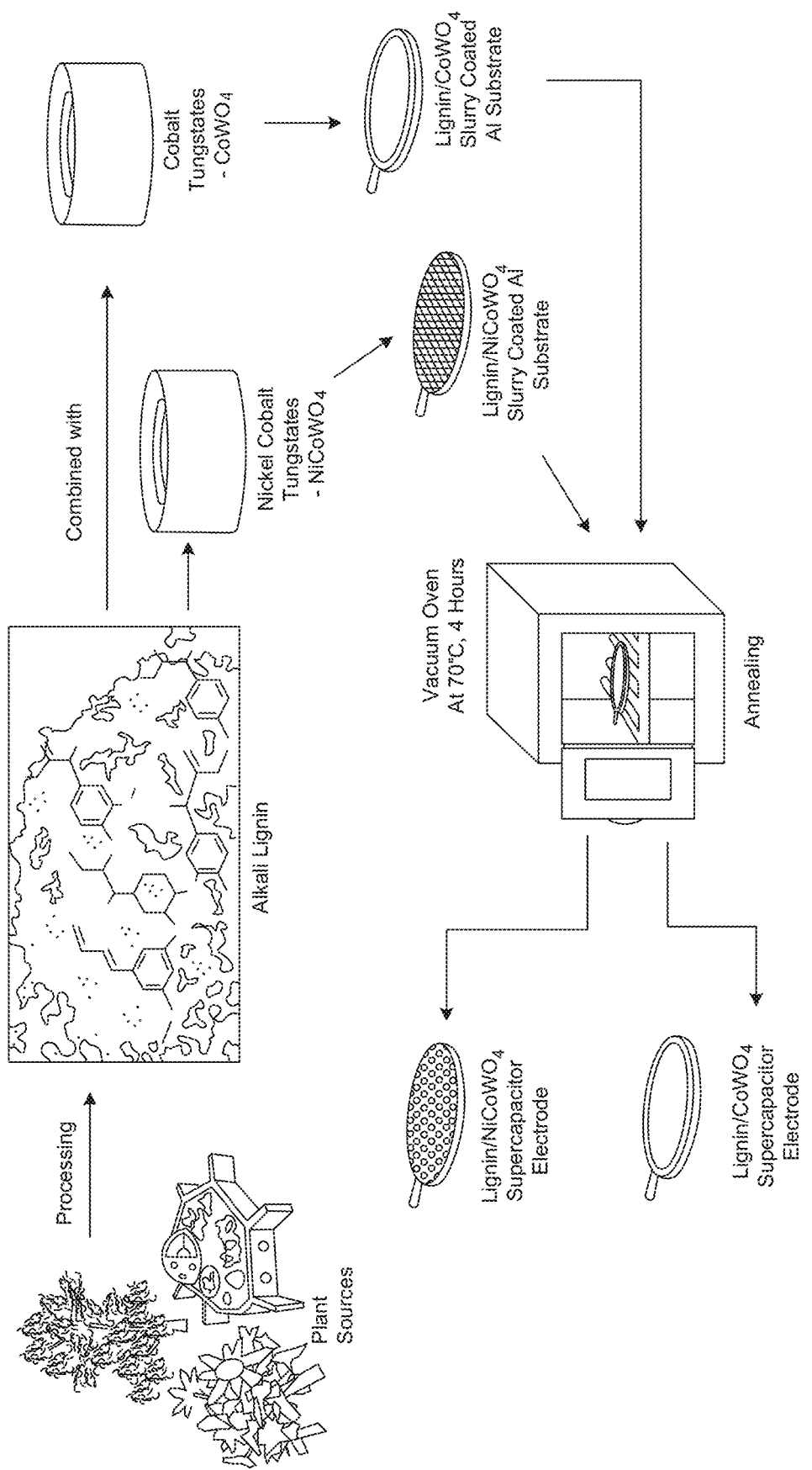

FIG. 24 illustrates a schematic for the fabrication of the composite electrodes.

Figure 25A:
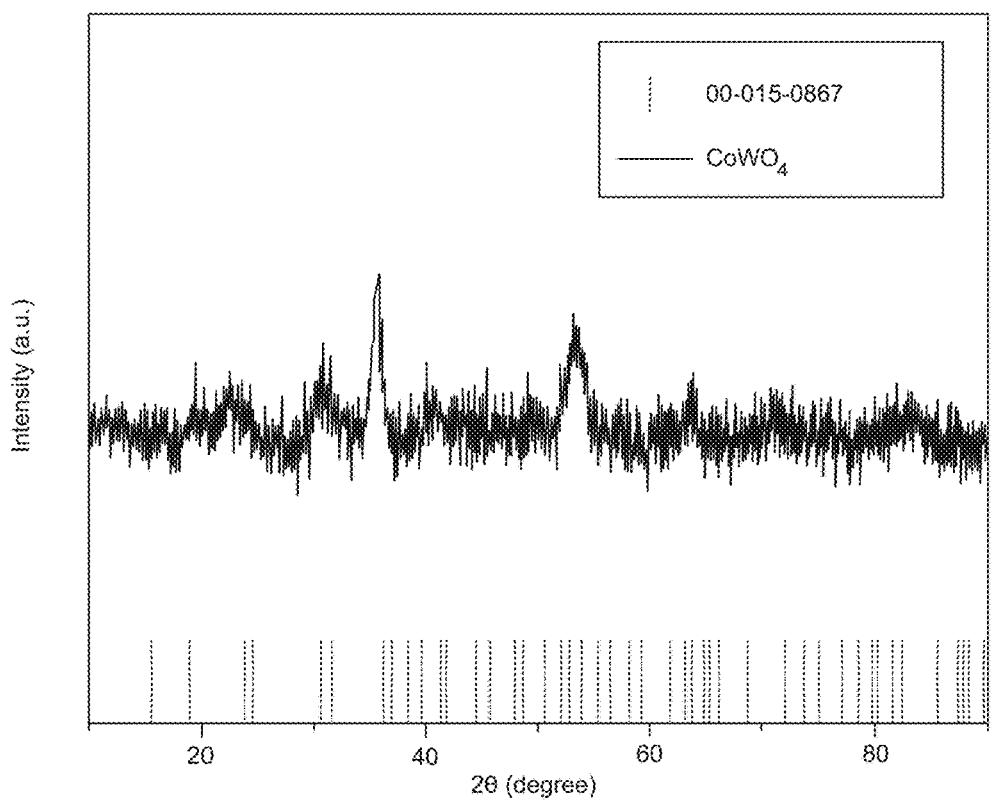
Figure 25B:
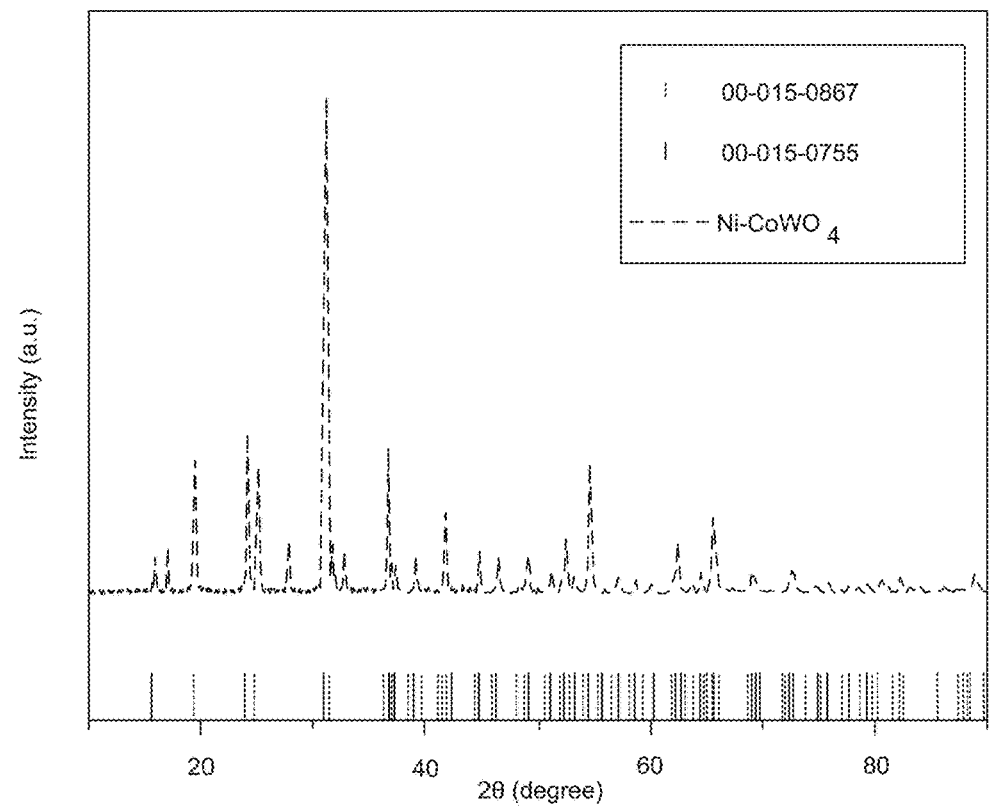

FIGS. 25A-25B illustrate XRD plots for the composite electrodes: (FIG. 25A) $CoWO_4$ and (FIG. 25B) Ni—$CoWO_4$.

Figure 26A:
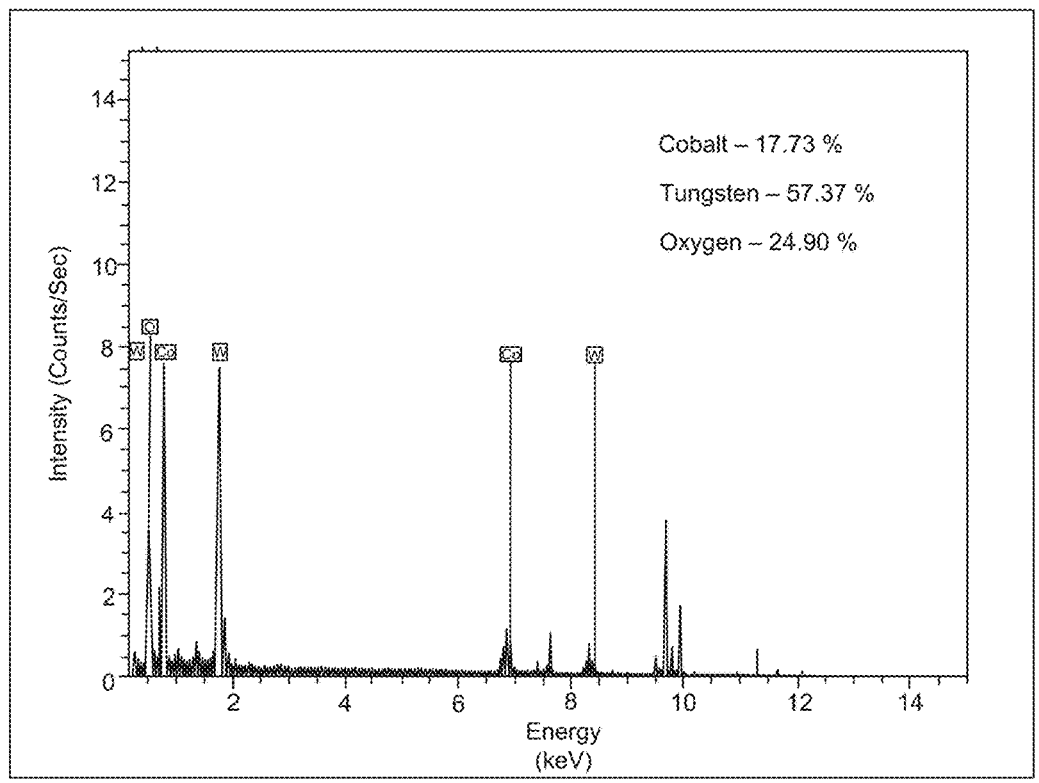
Figure 26B:
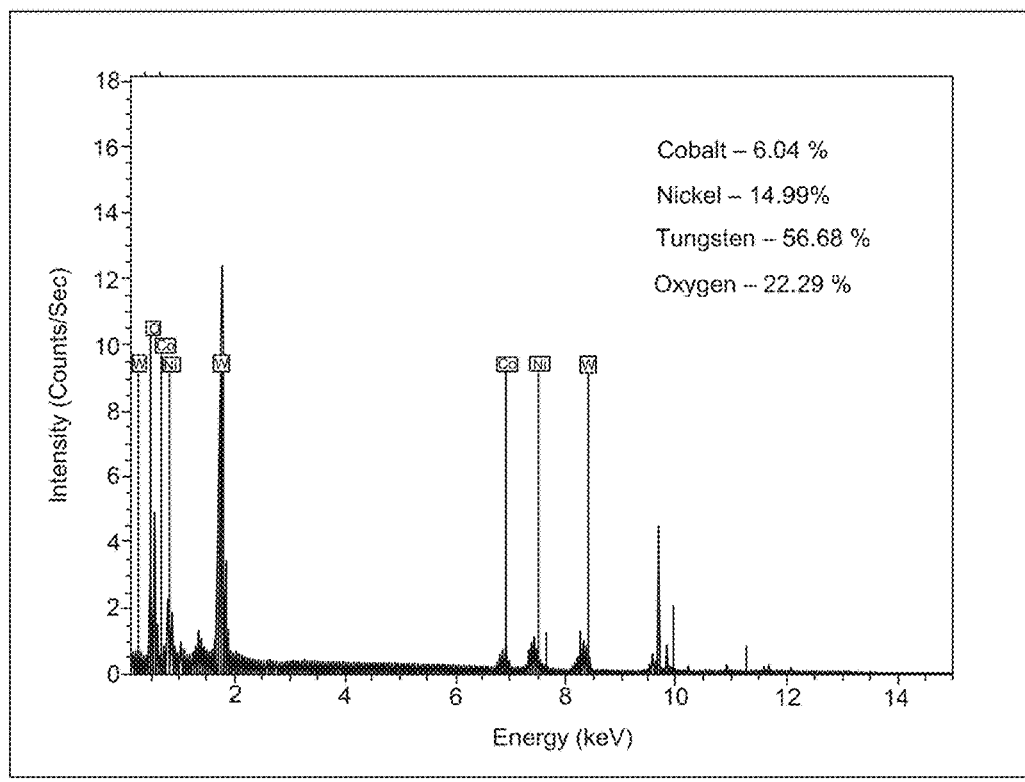

FIGS. 26A-26B illustrate EDS analysis for: (FIG. 26A) $CoWO_4$ and (FIG. 26B) Ni—$CoWO_4$ nanoparticles.

FIGS. 27A-27D illustrates XPS Spectrum for: (FIG. 27A) Ni 2p, (FIG. 27B) Co 2p, (FIG. 27C) W 4f, and (FIG. 27D) O 1s.

FIGS. 28A-28F illustrate CCD plots for: the specific capacitance (FIG. 28A) and retention (FIG. 28B) for the lignin/$NiCoWO_4$ and the lignin/$CoWO_4$ supercapacitors with a constituent ratio of 80:10:10 in each and the best ratio 10:80:10 of lignin/$NiWO_4$; specific capacitance (FIG. 28C) and retention (FIG. 28D) under varying mass loadings for the lignin/$NiCoWO_4$ supercapacitor; and the specific capacitance (FIG. 28E) and retention (FIG. 28F) under varying discharge times for the lignin/$NiCoWO_4$ supercapacitor with a constituent ratio of 75:15:10.

FIGS. 29A-29F illustrates CCD plots for the effect of carbonization on the specific capacitance (FIG. 29A) and retention (FIG. 29B) of the 75:15:10 supercapacitor; the effect of the negative electrode on the specific capacitance (FIG. 29C) and retention (FIG. 29D) of the 75:15:10 supercapacitor; the effect of the negative electrode on the specific capacitance (FIG. 29E) and retention (FIG. 29F) of the 15:75:10 supercapacitor.

Figure 30A:
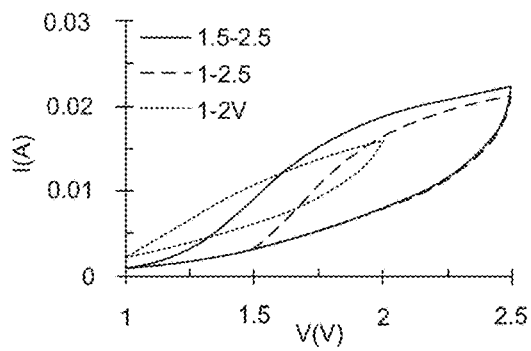
Figure 30B:
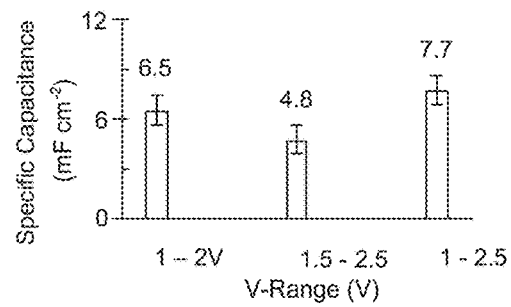
Figure 30C:
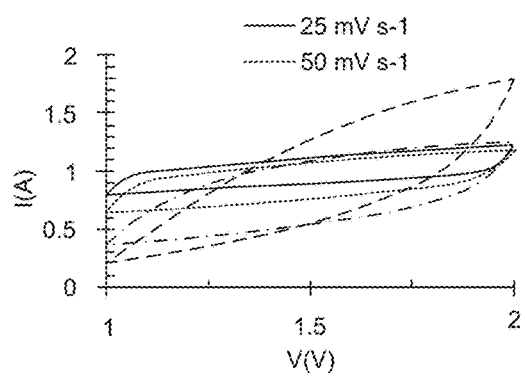
Figure 30D:
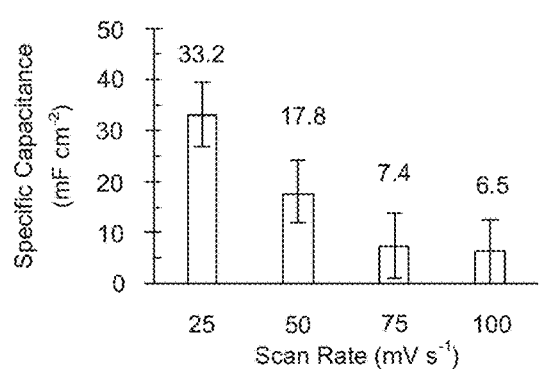
Figure 30E:
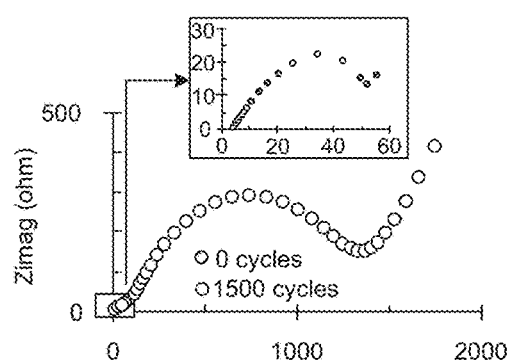
Figure 30F:
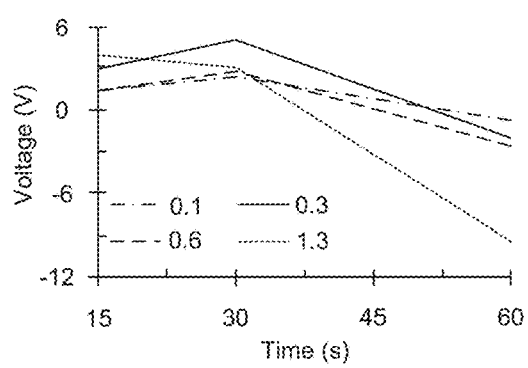
Figure 30G:
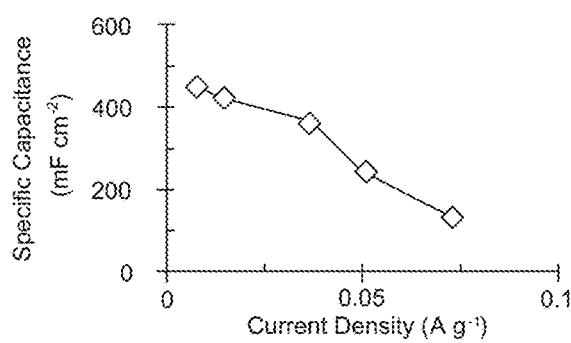
Figure 30H:
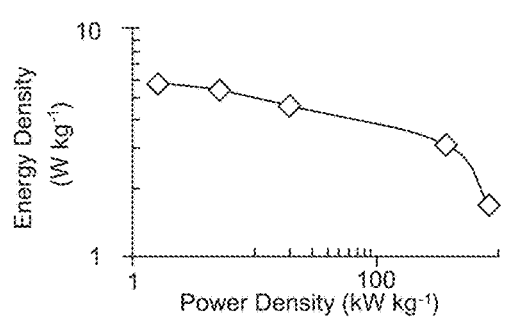

FIGS. 30A-30H illustrate for the lig-Ni—$CoWO_4$: CV plots for different potential windows (FIG. 30A) and at different scan rates (FIG. 30C); specific capacitance variation with voltage windows (FIG. 30B) and scan rates (FIG. 30D); the Nyquist plot (FIG. 30E); a V vs. T plot (FIG. 30F) at varying current density (A g$^{-1}$); variation of specific capacitance with current density (FIG. 30G); and the Ragone plot (FIG. 30H).

Figure 31:
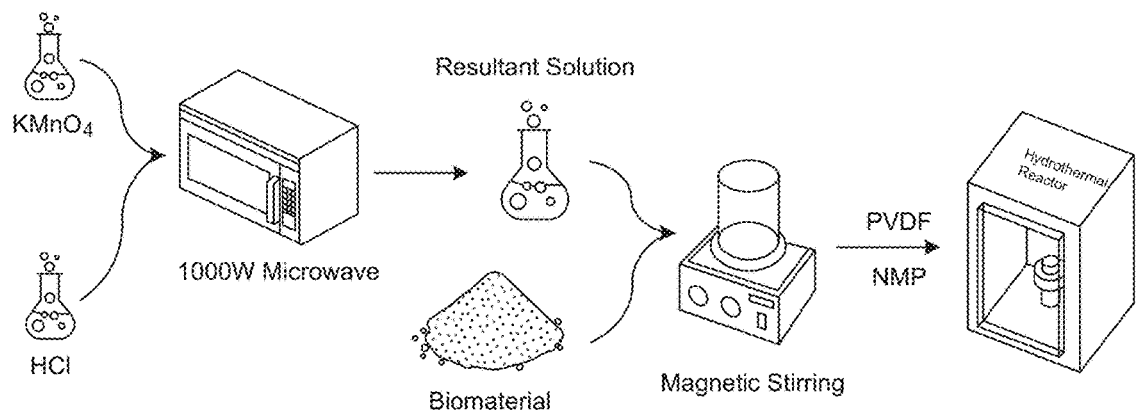

FIG. 31 illustrates a schematic for the preparation of electroactive materials.

Figure 32:
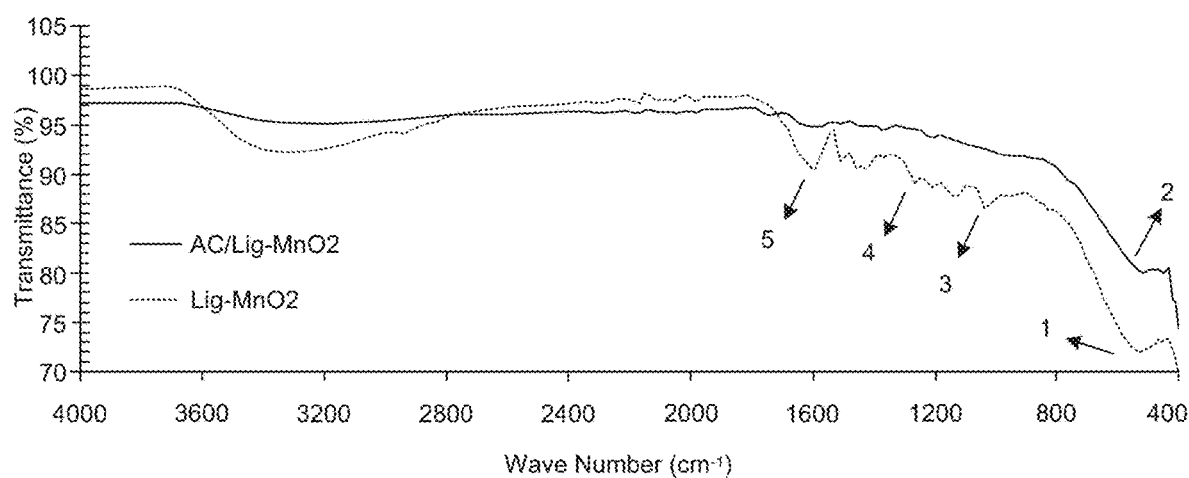

FIG. 32 illustrates FUR spectroscopy of AC/Lig-$MnO_2$ and Lig-$MnO_2$.

Figure 33:
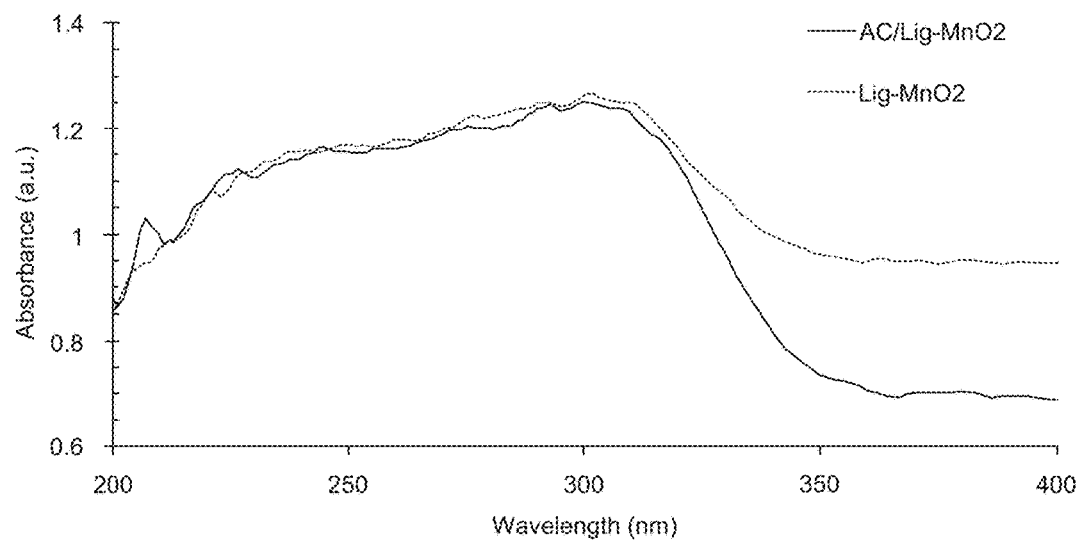

FIG. 33 illustrates UV-Vis spectroscopy of AC/Lig-$MnO_2$ and Lig-$MnO_2$.

Figure 34:
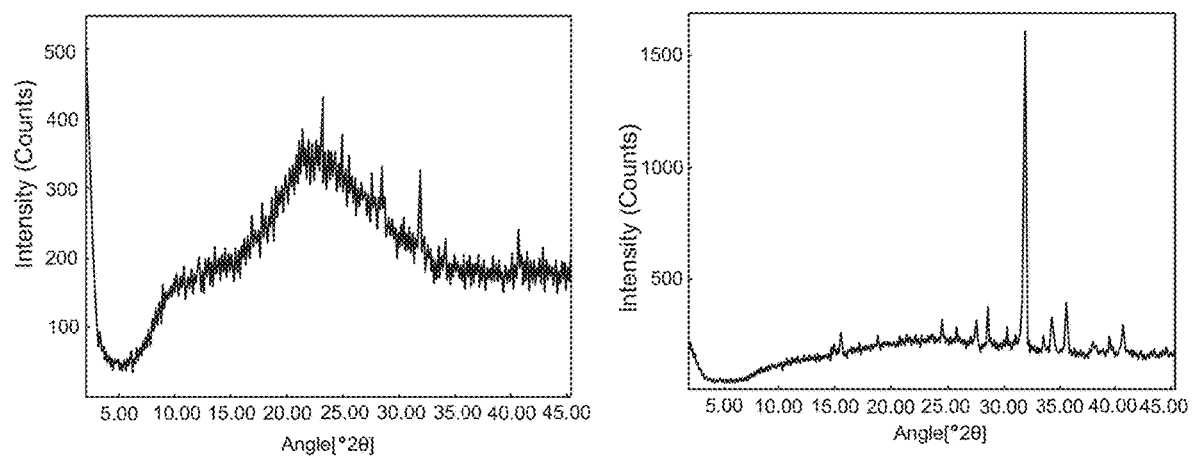

FIG. 34 illustrates XRD plots of: (Left) AC/Lig-$MnO_2$ and (Right) Lig-$MnO_2$.

FIGS. 35A-35D illustrate CV plots for (FIG. 35A) AC/Lig-$MnO_2$, (FIG. 35B) Lig-$MnO_2$ at various scan rates, (FIG. 35C) comparison of CV plots of AC/Lig-$MnO_2$ and Lig-$MnO_2$ at 10 mV s$^{-1}$, and (FIG. 35D) comparative histogram of specific capacitances.

Figure 36A:
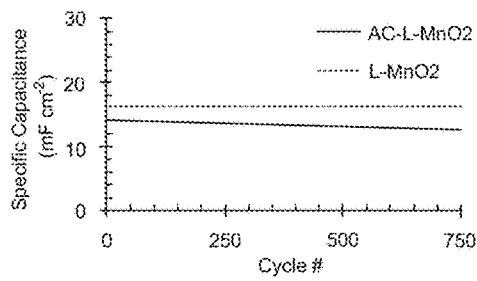
Figure 36B:
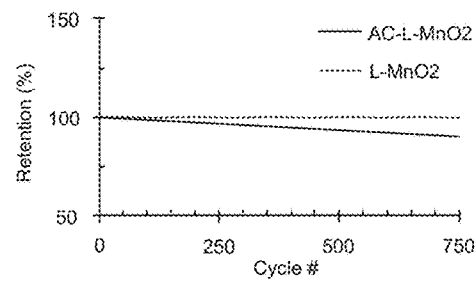
Figure 36C:
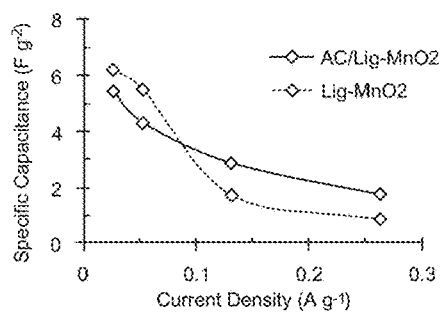
Figure 36D:
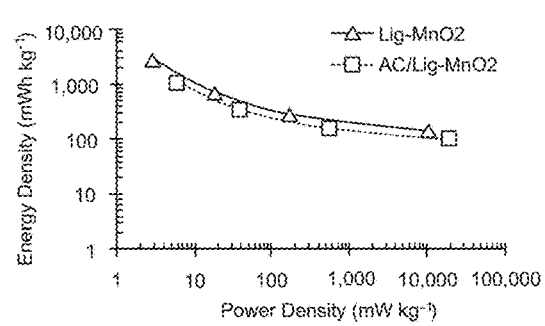
Figure 36E:
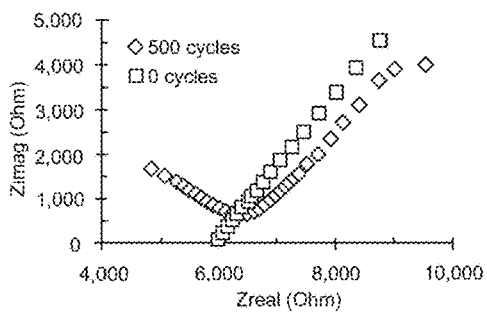
Figure 36F:
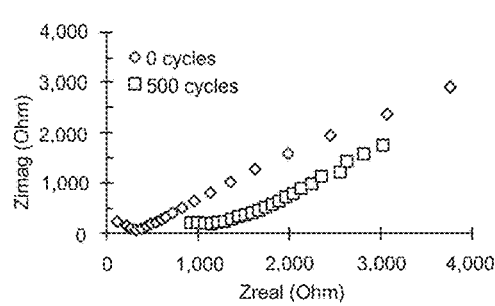
Figure 36G:
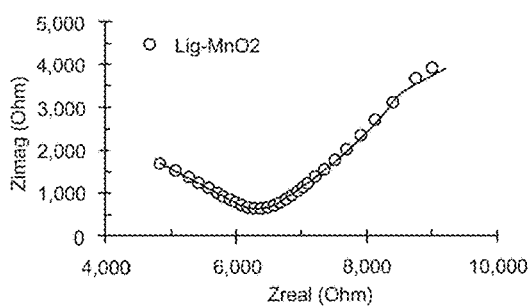

FIGS. 36A-36I illustrate: comparative CCD plots for (FIG. 36A) specific capacitance vs. cycle number, (FIG. 36B) retention (%) vs. cycle number, (FIG. 36C) specific capacitance vs. current density, (FIG. 36D) Ragone plot, (FIG. 36E) EIS plot for Lig-$MnO_2$ supercapacitor, and (FIG. 36F) EIS plot for AC/Lig-$MnO_2$ supercapacitor. FIG. 36G shows EIS fitted curve at 500 cycles for Lig-$MnO_2$ supercapacitor, (FIG. 36H) EIS fitted curve at 500 cycles for AC/Lig-MnO$_2$ supercapacitor, and (FIG. 36I) equivalent circuit for EIS 4.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Energy storage devices include batteries and capacitors. Batteries can store large amounts of charge per unit volume but do not typically generate large current loads. Capacitors, on the other hand, are much more efficient at generating a large quantity of electric current within a short duration. Such a burst of electricity helps capacitors to quickly charge devices, unlike batteries, which discharge over a much longer period of time. Both batteries and capacitors store charge on electrodes, which are often constructed from metal plates. Supercapacitors, unlike basic capacitors, can be made in different sizes, shapes and designs, depending on an intended application. Furthermore, supercapacitor electrodes may be built with different materials. Often times, materials utilized in the production of capacitors and supercapacitors such as, for example, ruthenium, zinc oxide, and other transition-metal oxides, are toxic or environmentally harmful.

One of the key challenges facing the world in the near future is that of clean and sustainable sources of energy. In this regard, both energy production and storage technologies need to be improved to meet the ever-rising demand for energy technologies. The incorporation of biomaterials into energy-storage devices enables the use of environmentally-friendly and less harmful materials. Use of such biomaterials facilitates easier manufacture and disposal of energy-storage devices. However, to date supercapacitors made of eco-friendly materials have been either expensive or of limited use.

Accordingly, the use of low-cost, environmentally-friendly, and plant-based carbon materials to make flexible, light, durable, green electrodes for solid-state energy devices is disclosed herein. These electrodes are eco-friendly and made from green materials such as carbon from trees, plants, waste, ashes, and the like. Furthermore, the electrodes disclosed herein have high charging rates and are exceptional energy retaining electrodes that allow for use in solid-state energy devices. The electrodes disclosed herein are adaptable to be utilized in batteries for daily use, heavy duty vehicles, regular vehicles, and the like.

Manganese dioxide is a cheap alternative to traditional materials to makes electrodes and is available in abundance. Additionally, manganese dioxide is safer compared to other transition metal oxides that are commonly used for making electrodes (e.g., ruthenium or zinc oxide). However, manganese dioxide can suffer from lower electrical conductivity. Research has shown that lignin, a natural polymer that glues wood fibers together, used with metal oxides enhances the electrochemical properties of electrodes. However, there have been few studies looking into combining manganese dioxide and lignin to leverage both of their useful properties.

The electrodes of the present disclosure, utilizing manganese dioxide and lignin, were found to have very stable electrochemical properties. In particular, the specific capacitance, or the ability of the device to store an electrical charge, barely changed, even after thousands of cycles of charging and discharging. Additionally, at particular lignin-manganese dioxide ratios, the specific capacitance was observed to be much greater than that reported for other supercapacitors (up to 900 times more). The present disclosure highlights the ability to make plant-based supercapacitors with excellent electrochemical performance using a low-cost and sustainable methods.

Reference will now be made to more specific embodiments of the present disclosure and data that provides support for such embodiments. However, it should be noted that the disclosure below is for illustrative purposes only and is not intended to limit the scope of the claimed subject matter in any way.

Example 1: Design and Synthesis of Lignin-Based Flexible Supercapacitors

Due to the immense demand for flexible super-capacitors, it is important to develop low-cost and smarter solutions. To date, supercapacitors made of eco-friendly materials have been either expensive or of limited use. Disclosed herein is a solid-state, lightweight, low-cost, and plant-based super-capacitor for applications in flexible electronics. The asymmetric supercapacitor is made of MnO$_2$ deposited on activated carbon and lignin as a substrate using hydrothermal deposition. With Al/AC/lig-MnO$_2$ anode and Al/AC cathode, the supercapacitor is assembled using a poly(vinyl alcohol) (PVA)/H$_3$PO$_4$ gel electrolyte. Morphological characterization is conducted using microtomography and scanning electron microscope. Electrochemical performance is assessed using cyclic charge-discharge, cyclic voltammetry, and electrochemical impedance spectroscopy. A series of compositions of AC:lignin:MnO$_2$ are optimized for best performance. After 2000 cycles, the specific capacitance obtained at 6.01 mA g$^{-1}$ is 5.52 mF cm$^2$, which is up to 13 times reported. Retention is 98.7% after 1000 cycles and 97.5% after 2000 cycles. The maximum energy density, power density, and Coulombic efficiency obtained are 14.11 Wh kg$^{-1}$, 1 kW kg$^{-1}$, and 98%, respectively. The favorable electrochemical performance makes it useful for a wide variety of electronics. This new approach to fabricate electrodes from green sources, with constituent optimization and cost-effectiveness, marks an important step toward green energy technology development.

Introduction. One of the key challenges facing the world in the near future is that of clean and sustainable sources of energy. In this regard, both energy production and storage technologies need to be improved to meet the ever-rising demand for energy technologies. In recent research, critical materials for lithium-ion batteries have been studied. Environmentally friendly materials are important for sustainability. Batteries and supercapacitors have been widely researched to enhance energy storage, and considerable progress has been made in recent decades. A recent study indicated that the microstructure and configuration have a profound influence on the performance of electrodes. This enables the design of new electrodes in the present disclosure. Recently, supercapacitors have gained a lot of attention for their high specific capacitance, energy density, and power density, which are clearly more advantageous over the conventional dielectric capacitors. A supercapacitor (SC) is a high-capacity capacitor with capacitance values much higher than other capacitors (but lower voltage limits) that bridges the gap between electrolytic capacitors and rechargeable batteries. They store 10-100 times more energy per unit volume or mass than electrolytic capacitors and deliver charge much faster than batteries. For instance, a 7 um thick micron size supercapacitor, which used an AC electrode and a 1 M $Et_4NBF_4$/propylene carbonate electrolyte, had a specific capacitance of 0.9 mF $cm^{-2}$ at a scan rate of 100 V $s^{-1}$. Electrochemical microcapacitor with carbon nanotube (CNT) composite electrodes have been prepared by thin-film technology and making use of photolithography. Specific capacitance reported was 36.5 F $g^{-1}$, energy density reported was ~0.4 Wh $kg^{-1}$, while the specific power reported was ~1 kW $kg^{-1}$. An all-solid-state supercapacitor is highly sought due to the ease of portability and use. Additionally, the use of solid-state supercapacitors eliminates the safety risk posed by conventional liquid electrolytes, which are combustible and bulky. As such, considerable efforts are directed toward the fabrication of solid-state supercapacitors. In the last decade, there is a rising trend to produce flexible supercapacitors due to exponential growth in the flexible electronics industry. Flexible devices offer the advantage of being used in conditions of additional strains without diminished performance. The bandwidth of application of wearable flexible electronics is huge, ranging from human wearable watches and clothing to sensors used in automobiles.

As such, a number of research efforts are directed toward the fabrication, design, and synthesis of solid-state flexible super-capacitors. The asymmetric design of the supercapacitor is beneficial in extending the potential window by employing one electrode for Faradic reactions and the other as a capacitor for improved power density. Furthermore, various combinations of electrodes and electrolytes are used in different designs with varied levels of success in terms of obtained specific capacitance, energy density, power density, capacity retention, and Coulombic efficiency. Nevertheless, most of these works use materials and processes, which are relatively expensive and cumbersome, which pose challenges for scalability and mass production. Moreover, there is a problem of unsafe electric waste that keeps mounting and has become a key cause of concern in recent times. For instance, the increasing use of nanoparticles in these electronic devices poses the problem of environment degradability and bioaccumulation in flora and fauna of the ecosystem they are disposed into. Accordingly, there is a high need to invest and encourage bio-friendly technologies that employ materials, which are from green sources and easily biodegradable.

Transition-metal oxides like $MnO_2$, ZnO, CoO, NiO, $RuO_2$, and CuO are highly sought candidates to be used in combination with other electroactive materials like carbon, carbon nanotubes (CNTs), carbon fibers, and carbon nanospheres due to their ability to enhance charge transport. This leads to higher specific capacitance compared to the conventional electric double-layer capacitor (EDLC) on account of enhanced interfacial Faradic reactions. $MnO_2$, in particular, is widely favored over others since it is not only cheaper but also readily available and safer. $MnO_2$ has different crystal structures like α-$MnO_2$ or γ-$MnO_2$ and has a high theoretical specific capacitance of 1370 F $g^{-1}$. These have been investigated in detail for their structures, which have different electrochemical properties. Accordingly, a wide variety of processes are available for obtaining a particular crystal form of $MnO_2$. A major drawback of $MnO_2$ is its poor electrical conductivity ($10^{-5}$-$10^{-6}$ S $cm^{-1}$) which poses a limitation on the bulk utilization of $MnO_2$. To overcome this drawback, the approach is to incorporate nanostructured $MnO_2$ into carbonaceous materials. This provides a high electroactive surface area and reliable electrical connection for the maximum utilization of $MnO_2$.

Of late, several carbon-based materials are used as the supercapacitor electroactive material. Some examples include graphene, graphite, activated carbon, CNTs, carbon hollow spheres, and carbon fibers. Lignin is naturally found in plants in abundance. It is also a waste product of the paper and pulp industry. Chemically, lignin is a nontoxic, polyaromatic polyol, and a relatively inexpensive sustainable polymer. Of late, carbon fibers have been produced with lignin since it is more advantageous compared to polyacrylonitrile (PAN) and pitch. It has a high carbon content (60%) and abundant presence of phenyl propane. One notable disadvantage of lignin, however, is its poor mechanical property. It is also a cumbersome task to recover lignin in a pure and clean form.

To try and overcome the drawbacks posed by lignin and $MnO_2$, a new material was synthesized, with major requirements of flexibility, cost-effectiveness, and ease of manufacturing being kept in mind. When combined with activated carbon (AC), structural instability and poor mechanical properties of lignin can be overcome to a certain extent. Decoration of $MnO_2$ ions on this AC/lignin matrix was done to increase the electroactive surface area and, in turn, increase the electrochemical conductivity of the material. Disclosed herein is a fabricated, assembled, and tested solid-state, plant-based flexible supercapacitor for applications in flexible electronics. The supercapacitor is ultralightweight, cheap, and made with the simple and inexpensive fabrication process. This asymmetric supercapacitor is made up of $MnO_2$-decorated AC and lignin (lig) as the active material. With Al/AC/lig-$MnO_2$ as the anode and Al/AC as the cathode, the flexible supercapacitor was assembled using the poly(vinyl alcohol) (PVA)/$H_3PO_4$ gel-based electrolyte. A series of composition of AC:lignin:$MnO_2$ were tested to arrive at the optimal proportions of these constituents for best electrochemical performance. The details of fabrication and assembly are provided below. Scanning electron microscope (SEM) characterization was done to observe the electrode and electrolyte surface and the supercapacitor interface. Additionally, a high-resolution synchrotron tomography imaging of the AC and lignin-based electrodes was done to obtain microscopic details of the particle morphology. The electrochemical performance was assessed using cyclic charge-discharge (CCD), cyclic voltammetry (CV), and electrochemical impedance spectroscopy (EIS). Further details of the electrochemical experiment setup are covered below. Various sections below cover in detail the findings of all characterization results and electrochemical analysis. Electrochemical study through cyclic charge-discharge shows that for 2000 cycles, the maximum areal specific capacitance obtained at 6.01 mA $g^{-1}$ is 5.52 mF $cm^{-2}$, which is up to 13 times higher than reported, as shown in Table 2. Retention was 98.7% after 1000 cycles and 97.5% after 2000 cycles. The maximum energy and power densities obtained were 14.11 Wh $kg^{-1}$ and about 1 kW $kg^{-1}$, respectively. A high Coulombic efficiency of 98% was obtained after 2000 cycles. Due to the synergistic effect of activated carbon, lignin, and $MnO_2$, the fabricated AC/lig-$MnO_2$ supercapacitor has superior performance than others reported. Such electrochemical performance of this supercapacitor makes it useful for a wide variety of device applications that employ flexible supercapacitors.

Figure 1:
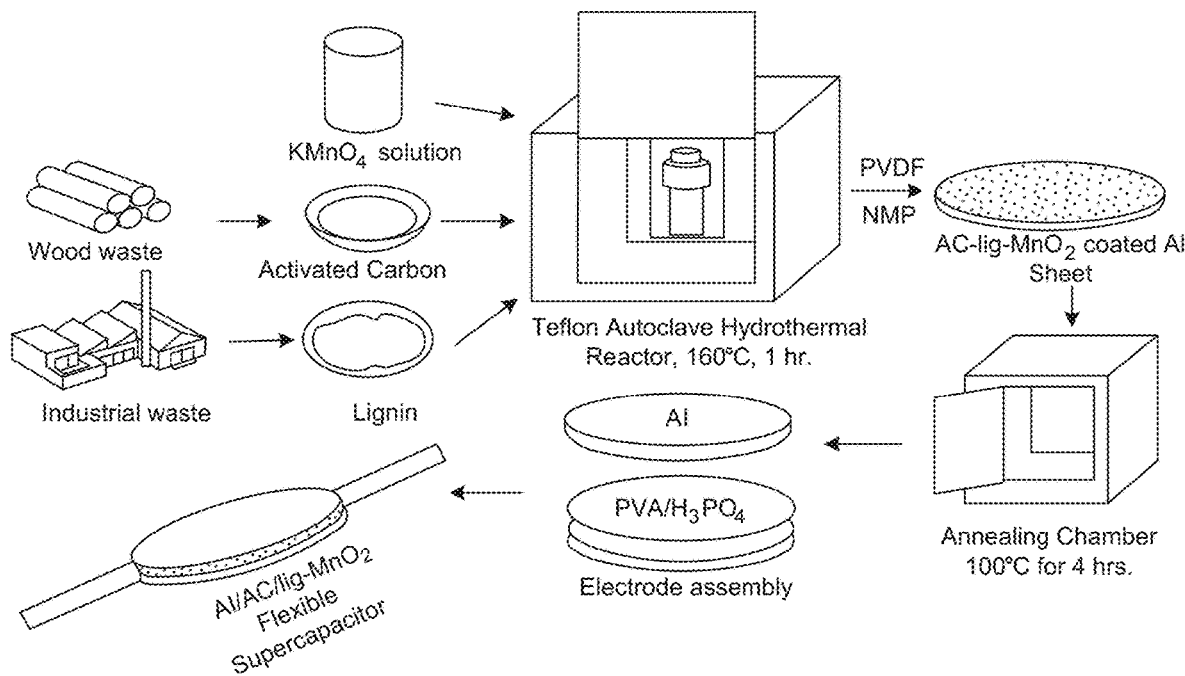
FIG. 1 illustrates a schematic diagram of the fabrication process and assembly of an Al/AC/lignin-$MnO_2$ supercapacitor. The electrode dimensions are: diameter=4 cm, width of Al strip=1 cm, and length of Al strip=3 cm.

Preparation of the Al/AC/Lignin-$MnO_2$ Composite Electrode. Four different samples of the Al/AC/lignin-$MnO_2$ composite electrodes were prepared differing in the relative weight fraction of each component. The samples were named as x:x:y, x:2x:y, 2x:x:2y, and Orig 2x:x:y as per the proportion of AC:lignin:$MnO_2$ where x=0.5 g y=47.5 47.5 μmol $MnO_2$ concentration. For instance, the sample Orig 2x:x:y contained 1 g of AC, 0.5 g of lignin and 47.5 μmol concentration of $MnO_2$. To prepare the Orig 2x:x:y first, a $KMnO_4$ solution of 47.5 μmol was made by adding 0.0003 g of $KMnO_4$ powder (Sigma-Aldrich, MW=158.03 gmol$^{-1}$, size <150 μm) in 50 mL of distilled water. Then, 0.5 g of alkaline lignin powder (TCI) and 1 g activated carbon (Sigma-Aldrich, MW=12.01 gmol$^{-1}$) were mixed by weight to obtain a mixture of AC and lignin. This powder mixture was then taken in an autoclave with a Teflon liner, and 50 mL of the $KMnO_4$ solution prepared earlier was added to it. Hydrothermal treatment was carried out at 160° C. for 1 h. The resultant solution was allowed to cool down at room temperature. The excess liquid was drained, and the slurry was dried in a vacuum oven overnight at 50° C. The powder obtained was mixed with polyvinylidene difluoride (PVDF) (Sigma-Aldrich, MW=180,000 by GPC) in the ratio of 4:1, and 2 mL of NMP (Sigma-Aldrich, density=1.028 g mL$^{-1}$, MW=99.13 gmol$^{-1}$, >99% pure) was added to the slurry. The slurry was coated on an aluminum foil (0.98 mm thick) substrate cut in the form of a circular plate of diameter 4 cm. The adjoining strips of the foil were 1 cm wide and 3 cm long. This design enables flexibility to the supercapacitor since the adjoining Al strip can be flexibly used over a 360° angle for electrical connections. The coated foil was heated in a vacuum oven for 4 h at 100° C. to obtain the Al/AC/lignin-$MnO_2$ composite electrode. A similar procedure was done to prepare the electrodes samples for x:x:y, x:2x:y, and 2x:x:2y by varying the relative compositions of AC, lignin, and $MnO_2$. FIG. 1 shows the general schematic of the process. The mass distribution in the composite electrode was: 0.41 μg of $MnO_2$ and 0.045 g of lignin.

Preparation of the PVA/$H_3PO_4$ Gel Electrolyte. A non-aqueous gel made up of PVA/$H_3PO_4$ was prepared. To make this gel, 1 g of PVA (Aldrich, MW=85000-124000, >99% pure) was added to 10 mL of water. The resultant mixture was stirred over a magnetic heater at 80° C. for 40 min. After this, 8.0 g of $H_3PO_4$ (Sigma-Aldrich, MW=82.0 gmol$^{-1}$) was added to the resultant solution. This was followed by stirring the solution over a magnetic heater at 70° C. for 20 min. Once the required consistency of the resulting gel was obtained, a commercial paper, of the same dimension as the electrode, was dipped in it and used as a separator for the supercapacitor.

Fabrication of the Solid-State Asymmetric Supercapacitor. To fabricate the supercapacitor, the electrodes made earlier were used. The Al/AC/lignin-$MnO_2$ composite electrode was used as the positive electrode and Al/AC was used as the negative electrode. The two electrodes were sandwiched with the gel electrolyte in between.

Scanning Electron Microscope. Scanning electron microscope (SEM) characterization was carried out to study the surface characteristics of the electrodes, the gel electrolyte, and the supercapacitor interface. For this, the VEGA/TESCAN model SEM, at the Texas A&M Mechanical Engineering Facility, was used. It employed an electron beam accelerated at 5 kV and provided a magnification of 100×.

X-Ray Diffraction. For X-ray diffraction (XRD) of AC and lignin particles of the composite supercapacitor electrode, a 2.2 kW Cu X-ray tube was used as the X-ray source. The tube was maintained at 40 kV and 25 mA. For the X-ray optics, the standard Bragg-Brentano parafocusing mode was employed. A radiation safety enclosure contained the sample holder having two circular goniometers. For data collection, an automated COMMANDER program was used. The EVA software was used for data analysis.

FTIR Spectroscopy. Fourier transform infrared (FTIR) spectroscopy was performed for the AC and lignin particles of the composite supercapacitor electrode to identify the chemical identity of the particles. A Shimadzu IRAffinity-1 spectrophotometer was used to record the FTIR spectra. The powdered samples were placed on the instrument disc, and the wavenumber range used was from 4000 to 500 cm$^{-1}$ with a resolution of 500 cm$^{-1}$.

UV-Vis Spectroscopy. UV-Vis spectra were obtained for the $MnO_2$ particles of the composite supercapacitor electrode. For this, distilled water was used as a reference. 47.5 μmol of the $KMnO_4$ solution hydrothermally treated was used. Thermal decomposition of $KMnO_4$ leads to the formation of $MnO_2$, which shows characteristic spectra under UV. Shimadzu UV-2550 spectrophotometer was used to record the UV-Vis spectra.

Synchrotron X-ray Tomography. To get detailed information about the electrode morphology, structure, and interface of the supercapacitor, high-resolution synchrotron X-ray tomography was carried out at beamline 8.3.2 at the Lawrence Berkeley National Laboratory at its Advanced Light Source (ALS) facility. This technique presents the advantage of being a nondestructive tool for viewing the inner layers of electrode samples. Analysis of the image data also allows the study of the dependence of electrochemical behavior on surface morphology. Experimentally, 35 KeV X-rays were used, and 360-1800 images were collected while the sample was rotated over 180°. Detection was accomplished with a 50 μM Ce:LuAG scintillator, a Mitutoyo 5× lens, and a PCO edge sCMOS camera for a resolution of about 1.3 μm. Xi-CAM and TomoPy software packages were used to reconstruct the volumes. Three-dimensional (3D) visualization was done using Avizo and FIJI software packages. Each of the sample scans took about 45 min to complete. The two-dimensional (2D) images were concatenated, and contrast enhancement was performed using ImageJ.

Electrochemical Measurements. A Gamry potentiostat version 6.33 was used to perform the electrochemical characterization. For the cyclic voltammetry (CV) experiment, the $MnO_2$-based electrode of the supercapacitor was used as the working (positive) electrode, and the reference and counter electrode terminals were connected to the AC-based electrode of the supercapacitor. To assess the effect of the scan rate voltage on the electrochemical performance of the supercapacitor, the CV experiment was performed at various scan rates, i.e., at 5, 10, 25, and 100 mV s$^{-1}$. The voltage range for CV was 1-2 V, and the optimal scan rate was 10 mV s$^{-1}$. The comparative CV plots are shown in FIG. 7. To get a detailed understanding of the supercapacitor impedance behavior, electrochemical impedance spectroscopy was also carried out using a frequency range of $10^6$-0.1 Hz, AC volts of 10 mv, and DC at 1 V. The selected frequency range was wisely selected so that all crucial steps, namely, ion-transfer resistance in the electrolyte, charge-transfer resistance in the capacitive double layer, which is high-frequency dependent phenomena, are covered along with the low-frequency-dependent diffusion kinetics in the electrode. AC volts and DC volts were selected as per (EIS) guidelines in the Gamry instrument framework applicable for the mass transfer and diffusion-related process. Nyquist plots were obtained at regular intervals starting at the beginning, and after the end of the 100th, 350th, 1000th, 1300th, and 2000th cycle. The results are shown in FIG. 9. The cyclic charge-discharge (CCD) experiment was carried out at a current density of 6.01 mA g$^{-1}$ using a Gamry potentiostat. Duration of 1 min was provided each for a charge and a discharge cycle. The CCD experiment was run for 2000 cycles with the upper limit of the voltage being 20 V.

Morphology of the samples was studied using SEM. It was used to observe the electrode-electrolyte interface and surface features. The SEM images of the PVA/$H_3PO_4$-based gel electrolyte used in the supercapacitor interface was reviewed. It was seen that the surface of the electrolyte appears to be smooth and without any damage. This smooth electrolyte surface ensures that there is good interfacial contact with the electrode surface and no unwanted reaction products are generated due to undesirable side reactions because of any impurity. Additional images displayed the negative electrode surface showing AC particles. The AC particles are seen evenly distributed throughout the electrode surface. The substrate used was the Al foil. An even distribution of AC particles ensures better attachment and a higher contact area with the electrolyte. The particles appear clustered in some local regions and elongated. There are also seen regions with high porosity. The highly porous structure is helpful for a higher contact area for surface reaction.

SEM imaging of the supercapacitor interface were further studied. The electrolyte gel layer is sandwiched between the outer electrodes with Al as the substrate. The interface thickness is close to 100 µm. The active material of the electrodes seems well attached to the electrolyte layer. The interface is mechanically stable, and the two-electrode surfaces are congruent with the electrolyte. This provides a good condition for the electrochemical experiment.

Figure 2:
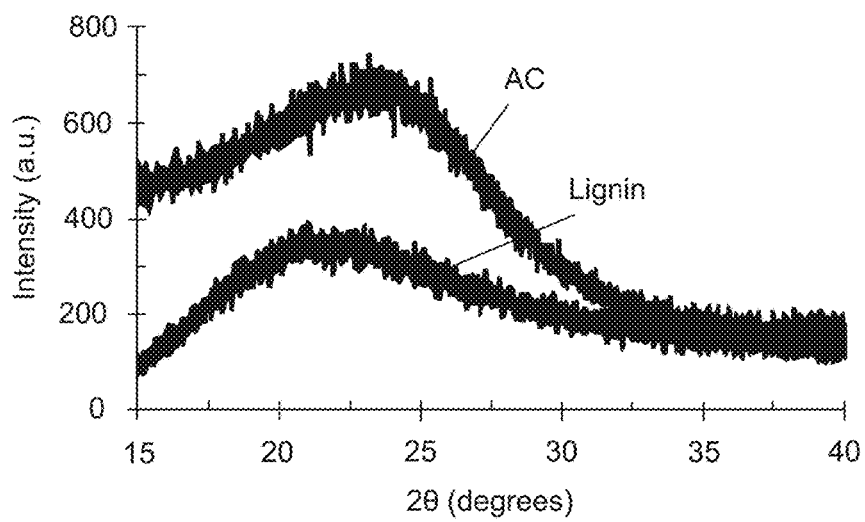
FIG. 2 illustrates X-ray diffraction (XRD) of activated carbon (AC) and lignin (lig) particles of the composite electrode.

The XRD plot for AC (FIG. 2) shows a broad diffraction peak (002) in the range $2\theta=15$-$30°$. This is indicative of the amorphous nature of AC particles. Lignin similarly showed a broad peak in the range $2\theta=20$-$25°$ indicating at its highly amorphous nature. The relative lower intensity in lignin peaks compared to that of AC shows a greater departure from crystallinity in lignin particles.

Figure 3:
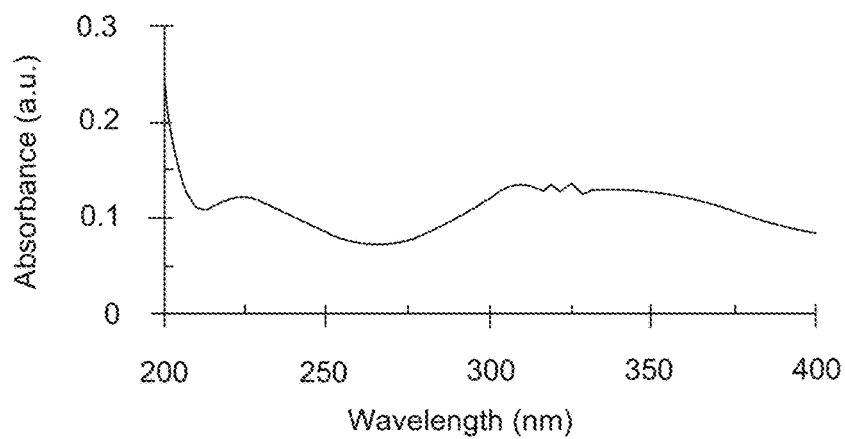
FIG. 3 illustrates ultraviolet-visible (UV-Vis) spectra of $MnO_2$.

From UV-vis plot (FIG. 3), a characteristic broad peak in the range 300-380 nm confirmed the presence of $MnO_2$. At high temperature, thermal decomposition occurs for $KMnO_4$, which leads to a peak at about 380 nm indicative of the d-d transition in $Mn^{4+}$ ions indicating the formation of a sheet-like structure for $MnO_2$.

Figure 4A:
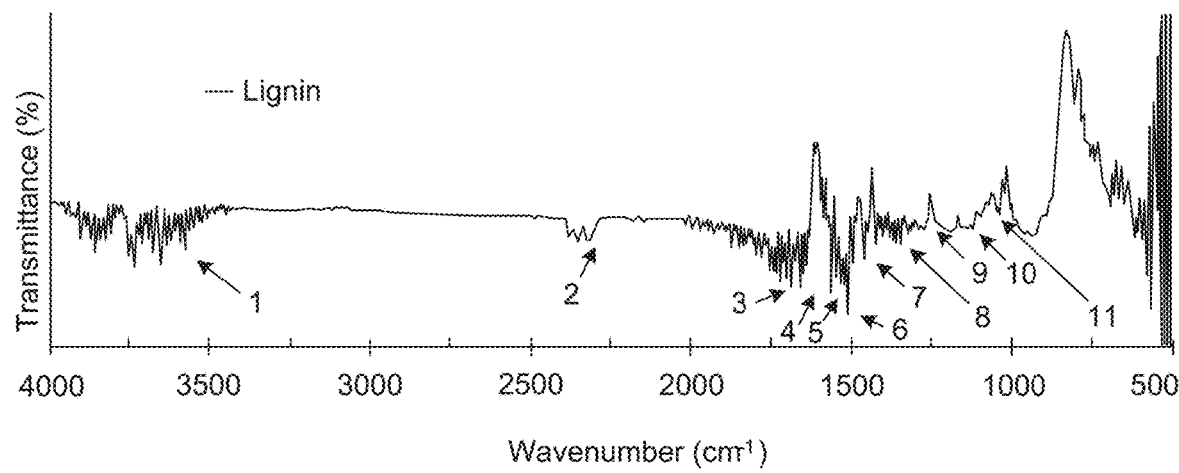
FIGS. 4A-4B illustrate Fourier-transform infrared (FTIR) spectra for the composite electrode materials.
Figure 4B:
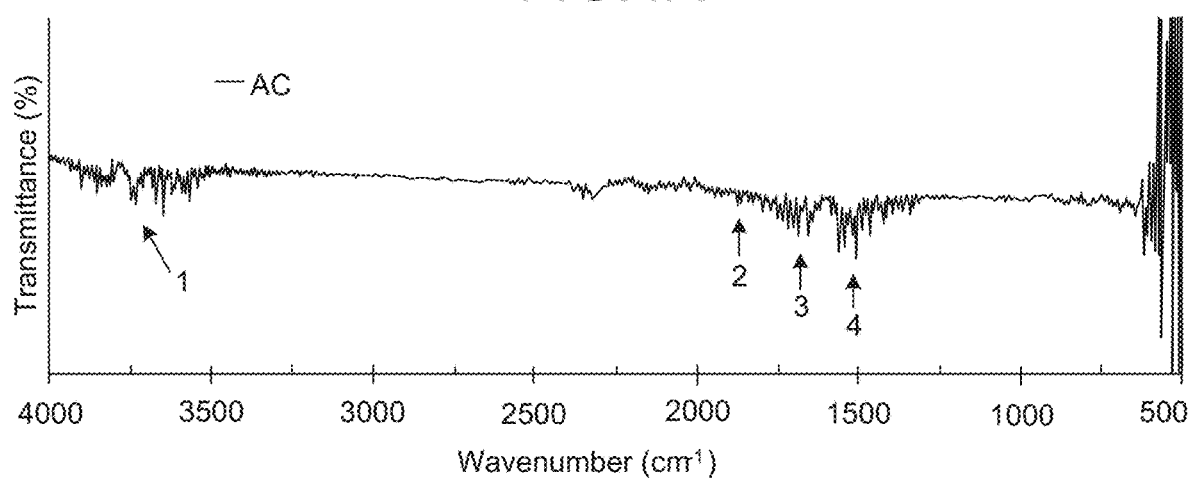

FTIR analysis was carried out for lignin and AC to ascertain the chemical signature of the molecules present. The peaks were compared to the literature reports for both lignin and AC. In the FTIR plot of lignin (FIG. 4A), the peaks corresponding to 3400-3750 $cm^{-1}$ (peak 1) can be attributed to the O—H bond stretching. C—H bond stretch vibrations of methylene and methyl groups correspond to 2310-2350 cm-1 (peak 2). C═O stretching in unconjugated carbonyls corresponds to the peaks in the range 1705-1724 $cm^{-1}$ (peak 3). Peak 4 at 1635 $cm^{-1}$ signifies C═O group stretching in α, β unsaturated aldehydes or ketones and C═C groups in alkanes. Peaks in the range 1500-1585 $cm^{-1}$ (peak 5) can be attributed to C—C bond stretch vibration in aromatic rings. Peak 6 at 1506 $cm^{-1}$ corresponds to the benzene ring skeleton stretching vibration, which is the characteristic absorption peak for lignin. Peak 7 at 1456 $cm^{-1}$ represents the C—H bending vibration in methyl groups. The peak appearing at 1338 $cm^{-1}$ (peak 8) corresponds to the rock or bend vibration in alkanes. In lignin, it also corresponds to the C═O stretch in the syringol ring breathing mode. Peaks 9, 10, and 11 at 1271, 1141, 1035 $cm^{-1}$ correspond to C—O stretching vibration in guaiacol rings, C—H vibration stretching in guaiacol rings, and C—O stretch in C—O in ether or alcohol. For the FTIR plot of AC (FIG. 4B), peak 1 corresponding to 3734 $cm^{-1}$ represents O—H bond stretching. The vibration absorption (nonsymmetric) of C═O corresponds to the peak at 1843 $cm^{-1}$ (peak 2). For the range 1635-1772 $cm^{-1}$ (peak 3), the stretching vibration absorption of C═O is represented. The stretching vibration of the skeleton of the benzene ring is attributed to peak 4 occurring in the range 1506-1558 $cm^1$. The corresponding high intensity for the benzene skeleton in lignin signifies that the benzene structure in lignin is on an average more intact.

To understand the morphology of particles of the AC/lignin matrix, it is simpler to first analyze them in a separate setup. Corresponding to this, two separate fresh samples of super-capacitors were assembled for experimenting; one made up of AC and the other made up of lignin.

Synchrotron tomography was used to observe the composite electrode particles AC and lignin. The AC particles appear in agglomerated clusters with an apparently higher number of surface pores than that of lignin. It also appears that the AC particle apparent length is smaller than lignin particles, which is due to smaller carbon chain linkages in AC as a consequence of the activation process. The lignin material has longer particle strands, which seem to overlap on each other in a three-dimensional (3D) setup. Both AC and lignin have amorphous nature with 3D branching of chains and the presence of surface voids. There is evidence of localized agglomerations in AC diameter 5-50 µm approximately. The lignin strand lengths range from 5 to 150 µm in length. Since, both AC and lignin particles have complex branching in 3D space, it is more reasonable to further observe the 3D features of the electrodes using 3D tomography and image analysis. High-resolution synchrotron X-ray tomography was done to assess the initial morphology of particles of these two supercapacitors. Imaging shows the morphology of the activated carbon (AC)-based supercapacitor and the morphology of the lignin-based supercapacitor. The analysis is performed using ImageJ. 200×100 $µm^2$ rectangular sections were used for the detailed morphology study of particles. Specific points of interest include the shape, size, and circularity of the particles, surface packing density, measures of central tendencies, and particle distribution. These values are tabulated in Table 1.

TABLE 1

Particle morphological measurements obtained from the tomography image for the AC and lignin-based supercapacitors (SC).

| Parameter | AC/SC | Lignin SC |
| --- | --- | --- |
| Mean | 60.62 | 87.13 |
| Std. Dev. | 9.62 | 10.17 |
| Min | 40 | 54 |
| Max | 99 | 125 |
| Circ. | 0.68 | 0.59 |
| Int. Den. | 1 606 997 | 1 874 122 |
| Skew | 0.59 | 0.09 |
| Kurt | −0.39 | 0.48 |
| AR | 3 | NaN |
| Round | 0.333 | Infinity |

Interactive 3D surface plots of intensity across the rectangular section was obtained. This is done to obtain a visual inspection of the relative surface distribution of particles in both the supercapacitors. The intensity in the 3D plots is indicative of the nature of the particles in the two supercapacitors, which directly relate to types of functional groups and bonds present. All of the peaks across the x-y plane in the AC supercapacitor lie below the 120 pixel line. In lignin supercapacitor, all of the peaks across the x-y plane lie below the 160 pixel line. As such, a corresponding higher average intensity in the lignin plot than that of the AC plot is observed.

The circularity of particles represented by Circ. in Table 1 represents the closeness of the particles to a circle. A value of 1 represents a perfect circle, while a value closer to 0.0 represents an increasing elongated shape. In general, the below equation represents circularity (Circ.).

$$Circ. = 4 \times \frac{[area]}{[perimeter]^2} \quad \text{(Eqn. 1)}$$

The smaller value of circularity of lignin particles (Circ.=0.59), as seen from Table 1, indicates that the particles of lignin are more elongated in general compared to that of AC (Circ.=0.68). This could be due to more complex and elongated polymeric chains in lignin molecules.

Figure 5:
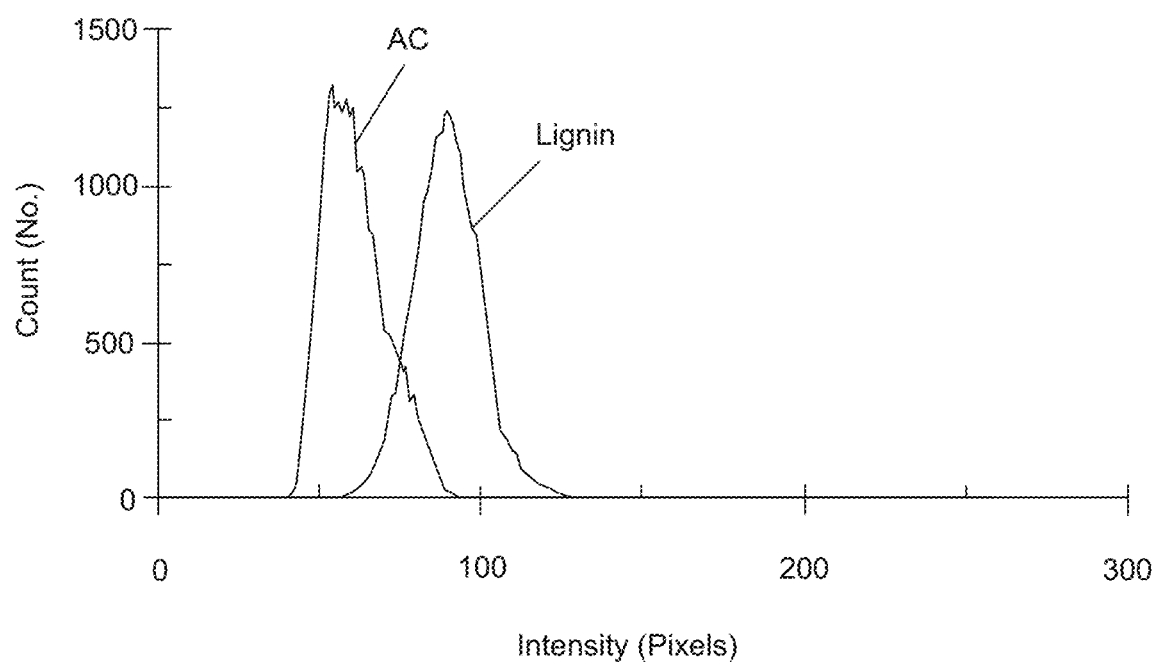
FIG. 5 illustrates a comparative histogram plot of count of particles (Y-axis) versus intensity (pixels) for the AC and lignin-based supercapacitors based on high-resolution synchrotron X-ray tomographic images.

FIG. 5 shows the plot of pixel counts versus the intensity of the pixels for AC-based and lignin-based supercapacitors. It can be seen that the peak of the lignin curve occurs at 87 pixels, while that of the AC curve occurs at 59 pixels. The mean of the AC curve as seen from Table 1 is 60.62, while that of the lignin curve is 87.13 pixels. This implies that on average lignin has a higher intensity, which is proportional to the number of functional groups present in lignin with comparatively higher values of K-edge as compared to AC. Also, from Table 1, the AC-based supercapacitor has both minimum (40 pixels) and maximum (99 pixels) values of intensities lower than that of the lignin-based supercapacitor with corresponding values of 54 and 125 pixels. The right-shifted curve of the lignin in FIG. 5 also indicates this. This is evidence of lignin particles providing higher resistance to the penetrating X-rays compared to AC particles. This is expected because of the more elongated and complex nature of lignin polymer chains as compared to that of AC molecules. This fact is also reiterated by the value of the aspect ratio (AR), which is the ratio of the major to the minor axis when the particles are fit with an elliptical shape. The AR values from Table 1 for AC and lignin particles are 3 and an extremely small number (NaN), respectively. Thus, a very low value of AR for lignin particles suggests that the particles are very wide or elongated compared to their length, i.e., the minor axis is long, and the major axis is minuscule compared to it. This is also seen from the value of the round parameter, which is the inverse of AR in Table 1. Integrated density (Int. Den.) in Table 1 shows the sum of total pixels in the plots of AC and lignin. A higher value of Int. Den. is indicative of higher surface packing density of molecules. It is seen from Table 1 that the Int. Den. value of lignin (1 874 122) is higher than that of AC (1 606 997) by a factor of 16.6%. Thus, there is more surface mass distribution in the lignin supercapacitor. A positive value of the skewness (skew) parameter indicates that the curve has a tail extending to the right of the center of mass. As seen from Table 1, a higher value of skew for AC (0.59) means it has a longer tail than that of lignin (0.09). Thus, the lignin-based supercapacitor has a distribution that is closer to Gaussian distribution than the AC-based supercapacitor. Hence, the lignin-based supercapacitor is a better Gaussian surface. This is also seen from a negative value of kurtosis (Kurt) for the AC-based supercapacitor. The negative value suggests a more flat surface. A positive value of Kurt for the lignin-based supercapacitor is indicative of a more peaked distribution. Hence, it can be argued that on an average, the lignin-based supercapacitor has a surface, which is rougher than that of the AC-based supercapacitor. Higher surface packing density is required for achieving a higher energy density of the supercapacitor, while low surface roughness helps in better interfacial contact for improved charge transport. Thus, it was observed that using lignin and AC combination in the AC/lig-MnO$_2$ supercapacitor has a distinct advantage of the higher surface packing density of lignin and low surface roughness of AC. The elongated shape of the lignin fibers imparts added advantage of the reduction in a surface void fraction, which further reduces internal resistance to ion transport within the active material.

Figure 6A:
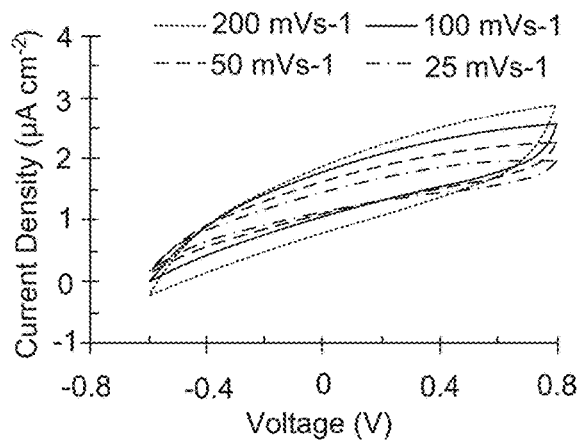
FIGS. 6A-6E illustrate three-electrode tests for the AC and AC/lig-$MnO_2$ electrodes: cyclic voltammetry (CV) plots for the AC (FIG. 6A) and AC/lig-$MnO_2$ (FIG. 6B) electrodes at varying scan rates; voltage versus time plots for the AC (FIG. 6C) and AC/lig-$MnO_2$ (FIG. 6D) electrodes at varying current densities; and the specific capacitance versus current density plots for the AC and AC/lig-$MnO_2$ electrodes (FIG. 6E).
Figure 6B:
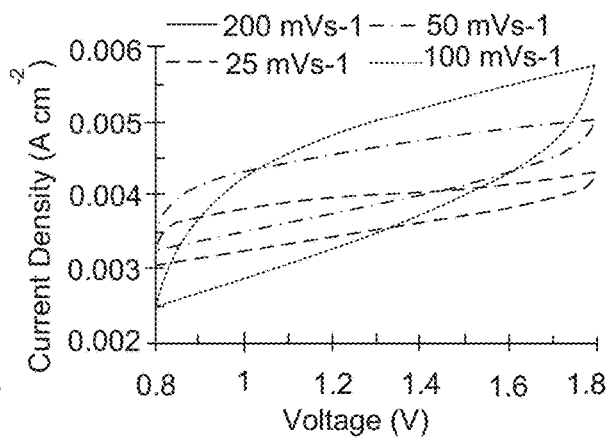
Figure 6C:
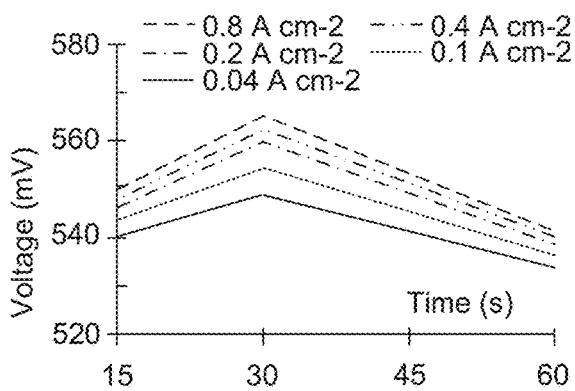
Figure 6D:
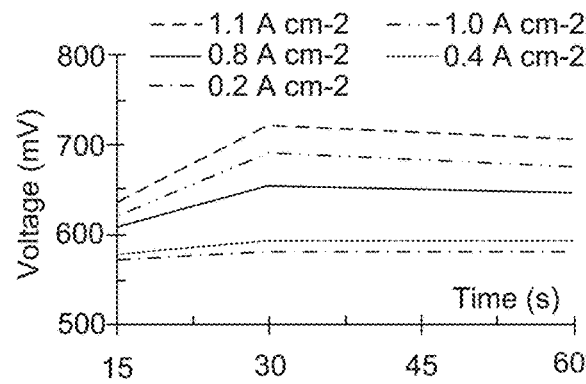
Figure 6E:
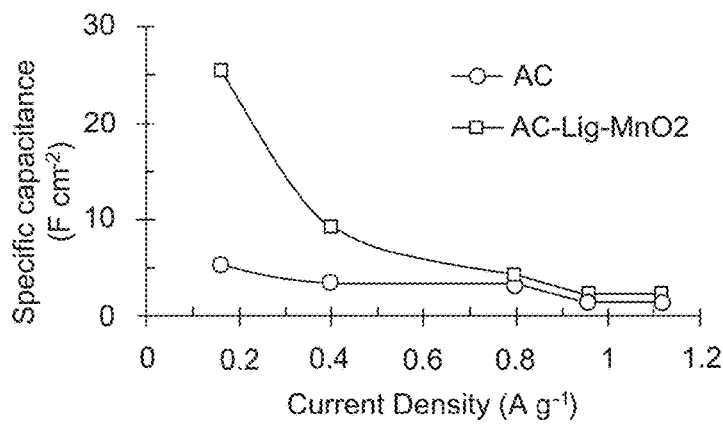

For the three-electrode test, the reference electrode used was Ag(s)/AgCl (aq.) and the counter electrode was graphite rod. For the working electrode, either the AC-based electrode or the composite AC/lignin-MnO$_2$ electrode was used in a three-electrode electrochemical test setup using the H$_3$PO$_4$ (85 wt %) electrolyte. The results are shown in FIG. 6. The optimal working electrode potential range for the AC electrode was in the range −0.6 to 0.8 V (FIG. 6A). The CV curves showed good cyclability at various scan rates tested (25, 50, 100, and 200 mV s$^{-1}$). For the composite working electrode, i.e., AC/lignin-MnO$_2$, the optimal potential window was 0.8-1.8 V (FIG. 6B) and it showed good cycle performance for the scan rates tested (25, 50, 100, and 200mVs$^{-1}$). The discharge voltage versus time plot for the AC electrode (FIG. 6C) showed a steeper slope for the voltage decline at higher current density. The same was observed for the AC/lignin-MnO$_2$ electrode (FIG. 6D) though the rate of voltage decline was comparatively less steep than that of the AC electrode. The specific capacitance versus current density plot (FIG. 6E) showed the tendency of each electrode's specific capacity to fall at higher current densities. The corresponding value of specific capacitance at any current density for the composite AC/lignin-MnO$_2$ electrode was higher than that of the AC electrode. These results suggested to use the AC electrode as the negative electrode and the composite AC/lignin-MnO$_2$ electrode as the positive electrode when testing for the electrochemical performance of the supercapacitor in two-electrode tests.

To test the electrochemical performance of the supercapacitor, both cyclic voltammetry (CV) and cyclic charge-discharge (CCD) experiments were performed. In the CV experiment, the supercapacitor was cycled keeping the voltage window (1-2 V) and scan rate (10 mV s$^{-1}$) constant. In the CCD experiment, the current density (6.01 mA g$^{-1}$) was kept constant for 2000 cycles. The results from these two experiments give a holistic picture of the electrochemical behavior of the supercapacitor.

For comparison, the CV curves obtained at scan rates 5, 10, 25, and 100 mV s$^{-1}$ are shown in FIG. 7A. The CV characteristics are better at 10 mV s$^{-1}$ than at 5 mV s$^{-1}$ or 100 mV s$^{-1}$, which can be seen by a more rectangular-shaped curve at 10 mV s$^{-1}$. At scan rates higher than 10 mV s$^{-1}$, the scan voltage rate is too fast, while for the scan rate lower than 5 mV s$^{-1}$, it is too slow for a stable system dynamics. Thus, the ideal scan rate is 10 mV s$^{-1}$, which is selected to perform the cyclic voltammetry for longer runs. This fact is also evidenced by the specific capacitance obtained at varying scan rates and shown in FIG. 7B. The average value of specific capacitance for the Orig 2x:x:y sample obtained at 10 mV s$^{-1}$ is 173 F g$^{-1}$ (23.01 mF cm$^{-2}$), which is the highest, while that obtained at 100 mV s$^{-1}$ is 37.16 F g$^1$ (4.92 mF cm$^2$), which is the least. It is also important to ascertain the operating voltage window for the cyclic voltammetry experiment. FIG. 7C shows the obtained specific capacitances at several voltage ranges for a scan rate of 10 mV s$^{-1}$. It is seen that the highest average specific capacitance is obtained in the voltage range of 1-2 V. As a part of further analysis, the voltage-time (FIG. 7D) and current-time (FIG. 7E) plots are shown for the first few cycles for the supercapacitor as observed in the CV experiment. The voltage variation remains constant with the cycle indicating that the voltage was varied constantly as expected to obtain the current flow in the device. Each cycle starts at a value of voltage equal to 1 V, which then goes to 2 V. After this, the electrode polarity is reversed, and the voltage tends to decay with a negative slope to the final value of 1 V. For each cycle of voltage variation, the corresponding current is developed in the supercapacitor, which is dependent on the electroactive material, electrolyte, and the design of the supercapacitor. From FIG. 7E, it is seen that the current developed in each cycle follows closely the cyclical pattern of the voltage; however, the curve is not linear with respect to time, unlike the voltage. In general, the discharge part of the current, which is the current recorded after the electrode reverses its polarity for any cycle, is relatively steeper than the charging current. This means that the supercapacitor discharges more quickly than it gets charged. Also, the current in the first cycle is the highest. Current falls gradually below its highest value of the first cycle in subsequent cycles. This is expected with the gradual decay of the active material in the supercapacitor due to electrochemical reactions.

Figure 8A:
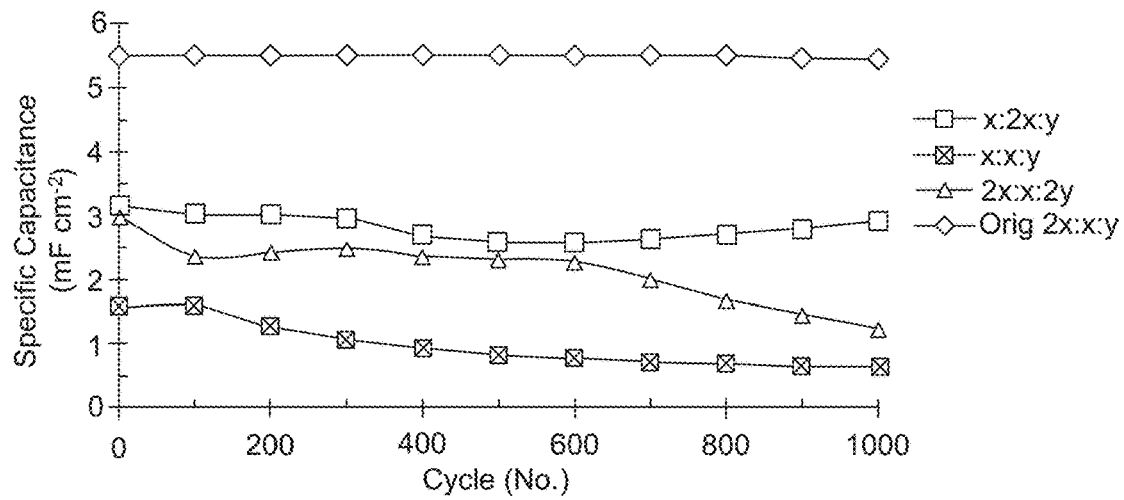
FIGS. 8A-8C illustrate for AC:lignin:$MnO_2$ samples named x:x:y, x:2x:y, 2x:x:2y, and Orig 2x:x:y.
Figure 8B:
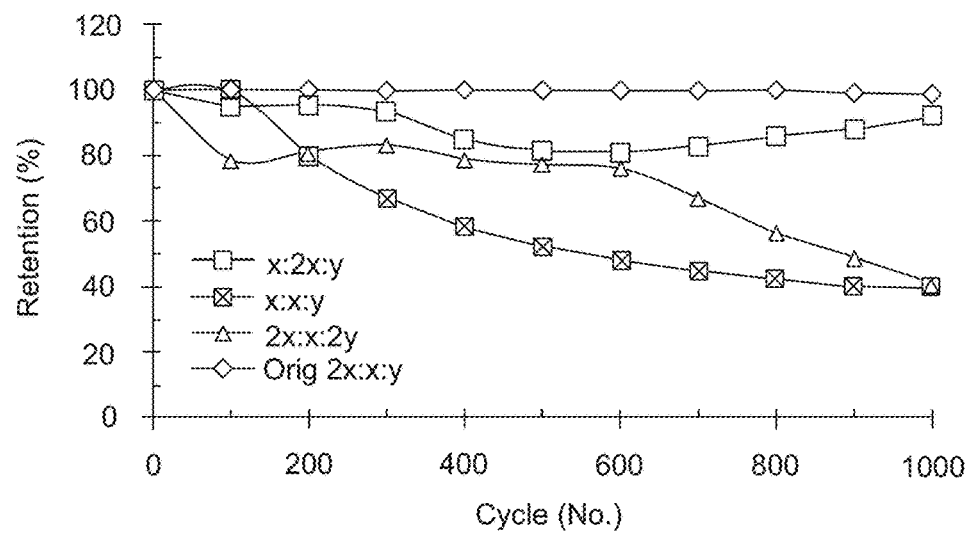
Figure 8C:
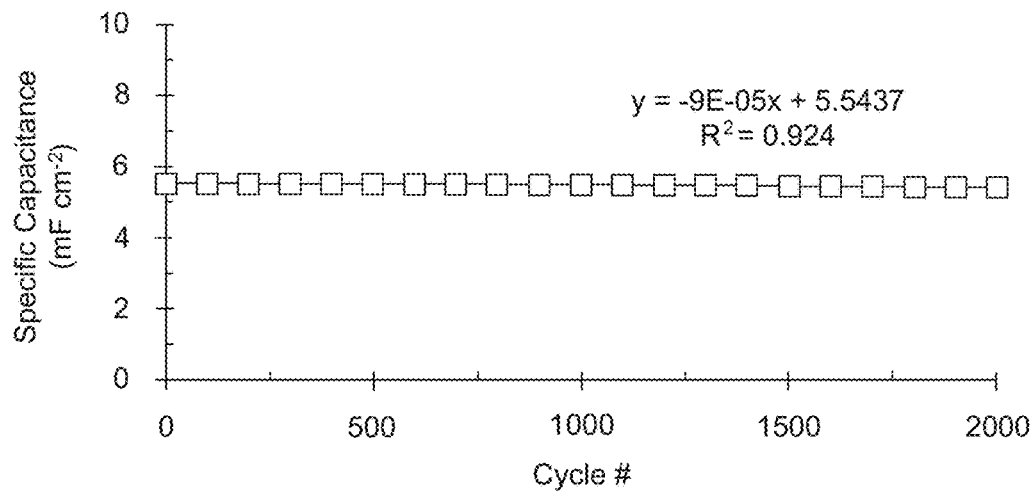

To assess the capacitance performance of the supercapacitors with varying AC:lig:$MnO_2$ proportions, a cyclic charge-discharge experiment was carried out at the same current density of 6.01 mA $g^{-1}$ for 1000 cycles each. The samples were named in the order AC:lig:$MnO_2$, where x=0.5 g and y=47.5 μmol concentration of $MnO_2$. For instance, x:2x:y symbolizes 0.5 g of AC, 1 g of lignin, and 47.5 μmol concentration of $MnO_2$. The variation of areal specific capacitance with cycles is shown in FIG. 8A. Areal specific capacitance retention is shown in FIG. 8B. It is seen from FIG. 8A that the areal specific capacitance for the sample Orig 2x:x:y is the highest throughout (about 5.5 mF $cm^{-2}$) followed by the samples x:2x:y, 2x:x:y, and x:x:y in the order of the greatest to the least. As seen from FIG. 8C, the order of the final retention also follows the order Orig 2x:x:y, x:2x:y, 2x:x:y, and x:x:y. On comparing samples x:x:y and 2x:x:y, it can be observed from FIG. 8A that the latter has a higher specific capacitance and higher retention (FIG. 8B) than the former throughout. Thus, on increasing the relative ratio of AC, the areal specific capacitance and the retention both increase. Similarly, on comparing the samples x:x:y and x:2x:y, it can be observed that on increasing the relative ratio of lignin, the specific capacitance increases (FIG. 8A) and so does the retention (FIG. 8B). However, this increase in specific capacitance and retention is lesser when the AC ratio is increased. For instance, the initial areal specific capacitance for the samples x:2x:y is 3.16 mF $cm^{-2}$ (retention=91.77%) as against 5.52 mF $cm^{-2}$ (retention=98.7%) for the sample Orig 2x:x:y indicating that the effect of increase of AC on the specific capacitance and retention is more pronounced than lignin. Comparing samples Orig 2x:x:y and 2x:x:2y, it is seen that increase in $MnO_2$, concentration has a drastic effect on the areal specific capacitance, and, as such, there is a decrease of about 73% in the initial value of areal specific capacitance for the 2x:x:2y (specific capacitance=2.99 mF $cm^{-2}$) sample compared to the sample Orig 2x:x:y (specific capacitance=5.52 mF $cm^{-2}$). Final retention for the sample 2x:x:2y is about 41% showing that the increase in $MnO_2$ also hampers retention. As a consequence of the above comparison, it was found that the sample having the best areal specific capacitance and retention was Orig 2x:x:y. This indicated that a higher relative ratio of AC compared to lignin, and an optimal $MnO_2$ concentration was necessary to obtain both the highest specific capacitance and the highest retention among the samples. In accordance with this result, the best sample Orig 2x:x:y was further run at a current density of 6.01 mA $g^{-1}$ until 2000 cycles (FIG. 8C). A regression linear model with a negative slope close to zero ($-9\times10^{-5}$), as shown on the plot, indicates at the negligible progressive decline of the areal specific capacitance with cycles. A high value of the coefficient of determination, $R^2$=0.92, shows good fit of the linear model with the trend of the plot. The initial areal specific capacitance is 5.52 mF $cm^{-2}$, which remains nearly constant throughout the 2000 cycles. The final value is 5.38 mF $cm^{-2}$. Thus, there is only a marginal decline in the areal specific capacitance. The maximum energy density obtained for this sample was 14.11 Wh $kg^{-1}$ and the power density was 1 kW $kg^{-1}$.

A more detailed comparison of the electrochemical performance of the fabricated AC/lig-$MnO_2$ supercapacitor is shown in Table 2. It is to be noted that electrochemical performance comparison for the exact same material (Al/AC/lignin-$MnO_2$), in this case, is not possible since it is a new material. However, some reports from the literature, for supercapacitors, are shown in Table 2 to present a comparison with other sources. It can be seen from Table 2 that the obtained specific capacitance of the present work (SPCP) to the specific capacitance of those currently available (SPCG) ratio varies from 0.36 to 13.6, which is remarkable. Thus, the supercapacitor sample Orig 2x:x:y has an electrochemical performance, which is not only at par with those reported but even better than many others.

TABLE 2

Comparison of the Al/AC/lig-$MnO_2$ supercapacitor's electrochemical performance with those currently available.

| | Materials | Max. Specific Capacitance (SPC) | SPCP/SPCG[a] | Energy Density (Wh $kg^{-1}$) | Power Density (W $kg^{-1}$) |
|---|---|---|---|---|---|
| Substrate | | | | | |
| Al | AC-lignin-$MnO_2$ | 5.51 mF $cm^{-2}$ at 6.01 $mAg^{-1}$, 2000 Cycles | 1 | 14.11 | 1000 |
| Ti | CNT | 1.84 mF $cm^{-2}$ at 1 mA, 1000 Cycles | 3.0 | | |
| Carbon | $MnO_2$//$MoO_3$ | 4.86 mF $cm^{-2}$ at 0.5 mA $cm^{-2}$, 3000 Cycles | 1.13 | | |
| Fabric | | | | | |
| PET | N-Doped rGo | 3.4 mF $cm^{-2}$ at 0.5 μA $cm^{-2}$, 2000 Cycles | 1.62 | | |
| PET | β-Ni(OH)$_2$/Graphene | 2.57 mF $cm^{-2}$ at 0.2 A $m^{-1}$, 2000 Cycles | 2.14 | | |
| FTCF | rGO/PANI | 6.4 mF $cm^{-2}$ at 0.08 mA $cm^{-2}$, 2000 Cycles | 0.86 | 7.07 | 707 |
| PET | $SnSe_2$ | 0.406 mF $cm^{-2}$ at 20 mA $m^{-2}$, 1000 Cycles | 13.6 | | |

[a]SPCP/SPCG is the ratio of specific capacitance of the present Example (SPCP) and specific capacitance of those currently available (SPCG).

Figure 9A:
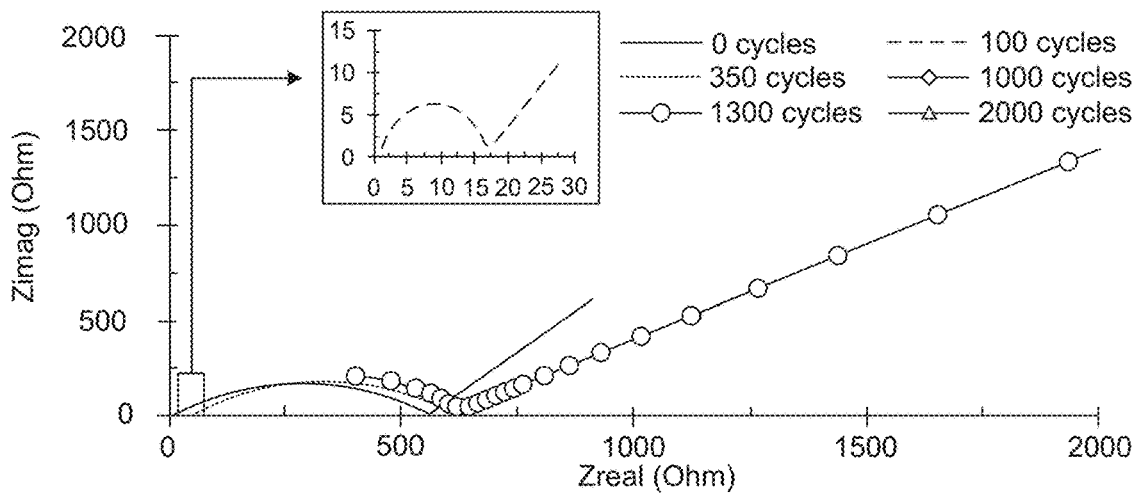
FIGS. 9A-9C illustrate electrochemical impedance spectroscopy (Nyquist plots) of: the Orig 2x:x:y sample at the beginning, after 100th cycle, 350th cycle, 1000th cycle, 1300th cycle, and 2000th cycle (FIG. 9A); and comparative Nyquist plots for the samples x:2x:y, x:x:y, and Orig 2x:x:y at (FIG. 9B) the beginning (1st) cycle and (FIG. 9C) at the end (1000th cycle).
Figure 9B:
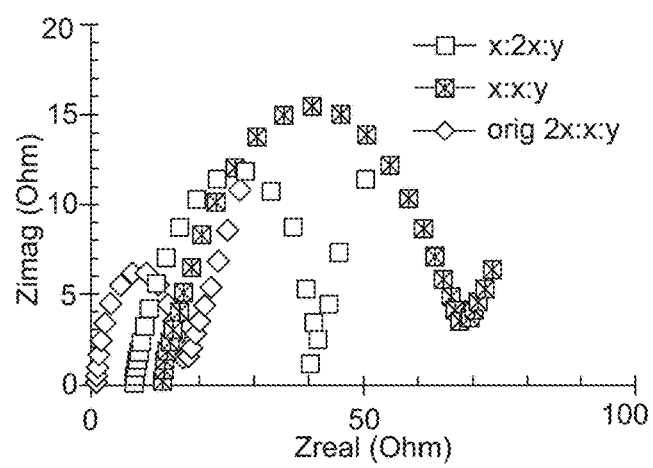
Figure 9C:
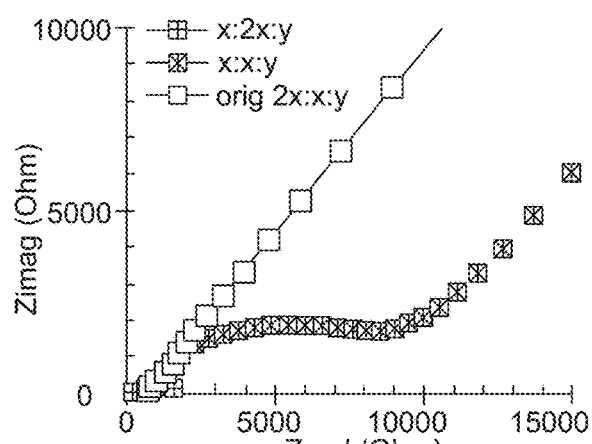

Electroimpedance spectroscopy was carried out to understand the impedance behavior of the supercapacitor, and accordingly, the Nyquist plots are obtained and shown in FIG. 9. For the sample Orig 2x:xy, as seen from FIG. 9A, the total impedance after the 100th cycle is 558Ω, which is greater than 17.3Ω, the value at the beginning. Similarly, the impedance after the 350th cycle, which is 593Ω, is greater than that after the 100th cycle. The impedance values after the 1000th, 1300th, and 2000th cycles recorded were 613, 628, and 638Ω respectively, which are interestingly very close and differ only slightly. This indicates that after about 1000 cycles, the cumulative impedance of the electrolyte and the double-layer capacitance hits a threshold value, and the difference in current occurring is largely due to the kinetic diffusion resistance offered by the electroactive material. Nevertheless, as would be expected, the impedance values follow the trend 0th, 100th, 350th, 1000th, 1300th, and 2000th from the least to the greatest. This indicates that with the progression of cycles, the resistance to current flow increases, and hence it results in lesser current flow and lesser capacity retention toward a higher cycle number. The rate at which impedance develops, however, is steeped in the beginning, i.e., from the 1st to the 350th cycle, and then declines rapidly from the 1000th to the 2000th cycle. As can be seen from FIG. 9B, for the Orig 2x:x:y sample, the total impedance (16.7Ω), as indicated by the intersection of the semicircle with the x-axis, is the least compared to the samples x:2x:y (40.3Ω) and x:x:y (69.3Ω) at the beginning (1st cycle). This justifies as to why the corresponding specific capacitance is the highest for the Orig 2x:x:y sample in the beginning (FIG. 9A) due to the least overall impedance to charge transfer in this sample compared to other samples. The corresponding impedance for the samples at the end of 1000 cycles (FIG. 9C), follows the trend Orig 2x:x:y (613Ω), x:2x:y (931Ω), x:x:y (9020Ω) from the least to the greatest. This too justifies as to why the corresponding specific capacitance is the highest for the Orig 2x:x:y sample after 1000 cycles (FIG. 9A) due to the least overall impedance to charge transfer in this sample compared to other samples.

To observe the impact of current density on the resultant discharge voltage in the cyclic charge-discharge experiment, FIG. 10A is obtained. The resultant voltage curves are obtained at various current densities of 1.2 mA $g^{-1}$, 3.01 mA $g^{-1}$, 6.01 mA $g^{-1}$, and 9.01 mA $g^{-1}$. The key point of interest here is the rate of decline (slope) of the discharge voltage curves at varying current densities. It is seen that the higher the current density steeper is the slope of the voltage-time curve. Thus, at higher current density, the voltage drop is at a higher rate. This is expected behavior for any supercapacitor. To obtain the effect of discharge current density on specific capacitance, FIG. 10B is obtained for a constant charge current of 2 mA. As seen from FIG. 10B, specific capacitance declines with increasing discharge current density. This too is reflective of the behavior of any supercapacitor.

A Ragone plot (FIG. 10C) is shown for the supercapacitor, which shows the variation of the energy density with the power density at varying current densities as obtained from the cyclic charge-discharge experiment. The nature of the curve is consistent with those reported for $MnO_2$-based supercapacitors.

Here, there is a concave upward decline instead of the usual convex upward decline for the energy density. The Coulombic efficiency of a supercapacitor, which depicts, in general, how well the device is transferring charge, is shown in FIG. 10D. The initial Coulombic efficiency is high around 80%. At around 200 cycles, this value falls to 62%. From 500 to 1000 cycles, the value gradually rises to a value of 85%. Such a rise in Coulombic efficiency is not surprising and reported for capacitors. Thus, the supercapacitor has good charge-transfer characteristics in the beginning with a phase of gradual but slow decay in Coulombic efficiency. After 1000 cycles, the Coulombic efficiency hits an almost constant value. The value of the Coulombic efficiency after 1000 cycles is greater than 90% on average. This is significant since it suggests that the super-capacitor material progressively gains a more stable charge transferability. The value toward the end of 2000 cycles is about 98%, which is both remarkable and desirable for practical applications.

Conclusion. A solid-state, lightweight, low-cost, and plant-based flexible supercapacitor has been successfully fabricated. With Al/AC/lig-$MnO_2$ as the anode and Al/AC as the cathode, the flexible supercapacitor was assembled using the PVA/$H_3PO_4$ gel-based electrolyte.

Characterization includes micro-CT tomography and scanning electron microscope. The capacitance performance was conducted using an electrochemical setup. A series of composition of AC:lignin:$MnO_2$ were tested to arrive at the optimal proportions of these constituents for best electrochemical performance. The results are highlighted in the following.

Use of lignin (anode) in combination with AC (cathode) imparts distinct advantages in terms of: (1) higher surface packing density: as observed from the higher value of the Int. Den. parameter for lignin in the microtomography image analysis. The higher surface packing density of the active material helps in achieving higher energy density for the supercapacitor. (2) Stability of the interface: the smoother AC particle surface, as observed by the negative kurtosis value for AC as against a positive value for lignin, helps in strong attachment of the cathode layer with the electrolyte layer resulting in better contact for electrochemical reactions. (3) High contact area: the high porosity of AC particles, as seen from the SEM image, adds the advantage of the enhanced surface area of contact. (4) Strong adhesion: the even distribution of AC particles, as observed from SEM images, adds to better attachment due to adhesion.

Electrochemical study through cyclic charge-discharge shows that for 2000 cycles, the maximum areal specific capacitance obtained at 6.01 mA $g^{-1}$ is 0.5.52 mF $cm^{-2}$, which is up to 13 times higher than reported. Retention is 98.7% after 1000 cycles and 97.5% after 2000 cycles. The maximum energy and power densities obtained are 14.11 Wh $kg^{-1}$ and about 1 kW $kg^{-1}$, respectively. A high Coulombic efficiency of 98% was obtained after 2000 cycles. Due to the synergistic effect of activated carbon, lignin, and $MnO_2$, the fabricated AC/lig-$MnO_2$ super-capacitor has superior performance than reported. Such electrochemical performance of this supercapacitor makes it useful for a wide variety of device applications, which employ flexible supercapacitors.

This work thus not only demonstrates the distinct advantage of using lignin in combination with AC but also explores the surface morphology feature of the electrode surface. Moreover, optimization of all constituents of the super-capacitor is done to quantitatively justify the use of these constituents and to obtain consistent performance. In view of the fact that it is not only cumbersome but also a challenging task to commercialize the use of bioderived materials for electronics owing to instabilities in electrochemical performance, this work makes a prudent attempt to obtain an enhanced and consistent electrochemical performance through cost-effective measures. The two key and essential outcomes emphasized in this work are: (i) a combination of bioderived materials in certain specific ratios can have tremendous effect on the capacity performance and retention of supercapacitors and (ii) through optimization of constituent ratios, it is possible to obtain electrochemical performance, which is not only at par with many state-of-art devices but even better in many cases.

Due to the simple and cost-effective method used and raw materials derived from green sources, this work could mark an important step toward green technology development. Besides, this work used a novel fabrication route of using a plant-based raw material in solid-state flexible supercapacitors.

Example 2: NiWO$_4$ Nanoparticle Decorated Lignin as Electrodes for Asymmetric Flexible Supercapacitors In order to meet the increasing energy demand, a flexible, lightweight, and highly organized energy management strategy is needed for flexible supercapacitors. With that perspective, an anode electrode has been designed by depositing NiWO$_4$ nanoparticles on lignin (lig) on an aluminum substrate. A supercapacitor was assembled by using Al/lig-NiWO$_4$ as the anode, Al/AC (activated carbon) as the cathode, and poly(vinyl alcohol) (PVA)/H$_3$PO$_4$ gel as the electrolyte. Superior electrochemical performance was achieved even after 2000 cycles of charge and discharge study. The maximum specific capacitance at 0.13 A g$^{-1}$ is 17.01 mF cm$^2$, which is more than 42 times that reported. The capacitance retention is maintained at about 97% after 1000 cycles, and at 84% after 2000 cycles. The maximum energy and power densities are 2 W h cm$^{-2}$ and 100 W cm$^{-2}$, respectively. A series of the composition of lig:NiWO$_4$:polyvinylidene difluoride (PVDF) was tested to optimize the electrochemical performance. It was found that the best performance was achieved for the ratio (10:80:10) that had predominantly NiWO$_4$ nanoparticles. The remarkable electrochemical performance of this new class of capacitors makes them useful for a wide variety of electronics.

Introduction. Finding new, effective, and sustainable solutions to the challenges posed by future energy storage technologies is crucial for economy and environment. Materials for energy storage, such as in lithium-ion batteries, have been extensively studied in research. Batteries and supercapacitors have been the key focus for enhancing energy storage. As per a recent study, microstructures and configurations have a profound influence on the performance of an electrode, and this enables these design of new electrodes in the present work.

Supercapacitors made out of bio-waste present a potentially viable and exciting solution to waste reduction and sustainable energy technology growth. Supercapacitors have the advantage of higher specific capacitance, energy density, and power density over the conventional dielectric capacitors. An all-solid-state supercapacitor is highly sought due to its ease of portability and use. Additionally, the use of solid-state supercapacitors eliminates the safety risk posed by conventional liquid electrolytes, which are combustible and bulky. Accordingly, solid-state supercapacitors have been widely researched. Due to exponential growth in the demand for wearable electronics, there has been a rising demand for flexible electronics. Flexible devices offer the advantage of being used under conditions of additional strain without diminished performance. The range of application of wearable flexible electronics is huge, ranging from human wearable watches and clothing to sensors used in automobiles. As such, a number of research efforts have been directed towards the fabrication, design, and synthesis of solid-state flexible supercapacitors. The asymmetric design of a supercapacitor is beneficial in extending the potential window by employing one electrode for faradaic reactions, and the other as a capacitor for improved power density.

Biomass-derived materials have been used for electrochemical applications for quite some time now owing to their environmental benefits. However, there are serious challenges for biomass made electrodes in terms of poor packing density, unoptimized pore structure and distribution, unknown surface chemistry that can affect electrochemical performance, retention, stability, and long term usage. Moreover, such usage also creates problems of electric waste, bio-degradability, processing cost, and scalability. These challenges have not only made commercialization of biomass-based electrochemical devices difficult, but they have also raised concerns over the potential of biomass materials as a whole for electrode applications. Besides, the source, extraction, and processing steps involved in obtaining bio-derived carbon materials are crucial factors that impact device performance and usability. Accordingly, there is an urgent need to address these issues through an innovative and rigorous approach that is consistent with the principles of green chemistry. Lignin is a natural biopolymer abundantly available in plants. It is often produced in huge quantities as a waste product of the pulp and paper processing industries. Alkaline lignin, which is produced via alkaline hydrolysis, was directly purchased and used in this study. Lignin is the conductive material used as a composite electrode. Because of its cheap availability, carbon backbone, and conductive nature, it acts as an excellent sustainable substitute for other carbon materials.

Metallic oxide nanoparticles are considered to be an important area of intensive research, owing to their unique properties and potential applications. Due to their high surface to volume ratio, these materials exhibit fascinating properties. Considering various types of metals and metal oxide NPs, the transition metal oxides have a tendency to exhibit a wide variety of structures. Transition metal oxides such as MnO$_2$, ZnO, CoO, NiO, RuO$_2$ and CuO are widely favored candidates for supercapacitor applications. They are generally used in combination with other electroactive materials like carbon, carbon nanotubes (CNTs), carbon fibers, and carbon nanospheres owing to their remarkable ability to enhance charge transport. Such a combination leads to a higher specific capacitance in comparison to the electric double-layer capacitors (EDLCs). This is due to the enhancement of the interfacial faradaic type reactions. Due to its abundance and safety, MnO$_2$ is widely used in pseudocapacitor applications. But, utilizing MnO$_2$ in bulk form is limited due to its high electrical resistance (conductivity of MnO$_2$ is in the range of 10$^{-5}$-10$^{-6}$ S cm$^{-1}$). To address this challenge, other novel classes of transition metal oxides with higher oxidation states of elements are highly favored for enhancing pseudocapacitance. Nano-sized transition metal oxides, in particular, have the potential of higher substrate permeability, and high surface area to volume ratio, which leads to a greater contact area for electrochemical reactions. Due to their low cost, facile preparation method, high theoretical specific capacitance, excellent electrochemical reversibility, and abundant availability, Nickel-based materials have been considered as one of the most important electrode candidates. Being a transition metal oxide, it possesses pseudocapacitance properties and hence is a suitable alternative for pseudocapacitor applications. The presence of nickel adds substantially to the conductivity of this transition metal oxide when compared to the traditionally used $MnO_2$. In addition, the high mechanical stability, a narrow bandgap of conduction, and promising electrochemical properties of divalent metal tungstate like $NiWO_4$ nanoparticles make them work, $NiWO_4$, a novel type of transition metal oxide nanomaterial, is synthesized and decorated on bio-derived alkali lignin for supercapacitor application.

In this Example, a quasi-solid state, plant-based supercapacitor was fabricated, assembled, tested and optimized for the best performance for applications in flexible electronics. The supercapacitor is lightweight, low-cost, and made with an inexpensive fabrication process. The asymmetric supercapacitor is made up of $NiWO_4$ decorated lignin (lig) as the active material. SEM characterization was done to observe the $NiWO_4$ particle size. EDS and XPS characterizations were carried out to confirm the elemental composition and elemental nature of the $NiWO_4$ material. With Al/lig-$NiWO_4$ as the anode and Al/AC as the cathode, the flexible supercapacitor was assembled using a PVA/$H_3PO_4$ gel-based electrolyte. The details of fabrication and assembly are provided below. Additionally, high-resolution synchrotron microtomography (m-CT) imaging of the AC and the lignin-based electrode was done to obtain microscopic details of the particle morphology. The electrochemical performance was assessed using cyclic charge-discharge (CCD), cyclic voltammetry (CV), and Electrochemical Impedance Spectroscopy (EIS). Further details of the electrochemical experiment set up are detailed below. Further, discussion below also covers in detail the findings of all characterization results and electrochemical analysis. A series of experiments was also carried out to find the optimal constituent ratio for the lig-$NiWO_4$ samples. After 2000 cycles of charge and discharge, the maximum specific capacitance at 0.13 A $g^{-1}$ is 17.01 mF $cm^{-2}$, which is up to 42 times that reported. The capacitance retention is maintained at about 97% after 1000 cycles. The maximum energy and power densities are 2 W h $cm^{-2}$ and 100 W $cm^{-2}$, respectively. The relatively remarkable electrochemical performance of this plant-based supercapacitor makes it useful for a wide variety of device applications that employ flexible supercapacitors. Due to the relatively simple, cost-effective methods used, and raw materials derived from green sources, this work could mark an important step towards green technology development.

Synthesis of Nickel Tungstate ($NiWO_4$) Nanomaterials. Nickel tungstate was prepared by a simple wet chemical route at room temperature. For this synthetic route, 0.5 M nickel acetate tetrahydrate (Sigma-Aldrich, India) was mixed with 100 ml of distilled water to get a homogeneous solution under magnetically stirred condition. Similarly, 0.2 M sodium tungstate (Sigma-Aldrich, India) was mixed with a required amount of distilled water. A homogeneous solution of sodium tungstate was added in a dropwise manner into the aforementioned nickel acetate solution. A greenish-blue precipitate was observed. The mixture was maintained under stirred conditions for 1 h and the obtained precipitate was centrifuged and dried. The corresponding synthetic method is portrayed in FIG. 11.

Preparation of Al/lig-$NiWO_4$ Composite Electrode. The $NiWO_4$ nanoparticles were added to lignin (alkaline, TCI, density=50 g$l^{-1}$, pH=8-10) and mixed with PVDF in 3 different molecular weight ratios of lig:$NiWO_4$:PVDF to form three sample mixtures. The 3 ratios chosen were 80:10:10 (L-80), 45:45:10 (L-45), and 10:80:10 (L-10). After this, 2 ml of NMP (Sigma. Aldrich, density=1.028 g $ml^{-1}$, Mw=99.13 g $mol^{-1}$, >99% pure) was added to each of the aforementioned sample mixtures to form the slurry. The slurry was coated on an aluminum foil (0.98 mm thick) substrate cut in the form of a circular plate of diameter 4 cm.

The adjoining strips of the foil were 1 cm wide and 3 cm long and could be flexibly used over a 360° angle, thus imparting flexibility to the supercapacitor. The coated foil was heated in a vacuum oven for 4 hours at 100° C. to obtain the Al/lig-$NiWO_4$ composite electrode.

Preparation of PVA/$H_3PO_4$ Gel Electrolyte. A gel-like electrolyte of PVA/$H_3PO_4$ was prepared by adding 10 ml of water to 1 g of PVA (Aldrich, Mw=85000-124000, >99% pure). It was mixed at 80° C. for 40 min. Subsequently, 0.8 g of $H_3PO_4$ (Sigma Aldrich, Mw=82.0 g $mol^{-1}$) was added and stirred for 20 min at 70° C. For the supercapacitor separator, commercial paper (Sterlitech, 3×3", W33, nitrogen-free, white) dipped in the gel was used. It had the same dimensions as the electrode.

Fabrication of Quasi-Solid State Asymmetric Supercapacitor. To fabricate the supercapacitor, the electrodes made earlier were used. The Al/lig-$NiWO_4$ composite electrode was used as the positive electrode, and Al/AC was used as the negative electrode. The asymmetric supercapacitor was then constructed by sandwiching the two electrodes with the electrolyte gel. It should be noted that since $H_3PO_4$ is used indirectly but in a blended gel form with PVA, the gel-polymer-based PVA/$H_3PO_4$ electrolyte has less potency to corrode the aluminum substrate. Moreover, aluminum has a dense native oxide layer that further protects the aluminum metal underneath from any corrosive effects of the less potent acid of the gel electrolyte.

Material Characterization. Nickel acetate tetrahydrate and sodium tungstate were procured from Sigma-Aldrich, India. The XRD analysis was done with a scanning rate of 5° $min^{-1}$ in the 2θ range of 10-90° using a Bruker X-ray powder diffractometer (XRD) with Cu $K_\alpha$ radiation (l=0.154 nm). X-ray photoelectron spectroscopy (XPS) analysis was performed by using a Theta Probe AR-XPS system (Thermo Fisher Scientific, UK). Scanning Electron Microscopy (SEM) analysis with Electron dispersive X-ray spectroscopy (EDS) was done using a Hitachi, Japan model S-3000H having a magnification of 30× to 300 k× with the accelerating voltage of −0.3 to 30 kV.

Synchrotron X-Ray Tomography (μ-CT). Synchrotron X-ray tomography was carried out at beamline 8.3.2 at the Lawrence Berkeley National Laboratory at its Advanced Light Source (ALS) facility. This was done to obtain details of electrode morphology, structure, and the interface of the supercapacitor. Using this non-destructive tool, the inner layers of electrode samples can be viewed. With the sample being rotated over 180 degrees, 3600-1800 images were taken. X-ray at 35 keV was used. For detection, a 50 mM Ce:LuAG scintillator, a Mitutoyo 5× lens, and a PCO edge sCMOS camera were used with a resolution of 1.3 microns. For reconstructing the volumes, Xi-CAM and TomoPy software packages were used. Avizo and FIJI software packages were employed for 3D visualization. The sample scans took 45 minutes for each sample. After the 2D images were concatenated, contrast enhancement was done using imageJ software. Image data analysis was carried out to understand the dependence of electrochemical performance on the morphology of the particles of the electrodes.

Figure 16C:
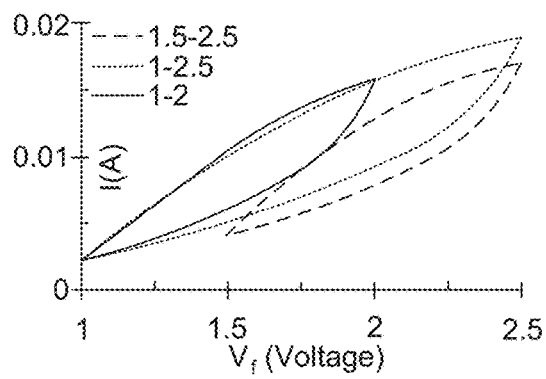
Figure 16D:
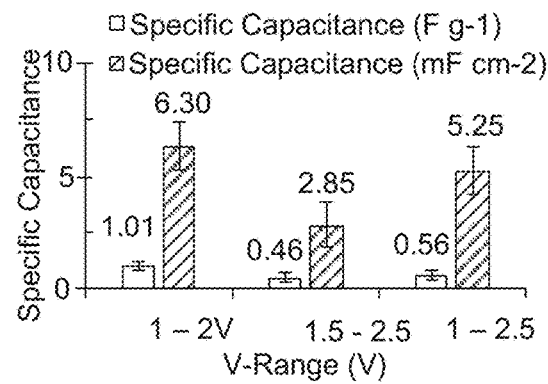
Figure 16E:
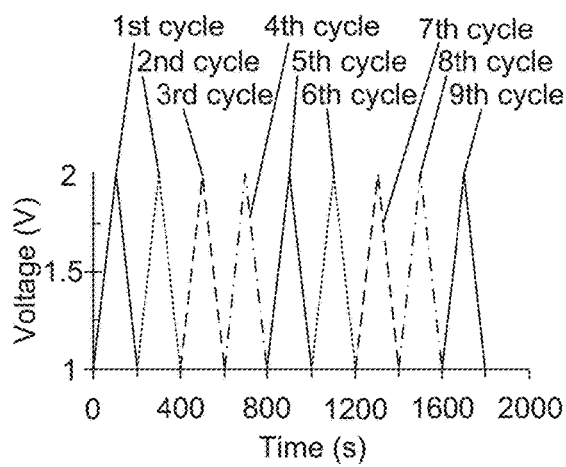
Figure 16F:
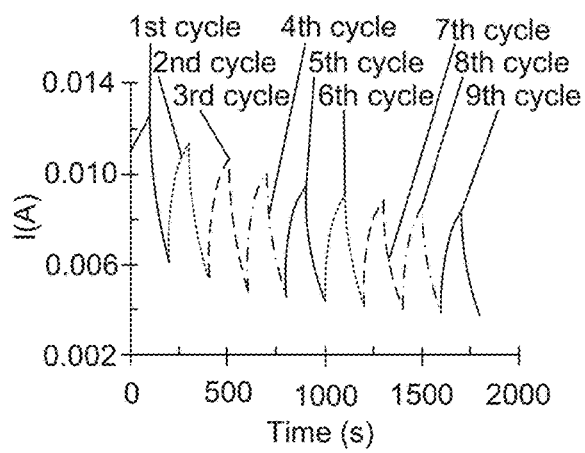

Electrochemical Experiments. Electrochemical characterization was performed using a Gamry potentiostat version 6.33. The $NiWO_4$ based electrode of the supercapacitor was used as the working (positive) electrode for the cyclic voltammetry (CV) experiment. The AC based electrode of the supercapacitor was connected to the reference and counter terminals of the potentiostat. The CV experiment was performed at various scan rates, i.e., at 10, 25, 50 and 100 mV s$^{-1}$, to assess the effect of scan rate on the supercapacitor's electrochemical performance. The voltage range of 1-2 V and the scan rate of 10 mV s$^{-1}$ were found to be optimal for the CV experiment (plots are shown in FIG. 16). To assess the supercapacitor impedance behavior, electrochemical impedance spectroscopy was carried out (using a frequency range of 10$^6$ Hz to 0.1 Hz, AC volts of 10 mV, and DC at 1 V). In the frequency range selected, all crucial high frequency-dependent steps such as the ion-transfer resistance in the electrolyte and the charge transfer resistance in the capacitive double layer are covered. The low-frequency dependent diffusion kinetics in the electrode is also covered in the selected frequency range. Nyquist plots were obtained in the beginning, and after the 500th, 1000th, 1500th, and 2000th cycle (FIG. 17C). For the cyclic charge-discharge (CCD) experiment, a current density of 130 mA g$^{-1}$ was used. For each charge and discharge cycle, a one-minute duration was provided with 20 V being the upper limit of voltage.

NiWO$_4$ Nanoparticle Characterization Results. To understand the morphological aspects of NiWO$_4$ particles, scanning electron microscopy (SEM) images were taken. Low and high magnification SEM images of NiWO$_4$ were studied. From these images, a uniform distribution and size of the material can be clearly visualized. To verify the existence of NiWO$_4$ particles, XRD was performed and the corresponding XRD pattern is shown in FIG. 12A. No sharp peaks are observed. From this observation, it is concluded that the NiWO$_4$ nanomaterials are amorphous in nature. Corresponding energy dispersive spectroscopy (EDS) analysis was carried out in order to find the elemental composition of the synthesized material and the corresponding EDS spectrum is shown in FIG. 12B. As shown in FIG. 12B, the observed elemental compositions are Nickel, Tungsten, and Oxygen with weight percentages of 15.87, 54.96 and 29.16%, respectively. High-resolution X-ray photoelectron spectroscopy (XPS) was utilized to find the elemental nature of the NiWO$_4$ material. The corresponding XPS spectrum is shown in FIG. 13A-FIG. 13D. FIG. 13A shows the survey spectra of NiWO$_4$ where the peaks for Ni 2p, O 1s, and W 4f are observed at the binding energy values of 856.6, 532.2 and 36.6 eV, respectively. FIG. 13B shows the high-resolution spectrum of Ni 2p where the peaks of Ni 2p 3/2 and Ni 2p 1/2 are observed at the binding energy values of 856.3 and 874.1 eV, respectively. This characteristic doublet was observed due to the spin-orbit coupling effect. The shake satellite peaks appeared for Ni 2p 3/2 and Ni 2p 1/2 at 826.1 and 880.1 eV, respectively. It was confirmed that Nickel is present in the oxidation state of +2. The high-resolution spectrum of W 4f is shown in FIG. 13C. The observed binding energies of 34.66, 36.83, and 40.65 eV corresponded to W 4f 7/2, W 4f 5/2, and W 5p 3/2, respectively. Thus, it was concluded that tungsten exhibits an oxidation state of +6 in the synthesized NiWO$_4$ particles. As shown in FIG. 13D, the O 1s high-resolution spectrum with binding energies of 529.8 and 531.4 eV implies the formation of metal oxide in NiWO$_4$.

Synchrotron Tomography. To understand the structure and interface of the electrode composite, a tomographic study was conducted. Literature reports on using tomography have mostly focused on observing the material structure, morphology, and pore distribution. This technique not only helps to observe the structural and morphological details of the complex 3D network of active materials, but also provides details on electrode surface features like surface packing density, roughness, void fraction, and nanoparticle distribution across the interface, all of which directly impact a supercapacitor's energy density and mechanical stability.

The 3D features of alkali lig-NiWO$_4$ have been detailed for the first time along with the corresponding effects on the electrochemical behavior of the supercapacitor. Tomography imaging of the lig-NiWO$_4$ supercapacitor electrode showed lignin particles and NiWO$_4$ particles distributed across the interface. Imaging of the NiWO$_4$ particles alone dispersed across the supercapacitor interface were also produced. Such a scan was possible due to the high K-edge of NiWO$_4$. To understand the morphology of the particles of the AC and lignin-based electrodes, two fresh and separate samples of supercapacitors were assembled. One of the supercapacitors was made up of AC while the other was made up of lignin particles. In order to get detailed information on the morphology of each particle, high-resolution synchrotron X-ray tomography was conducted on the two supercapacitors. The dispersed morphology of the lignin-based supercapacitor and the morphology of the activated carbon (AC) based supercapacitor were analyzed. ImageJ was used for analysis. For studying the detailed particle morphology, a similar 150×50 mm section was selected in both lignin-based supercapacitor AC based supercapacitor. Table 3 shows the parameters of interest, which include size, shape, surface packing density, particle circularity, particle distribution, and the measures of central tendencies.

TABLE 3

Particle morphological measurements obtained from the tomography image for the AC and lignin-based supercapacitors (SC) and NiWO$_4$ nanoparticles.

| Parameter | AC SC | Lignin SC | NiWO$_4$ |
|---|---|---|---|
| Mean | 60.96 | 82.83 | 91.267 |
| Std. Dev. | 9.29 | 10.09 | 18.557 |
| Min | 40 | 53 | 55 |
| Max | 92 | 124 | 237 |
| Circ | 0.7 | 0.6 | 0.741 |
| Int. Den. | 311 232 | 417 224 | 141 242 |
| Skew | 0.26 | −0.02 | 3.072 |
| Kurt | −1.08 | 0.85 | 11.188 |
| AR | 2.941 | 3.92 | 1.621 |

Circularity (Circ.) is represented by Eqn. 2. As shown in Table 3, circularity of lignin (0.6) is smaller than that of AC (0.7). This indicates that lignin particles, on average, are more elongated than AC particles. This is on account of a more elongated carbon chain structure and a more complex 3D orientation of chains in lignin compared to AC.

$$Circ. = 4 \times \frac{[Area]}{[Perimeter]^2} \quad \text{(Eqn. 2)}$$

The pixel counts versus the intensity of the pixels for AC based and lignin-based supercapacitor electrodes, and the NiWO$_4$ nanoparticles is captured in FIG. 14. It can be seen that the peak of the lignin curve occurs at 104 pixels while that of the AC and NiWO$_4$ curves occurs at 60 pixels and 83 pixels, respectively.

As shown in Table 3, the mean of the AC curve is 60.96 while that of the lignin curve and NiWO$_4$ particle curve is 82.83 pixels and 91.26 pixels, respectively. This indicates that lignin has a higher number of functional groups with higher K-edge values compared to AC. NiWO$_4$ particles have the highest intensity of the three, which is typical of a metal oxide displaying a higher K-edge in X-ray tomography.

As for intensity, the AC based supercapacitor has a minimum of 40 pixels and a maximum of 92 pixels (Table 3). These values of intensity are lower than the intensity values of the lignin-based supercapacitor (min=53, max=124 pixels). This is also indicated by the right shift in the lignin curve (FIG. 14). This suggests that compared to the AC particles, the penetrating X-rays face a higher resistance from the lignin particles. This indicates the presence of more complex and elongated carbon chains in lignin compared to AC. The more elongated nature of lignin particles is also evidenced by the value of the aspect ratio (AR). When particles are fit with an elliptical shape, the ratio of major to the minor axis is depicted by the aspect ratio. AR values for AC and lignin particles are 2.941 and 3.92, respectively (Table 3). The $NiWO_4$ particles have the smallest aspect ratio of the three, implying that the major and minor axes are somewhat closer to each other in length, which is characteristic of a circle. The sum of total pixels in the curves of the AC and lignin supercapacitors, and $NiWO_4$ particles is represented by Integrated Density (Int. Den.' parameter in Table 3). A higher surface packing density of particles translates into a corresponding higher value of the 'Int. Den.' parameter. The Int. Den. value of lignin (417 224) is higher than that of AC (311 232) by a factor of 25.40% (Table 3). Thus, the lignin supercapacitor has more surface mass distribution. $NiWO_4$ particles have the lowest Int. Den. value (141 242), implying that they have the least surface mass distribution of the three. This is also indicative of the fact that the $NiWO_4$ particles are more spread out through the substrate. If a distribution curve has a tail extending to the right of the center of mass, this is indicated by the positive skewness (skew) parameter. A higher positive value of skew (Table 3) for AC (0.26) indicates a longer tail compared to lignin (−0.02). This means that the surface of the lignin-based supercapacitor is a better Gaussian surface. A negative kurtosis (Kurt) value for AC suggests that the AC electrode's surface is flatter compared to that of the lignin electrode ('kurt' value is positive). The lignin electrode has a more peaked distribution, as indicated by the positive 'kurt' value, thus substantiating that the lignin electrode surface is rougher than that of AC. For achieving a higher energy density of the supercapacitor, a higher surface packing density is required. For better interfacial contact and enhanced charge transport, a low electrode surface roughness is desirable. Therefore, it is clear that using lignin and AC in combination in the Al/lig-$NiWO_4$//AC/Al supercapacitor has distinct advantages. The combination helps in attaining both a higher surface packing density (lignin electrode) and low surface roughness (AC electrode) for the supercapacitor. Within the active material, a reduction in the surface void fraction, due to the elongated lignin molecules, further reduces internal ion transport resistance. This synergistic approach of supercapacitor fabrication thus addresses the issue of the low surface packing density of materials observed with other biomass fabricated electrodes.

Electrochemical Performance. To assess the capacitance performance of the supercapacitors with varying lig:$NiWO_4$:PVDF ratios, a cyclic charge-discharge (CCD) experiment was carried out at the same current density of 0.13 A $g^{-1}$ for 600 cycles each. The samples were named according to the lig:$NiWO_4$:PVDF ratio, whereby the numbers indicate the weight percentage for each component. For instance, 10:80:10 symbolizes 10% lignin, 80% $NiWO_4$ and 10% PVDF by weight. The variation of areal specific capacitance with cycles is shown in FIG. 15A for the first 600 cycles. Areal specific capacitance retention is shown in FIG. 15B. It is clear from FIG. 15A that the areal specific capacitance for the 10:80:10 sample is the highest throughout (about 17.01 mF $cm^{-2}$) followed by the 45:45:10 and 80:10:10 samples in the order of the greatest to the least. As shown in FIG. 15B, the order of the final retention, however, follows 10:80:10>80:10:10>45:45:10. Therefore, it is observed that on increasing the weight % of $NiWO_4$, the areal specific capacitance and the retention both increase. This indicates the remarkable influence of the $NiWO_4$ nanoparticles in providing not only higher capacitance but also stability to the supercapacitor. The lig-$NiWO_4$ supercapacitor reported here is a pseudocapacitor. The lignin is the conductive carbon material and $NiWO_4$ is the transition metal oxide that imparts the pseudocapacitance property to the supercapacitor. If only $NiWO_4$ with PVDF is used, the device will not act like a supercapacitor since $NiWO_4$ (as with any transition metal oxide by itself) cannot provide the level of conduction required for a supercapacitor. The role of $NiWO_4$ is restricted to only imparting the pseudocapacitance property to the supercapacitor (due to oxidation-reduction reactions). If only lignin is used, the fabricated capacitor will mimic an EDLC type capacitor (like that of a graphite-based material). Due to the multiple and highly complex nature of functional groups in lignin, an EDLC type capacitor fabricated with lignin alone will show extreme instability and poor retention in the absence of any pseudocapacitor material ($NiWO_4$ in this case). A glimpse of such behavior is observed in the 80:10:10 sample, which predominantly has lignin. As such, it shows high instability, poor retention, and low specific capacitance compared to the other samples. Based on the above understanding, it is reasonable to present results for three samples with varying lig:$NiWO_4$:PVDF compositions.

In accordance with this result, the best sample (10:80:10) was selected for further tests. For comparison, the CV curves obtained at scan rates of 10, 25, 50, and 100 mV $s^{-1}$ are shown in FIG. 16A. It was found that at scan rates higher than 10 mV $s^{-1}$, the scan voltage rate was too fast. For scan rates lower than 5 mV $s^{-1}$, it was too slow for stable dynamics of the system. Thus, 10 mV $s^{-1}$ was selected to perform the cyclic voltammetry for longer runs. The specific capacitance obtained at varying scan rates (FIG. 16B) reiterates this fact. The average value of specific capacitance for the 10:80:10 sample obtained at 10 mV $s^{-1}$ is 15.11 mF $cm^{-2}$, which is the highest while that obtained at 100 mV $s^{-1}$ is 6.3 mF $cm^2$, which is the lowest. For the cyclic voltammetry experiment, it is important to determine the operating voltage window. For the scan rate of 10 mV $s^{-1}$, FIG. 16C shows the obtained CV curves at several voltage ranges. The highest average specific capacitance (6.3 mF $cm^{-2}$) was obtained in the voltage range of 1-2 V (FIG. 16D). Further, as observed in the CV experiment, the voltage-time (FIG. 16E) and current-time (FIG. 16F) curves are shown for the 10:80:10 ratio supercapacitor, for the first few cycles. The variation of voltage remains constant with the cycling. This indicates that the voltage varied constantly (FIG. 16E). For each cycle, the starting voltage is 1 V, which climbs to 2 V and then the voltage tends to decay with a negative slope to 1 V after the electrode polarity is reversed. The current that develops in the supercapacitor depends on the electroactive material, the electrolyte and the design of the supercapacitor. The current developed follows closely the cyclical pattern of the voltage in each cycle (FIG. 16F). However, unlike the voltage, the curve is non-linear with respect to time. The supercapacitor discharges more quickly compared to charging. This is depicted by the steeper slope of the discharge part of the current-time curve (FIG. 16F). Due to the gradual decay of the active material owing to electrochemical reactions in the supercapacitor, the current declines gradually in subsequent cycles below the highest value of the first cycle.

Figure 17A:
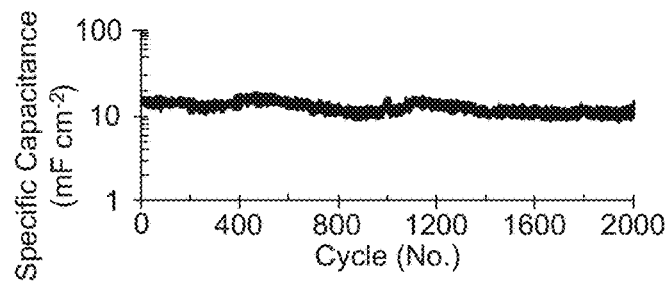
Figure 17B:
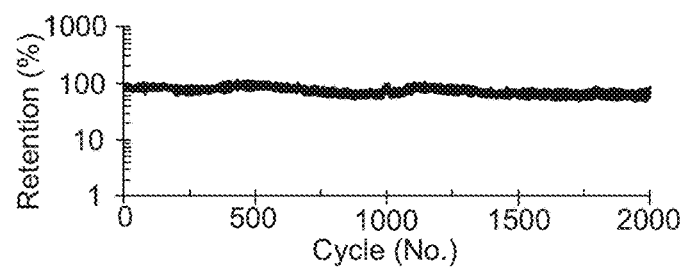
Figure 17C:
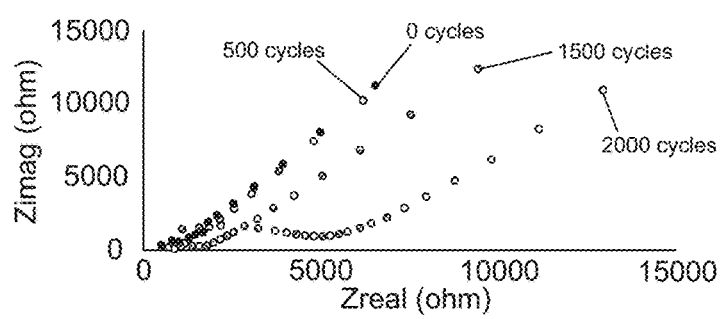
Figure 17D:
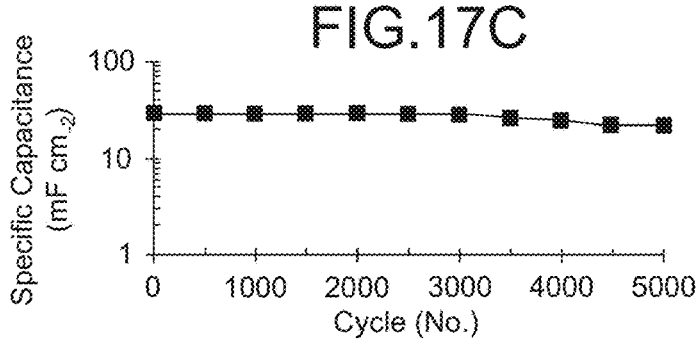
Figure 17E:
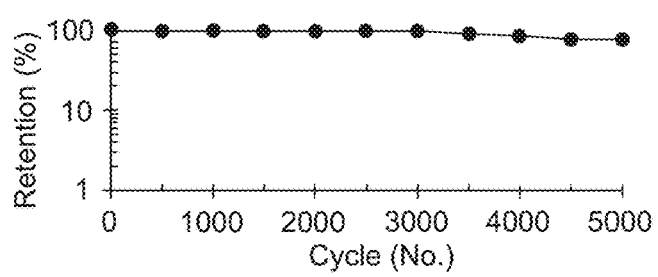

To study the cycling life of the supercapacitor, the 10:80:10 sample was run at a current density of 0.13 A g$^{-1}$ for 2000 cycles (FIG. 17A). The initial areal specific capacitance is 17.01 mF cm$^{-2}$, which remains nearly constant throughout the first 1000 cycles with a value of 16.5 mF cm$^{-2}$ after 1000 cycles (97% retention, FIG. 17B). The final value after 2000 cycles was 14.29 mF cm$^{-2}$ (84% retention, FIG. 17B). Thus, there is only a marginal decline in the areal specific capacitance. The maximum energy density and power density obtained were 2 W h cm$^{-2}$ (8.49 W h kg$^{-1}$) and 100 W cm$^{-2}$ (509.48 W kg$^{-1}$), respectively (Table 4). A fresh supercapacitor sample of the ratio 10:80:10 was tested for 5000 cycles as part of further work. The supercapacitor shows similar specific capacitance (FIG. 17D, the maximum specific capacitance of 28.66 mF cm$^{-2}$) and retention behavior (FIG. 17E, retention 76.38%) even after 5000 charge-discharge cycles.

The electrochemical performance of the fabricated Al/lig-NiWO$_4$ supercapacitor was compared in detail with literature reports of those currently available, as shown in Table 4. Notably, the electrochemical performance comparison for the exact material (Al/ACHAl/lig-NiWO$_4$) is not possible because it is a new material. However, some reported works for supercapacitors are shown in Table 4 for comparison. The obtained specific capacitance (Table 4) of the present work (SPCP) to the specific capacitance of those currently available (SPCG) range from 2.65-41.89, which is noteworthy and remarkable. Therefore, the 10:80:10 supercapacitor sample exhibits an electrochemical performance that is not only on a par with those reported, but is even better than many others.

Electroimpedance spectroscopy was done to study the impedance behavior of the supercapacitor. For this, the Nyquist plots were obtained and are shown in FIG. 17C. For the 10:80:10 sample, as shown in FIG. 17C, the total impedance at the beginning is about 500 Ohms, which is smaller than 1000 Ohms, the value after the 500th cycle. Similarly, the impedance after the 1500th cycle is 1620 Ohms, which is smaller than that after the 2000th cycle. The impedance values follow the trend of 0th, 500th, 1000th, 1500th and 2000th cycle from the least to the greatest. This provides evidence that with the progression of cycles, the impedance to current flow increases. Due to the increasing impedance, the current flow decreases, and a lower capacity retention is observed towards higher cycle numbers. The rate at which impedance develops, however, is steeped towards the end, i.e., from the 1500th to the 2000th cycle.

To observe the impact of current density on the resultant discharge voltage in the cyclic charge-discharge experiment, FIG. 18A was plotted. The resultant voltage curves were obtained at various current densities of 0.01 A g$^{-1}$, 0.03 A g$^{-1}$, 0.06 A g$^{-1}$, and 0.1 A g$^{-1}$. The slope of the discharge voltage, which represents the rate of decline of voltage at varying current densities, is the key point of interest. It is clear that the higher the current density, the steeper the slope of the voltage-time curve. Therefore, the voltage drops at a higher rate at a higher current density, which is the expected behavior of a supercapacitor. To understand the effect of discharge current density on specific capacitance, FIG. 18B was plotted for a constant charge current of 2 mA. As shown in FIG. 18B, specific capacitance declines with increasing discharge current density, i.e., the specific capacitances at 0.013, 0.026, 0.064, and 0.128 A g$^{-1}$ are 129.7, 32.94, 12.63, and 6.39 mF cm$^2$, respectively, thus depicting the characteristics of a supercapacitor.

As obtained from the cyclic charge-discharge experiment, a Ragone plot (FIG. 18C) is shown for the supercapacitor. It shows the variation of the energy density with the power density at varying current densities. The trajectory of the curve is consistent with those reported for metal oxide-based supercapacitors. There is a concave upward decline for the energy density instead of the usual convex upward decline.

Conclusions. NiWO$_4$ nanoparticles were used to decorate lignin (lig) in order to enhance the electrochemical reaction. Utilizing Al/lig-NiWO$_4$ as an anode and Al/AC as a cathode, this Example illustrates a new class of designed and fabricated supercapacitors with PVA/H$_3$PO$_4$ gel as an electrolyte. The maximum specific capacitance achieved at 0.13 A g$^{-1}$ is 17.01 mF cm$^2$. The capacitance retention remains at about 97% after 1000 cycles. The maximum energy and power densities obtained are 2 W h cm$^{-2}$ (8.49 W h kg$^{-1}$) and 100 W cm$^{-2}$ (509.48 W kg$^{-1}$), respectively. This remarkable electrochemical performance enables them to be utilized in a wide variety of electronic applications. A series of the composition of lig:NiWO$_4$ was tested to arrive at the optimal proportions of these constituents for the best electrochemical performance. The contribution of each constituent was studied by varying the compositing ratio. The first ratio (80:10:10) had predominantly lignin, the second ratio (45:45:10) had equal amounts of lignin and NiWO$_4$, while the third ratio (10:80:10) had predominantly NiWO$_4$ nanoparticles. The results showed that a higher proportion of the NiWO$_4$ nanoparticles compared to lignin imparted both high specific capacitance and retention to the supercapacitor. It is both cumbersome and a challenging task to commercialize the use of bio-derived materials for electronics because of

TABLE 4

Comparison of the Al/AC//lig-NiWO$_4$/Al supercapacitor's electrochemical performance to those currently available.

| Substrate | Materials | Max. Specific Capacitance (SPC) | SPCP/ SPCG[a] | Energy Density (W h cm$^{-2}$) | Power Density (W cm$^{-2}$) |
| --- | --- | --- | --- | --- | --- |
| Aluminum | Lig-NiWO$_4$ | 17.01 mF cm$^{-2}$ at 0.13 A g$^{-1}$, 2000 Cycles | 1 | 2 | 100 |
| PET | β-Ni(OH)$_2$/Graphene | 2.57 mF cm$^{-2}$ at 0.2 A m$^{-1}$, 2000 Cycles | 6.62 | — | — |
| FTCF | rGO/PANI | 6.4 mF cm$^{-2}$ at 0.08 mA cm$^{-2}$, 2000 Cycles | 2.66 | — | — |
| PET | SnSe$_2$ | 0.406 mF cm$^{-2}$ at 20 mA m$^{-2}$, 1000 Cycles | 41.89 | — | — |
| PET | N-Doped rGo | 3.4 mF cm$^{-2}$ at 0.5 μA cm$^{-2}$, 2000 Cycles | 5.0 | — | — |
| Titanium | Carbon Nano Tube | 1.84 mF cm$^{-2}$ at 1 mA, 1000 Cycles | 9.24 | — | — |
| Carbon Based Fabric | MnO$_2$//MoO$_3$ | 4.86 mF cm$^{-2}$ at 0.5 mA cm$^{-2}$, 3000 Cycles | 3.5 | — | — | aSPCP/SPCG is the ratio of specific capacitance of the present Example (SPCP) and specific capacitance of those currently available (SPCG).

instabilities in electrochemical performance. In this Example, a prudent attempt is made to obtain an enhanced and consistent electrochemical performance of bio-derived lignin through cost-effective measures. Key outcomes of this work are (i) bio-materials such as lignin when combined with novel transition metal oxides such as $NiWO_4$ can show tremendous improvement in areal specific capacitance performance and retention in supercapacitor applications and (ii) through constituent optimization of biomaterials and nanoparticles, it is possible to obtain electrochemical performance of supercapacitors that is not only on a par with the state-of-art but, in several cases, is even better. This work marks an important step towards the development of green technology due to the usage of green sources for the raw materials and a method that is cost-effective.

Example 3: Design and Synthesis of High Performance Flexible and Green Supercapacitors Made of Manganese-Dioxide-Decorated Alkali Lignin State-of-the-art flexible supercapacitors suffer from electrochemical and environmental performance issues including manufacturing expense limitations. Therefore, a highly effective and low-cost strategy to develop supercapacitors is needed. To address this, a plant-based, high-performance, lightweight, low-cost, quasi-solid state, and composite electrode for flexible supercapacitors has been synthesized using the hydrothermal method. The composite electrode is made of alkali lignin and is decorated with $MnO_2$ particles including an Al substrate. An Al/lig/$MnO_2$ based anode and an Al/AC (activated carbon) based cathode were sandwiched using an inorganic polymer gel-type electrolyte made of poly(vinyl alcohol) (PVA)/$H_3PO_4$ in order to assemble the supercapacitor. Synchrotron tomography and SEM are employed to study the detailed electrode morphology. Electrochemical impedance spectroscopy (EIS), cyclic charge-discharge (CCD), and cyclic voltammetry (CV) have been used to assess electrochemical performance. Optimization is carried out using a series of lignin:$MnO_2$ samples with varying constituent ratios. After 3000 charge-discharge cycles, the highest specific capacitance value achieved at 40 mA $g^{-1}$ reached 379 mF $cm^{-2}$, (900 times reported). The capacitance retention, maximum energy density, and maximum power density are 80%, 6 Wh $kg^{-1}$, and 355 W $kg^{-1}$ respectively. Due to the superior electrochemical performance, the supercapacitor shows exceptional potential for future sustainable and green electronics.

Introduction. A sustainable environment is necessary in order to meet increasing energy demands. This is especially important for materials and their structures in energy storage devices such as lithium-ion batteries, capacitors, and supercapacitors. In comparison to commercial capacitors, a supercapacitor has higher energy density, power density, and longer discharge time. These advantages make supercapacitors essential for a large number of applications which require sustained high power for a longer duration. To eliminate the potential combustion risk of traditionally used liquid electrolytes, and for the ease of use and portability, a supercapacitor that is an all-solid-state is greatly desirable. In recent years, flexible electronics have attracted great attention, there are many reports about the design, fabrication, and manufacturing of flexible solid-state and portable supercapacitors. An asymmetric supercapacitor helps extend the range of the operating voltage past the thermodynamic voltage of the electrolyte decomposition. In addition, the asymmetric design overcomes the charge storage limitation seen frequently within symmetric supercapacitors' designs. However, there are challenges that still remain in terms of electric wastes, bio-un-degradability, high processing cost, nondurability, inherently unsafe design, and un-scalability. The performance and environmental sustainability of a supercapacitor are heavily dependent on the processing methods and materials used. Employing state-of-art biomaterials in electrochemical devices is plagued by outstanding challenges such as unknown surface chemistry, low volumetric energy density, random pore distribution, uncontrolled pore geometry, and structure. These challenges severely affect the fabricated electrode's performance, cycle life, capacitance retention, and limits potential applications. The crucial elements that affect the device's usability and performance are the source of the raw materials, extraction methods, and pretreatment processes selected for obtaining the carbon-based biomaterials. The fundamental understanding of carbon reactivity in bio-derived materials is yet to be achieved due to its complicated structure and varied chemical composition. Furthermore, modern methods to produce carbon fibers from biomass include electrospinning, ink-jet printing, and spraying however, these techniques use hazardous chemicals and have a high carbon footprint. For example, others have used Kraft lignin and employed salt-based oxidation including electrospinning since the widely used polyacrylonitrile (PAN) fibers use hazardous chemicals and are expensive to obtain. Alkali lignin has a high oxygen percentage which is highly beneficial for advantageous pseudocapacitance properties however, this also limits electrical conductance. Compromise is required when choosing between the expensive Kraft lignin-based process or using alkali lignin with the modified process. Currently, there is an impending need for a simpler and safer activation process which can yield high-performance characteristics.

Also, the surface morphology and microstructure relationship with electrochemistry remain unexplained which restricts the development of new electrode material designs. One significant challenge in biomass is to achieve higher porosity for higher pseudocapacitance. However, this comes at the cost of sacrificing electrical conductivity due to higher porosity leading to reduced electrical conductivity due to pore impedance. Hence, understanding the microstructure and morphologies of electrodes and their impact on electrode porosity and electrical conductance hold the key to better designs. To address this challenge, this Example utilizes synchrotron X-ray microtomography ($\mu$-CT) with high-resolution in order to observe the surface packing density, surface roughness, particle size, morphology, and interface compactness in sharp detail. ZnO, $MnO_2$, CoO, $RuO_2$, NiO, and CuO are some the examples of transition metal oxides highly studied for their use in supercapacitor applications due to their auspicious pseudocapacitance properties. Though $RuO_2$ is considered the most ideal electrode material, it is scarcely available and therefore, very expensive. On the other hand, $MnO_2$ is cheaper, available in abundance, and safer in comparison to $RuO_2$. However, the low electrical conductivity of $MnO_2$ ($10^{-5}$-$10^{-6}$ S $cm^{-1}$) limits its use. In recent works, lignin has been used as an active material for supercapacitor electrodes. An innovative lignin-Si composite electrode was synthesized as an anode for lithium-ion batteries. Lignin derived carbon materials have also been combined with conducting polymers which have yielded high specific capacitances and energy densities. Active lignin from quinol/ubiquinol enzymes (Q/$QH_2$) redox moieties has recently garnered a lot of attention. Multiwalled carbon nanotubes (MWCNTs) were derived from lignin to make printable MWCNT-based electrodes and RuO$_2$/MWCNT nanocomposites as active material for electrodes. Most of the studies report the use of lignin as a carbon precursor, or it is pretreated and then combined with conducting polymers, transition metal oxides, etc. to enhance their performance. The processes used to synthesize them, though, are extensive and expensive. The objectives of this Example is to understand the effect of MnO$_2$ functionalization on the electrochemical behavior of plant-derived alkali lignin when used in a solid-state asymmetric supercapacitor, and to develop an inexpensive and sustainable design strategy for using alkali lignin in a solid-state supercapacitor using green chemistry principles.

To address the challenges in using alkali lignin and the problematic electrical conduction of MnO$_2$, this Example focuses on the development of new materials. This Example reports a novel approach of using low-cost alkali lignin as an active carbon-based material, decorated with MnO$_2$ ions, for lightweight, flexible, asymmetric supercapacitor with high potential for scalability and commercialization. The facile supercapacitor fabrication process uses nonhazardous chemicals; the materials used are from plant feedstock which is biodegradable, and the performance is optimized for energy storage. Thus, the process used is in line with the green chemistry principles of "Waste Prevention", "Use of Renewable Feedstocks", "Less Hazardous Chemical Synthesis", and "Design for Energy Efficiency". Described below are the fine details of the fabrication and assembly of the supercapacitor. The designed supercapacitor is an excellent substitute for PAN-based fibers. It even shows improved performance than the hazardous PAN fiber-based or the expensive Kraft lignin-based supercapacitors which are also waste generating and high carbon footprint-based methods. Moreover, the design process addresses the problem of achieving high specific capacitance and high electrode conductance at the same time for biomass-derived electrodes. This is done by selecting the elements of the supercapacitor and then optimizing performance for those chosen elements. This research has revealed a new class of electrodes that would be beneficial for the future development of energy storage devices.

Fabrication of the Composite Electrode and Electrolyte Gel. Three electrode samples of varying lignin:MnO$_2$ ratios were prepared. According to the varying ratios, the samples have been designated as, 2X:Y, X:0.5Y, and X:Y. The concentration of the KMnO$_4$ solution is, Y=47.5 µmol, and X=0.3 g of lignin. The method used to prepare the three samples is the same throughout all the samples. For instance, to make the X:Y sample, 0.0003 g of crystalline powdered KMnO$_4$ (Aldrich, size <150 µm, MW=158.03 gmol$^{-1}$) was added to distilled water (50 mL) in order to prepare a 47.5 µmol (Y) KMnO$_4$ solution. Alkaline lignin (from TCI) of quantity X was added to the KMnO$_4$ solution of concentration Y in a Teflon liner. This liner was then placed in a hydrothermal autoclave reactor. For the formation and deposition of the MnO$_2$ nanoparticles, the solution was treated hydrothermally for 60 minutes at 160° C. The solution obtained was drained of the excess liquid. The slurry obtained was then dried at 50° C. overnight. PVDF (MW=180 000 by GPC, Sigma Aldrich) was added to the slurry obtained earlier (Lig-MnO$_2$) in 4:1 ratio with the solvent, NMP (2 mL) (>99% pure, MW=99.13 gmol$^{-1}$, density=1.028 g ml$^{-1}$, Sigma Aldrich). The resulting slurry mixture was then coated on a substrate made of aluminum foil (thickness=0.98 mm). The circular (diameter=4 cm) cut substrate had adjoining strips (1 cm×3 cm) that were flexible over 3600. Heat treatment was done on the coated substrate in a vacuum atmosphere at 100° C. after which the composite lignin/MnO$_2$ electrode was obtained. The PVA/H$_3$PO$_4$ electrolyte gel was obtained in a similar manner to that of previous work.

Assembly of the Quasi-Solid State and Asymmetric Supercapacitor. The supercapacitor was constructed using Al/AC for the cathode and Al/lignin/MnO$_2$ as the anode. The electrolyte coated separator was sandwiched in between the two electrodes. The representation of the assembly process is represented in FIG. 19.

Materials Characterization. The supercapacitor surface characteristics were observed using a scanning electron microscope (SEM) characterization (VEGA/TESCAN model at 5 kV, 100×). Synchrotron tomography (X-rays at 35 keV) of the supercapacitor electrodes was done in order to observe the 3D morphology of complex molecules within lignin in detail and AC in a nondestructive manner. The details of experimental set up are similar to recently published work.

Electrochemical Testing. The capacitive performance of the supercapacitor was tested using cyclic charge-discharge (CCD), electrochemical impedance spectroscopy (EIS), and cyclic voltammetry (CV) by using a Gamry (version 6.33) potentiostat. The lignin/MnO$_2$ based electrode was used as the anode. The reference electrode and the AC based electrode connections were linked at the positive terminal of the potentiostat. The CV was carried out at several scan rates and voltage ranges (FIG. 22). In the CCD experiment, a 40 mA g$^{-1}$ current density was applied, and 60 seconds was used for each charge and discharge cycle. The total cycles run were 3000 and 20 V was the upper voltage limit. An EIS test was performed (10$^6$-0.1 Hz frequency, with DC of 1 V, and 10 mV AC) so that the parameters of the experiment were consistent with the potentiostat guidelines on the diffusion and mass transfer limited processes.

Scanning Electron Microscope. Scanning electron microscope (SEM) was utilized to observe the electrode's surface along with the interface of the supercapacitor. The PVA/H$_3$PO$_4$ gel electrolyte surface is smooth and undamaged. This helps ensure good interfacial contact with the electrodes. The AC particles of the cathode seem to be evenly distributed with the presence of pores. Porosity is essential for a higher area of contact for electrochemical reactions. The interface of the assembled supercapacitor has a thickness close to 200 µm. The gel-electrolyte layer is seen to have adhered strongly to the underneath Al substrate. This suggests strong mechanical stability and interface integrity which are critical for strong electrochemical performance.

Synchrotron µ-CT. Synchrotron µ-CT technique was employed in order to observe and compare the detailed particle morphologies of the activated carbon and composite lignin-MnO$_2$-based supercapacitor electrodes. Since the lignin and AC particle have carbon chains which are complex and randomly oriented in 3D space, synchrotron tomography presents a highly suitable nondestructive technique for observing the particle nature. Two separate supercapacitor electrodes, one made of AC and the other made of lignin-MnO$_2$, were subjected to high-resolution tomographic scans. A rectangular section of size 100×50 µm was used to measure the particle morphological features using ImageJ (Table 5). A higher circularity value of AC (Circ.=0.69) than lignin (Circ.=0.68) shows that the AC particles are more circular than lignin particles. This indicates a more branched carbon chain structure of lignin. It is ascertained again by the "Round" parameter value, which is higher for AC (0.5) than lignin (0.48). The dividend of the major axis length to the minor axis length of an elliptical-shaped particle is represented by the "AR" or aspect ratio.

Lignin particles have a higher aspect ratio (AR=2.07) suggesting at a smaller minor axis compared to that of AC (AR=2). The "Int. Den." parameter measures the total number of pixels within a region which is directly proportional to the surface packing density of molecules. 'Int. Den.' value for lignin (170675) is higher than AC (114780) hereby 48.7%. This suggests that the lignin electrode surface has a greater surface mass packing density. This surface mass packing density directly affects a supercapacitor's energy density and a greater surface mass packing density is highly desirable for improved energy density. In the surface analysis, skewness ('skew') compares a surface profile to a Gaussian surface (bell-shaped distribution) while kurtosis ("Kurt") presents a measure of the sharpness of the peaks of the surface profile. A larger 'skew' value for AC (1.03) compared to lignin (0.15) exists which suggests that the lignin electrode surface is comparatively closer to a Gaussian surface. This is also evidenced by a long tail in the AC plot and a symmetric plot in the lignin curve. A negative 'Kurt' value (−0.21) for the AC electrode surface suggests that the surface is flatter when compared to the lignin electrode surface (Kurt=0.19). Thus, the lignin-electrode surface compared to the AC electrode is rougher. A low surface roughness aids in good interfacial contact and in enhanced transport of charge across the interface. The intensity response to the X-rays directly corresponds to the particle nature of the sample. It particularly points to the chemical identity and functional groups present. A particle having a higher K-edge shows a higher average intensity to the X-rays in tomography. The lignin curve is right-shifted (mean=130) to the AC curve (mean=33.96) in the intensity-count plot. This suggests that the incoming X-rays face a comparatively larger resistance from the complex chemical and functional groups in the lignin molecules.

The 3D interactive surface plot across the 100×50 μm section of AC and lignin electrodes gives a qualitative visual understanding of the particle distribution across the electrode surface. Intensity distribution across a surface of an electrode is directly related to the chemical nature (functional groups and monomers) of the active material. Besides, the mass distribution on the surface is easily visualized using a 3D plot. The AC electrode peaks are all lying below the 100 pixels line while for the lignin electrode, most peaks fall below the 200 pixels line and a few cross the 240 pixels mark. A higher average intensity in the lignin electrode surface is due to its highly complex chemical identity. In both the AC and lignin electrode surfaces, the intensity distribution is continuous which indicates there is continuity in surface mass distribution which is essential for achieving enhanced surface and volumetric energy density. Thus, it is seen that for the Al/lig/MnO$_2$//AC/Al asymmetric supercapacitor, there is a greater density of surface mass packing on the lignin electrode and a lower value of roughness on the AC electrode surface. This synergistic combination of materials and electrode design helps in reducing surface void fraction and in achieving improved interfacial charge transport.

TABLE 5

Measured particle morphology parameters from the image obtained via tomography for the lignin and the AC-based supercapacitor electrodes.

| Morphology Parameter | Activated Carbon Electrode | Lignin Electrode |
| --- | --- | --- |
| Circ | 0.69 | 0.68 |
| Int. Den. | 170 675 | 114 780 |
| Mean | 33.96 | 130 |
| Round | 0.5 | 0.48 |
| Std. Dev. | 27.29 | 40.26 |
| Min | 0 | 12 |
| Max | 139 | 255 |
| Skew | 1.03 | 0.15 |
| Kurt | −0.21 | 0.19 |
| AR | 2 | 2.07 |

FTIR Analysis. Previously, FTIR spectroscopy was done for lignin and AC based electrodes to identify the chemical bonds present in both the materials and understand their chemical structure. The peaks were referenced with the literature report for both materials.

X-Ray Diffraction. To elucidate the crystallinity of lignin, X-ray diffraction (XRD) was done. In the XRD plot, a broad peak of diffraction can be seen at 2θ=22°. This broad peak indicates the amorphous nature of lignin.

UV-Vis Spectra. UV-Vis spectra of MnO$_2$ was analyzed. A typical broad absorption peak is visible between the range 310-360 nm confirming the presence of MnO$_2$ after a successful hydrothermal deposition. The d-d transition occurring in the Mn$^{4+}$ ions is indicated by a peak at approximately 360 nm. The formation of this peak is due to the thermal decomposition of KMnO$_4$.

Figure 20A:
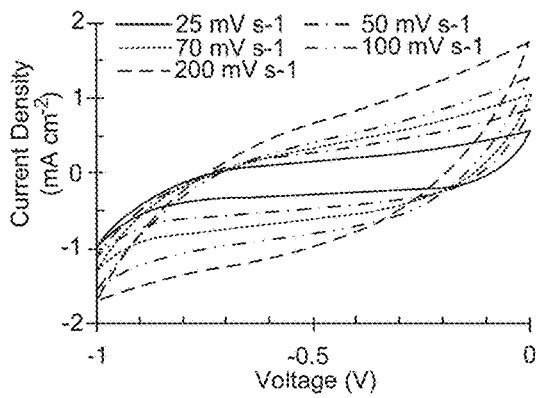
Figure 20B:
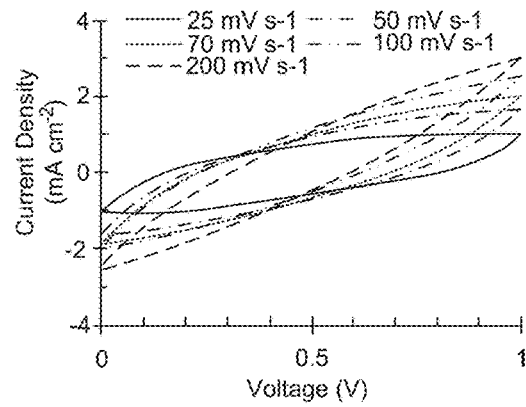
Figure 20C:
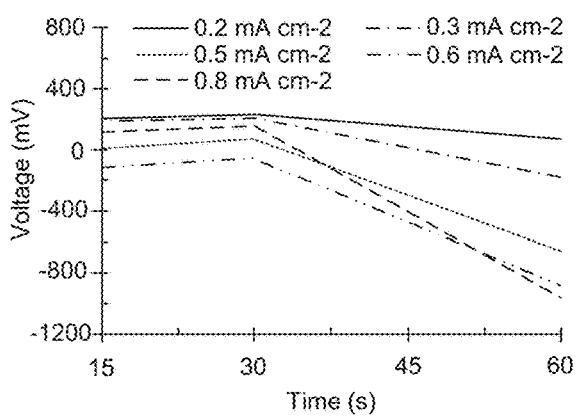
Figure 20D:
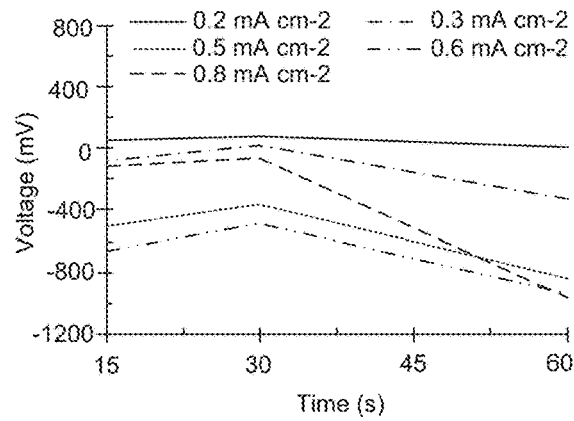
Figure 20E:
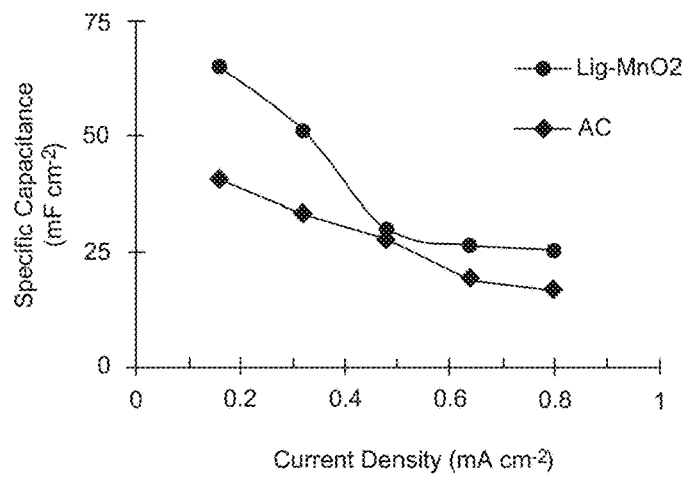

Electrochemical Analysis. A three-electrode test was performed using Ag(s)/AgCl (reference electrode) and a graphite rod as the anode. The lignin-MnO$_2$ electrode or the AC electrode was used as the cathode (working electrode). The electrolyte used was H$_3$PO$_4$ (85 wt. %). In FIG. 20A, the CV curves are shown for the optimal potential window of −1 to 0 V, for the AC-based electrode. Similarly, the optimal potential window for the lignin-MnO$_2$ was 0 to −1 V (FIG. 20B). The CV test was run for 25, 50, 70, 100, and 200 mV/s for both, lignin-MnO$_2$ and AC. Good cyclic performance was exhibited by the working electrodes. FIG. 20C and FIG. 20D show the discharge voltage vs time plots at varying current densities, for AC and lignin-MnO$_2$, respectively. The slope of voltage discharge is observed to be steeper for AC than for lignin-MnO$_2$. The plot of specific capacitances at varying current densities can be seen in FIG. 20E. It is observed that with the rise in current density, the specific capacitance decreases for both the working electrodes. As the specific capacitance values for lignin-MnO$_2$ were higher than AC at all current densities, the lignin-MnO$_2$ electrode was employed as the cathode and AC as anode for further electrochemical testing and analysis.

Figure 21C:
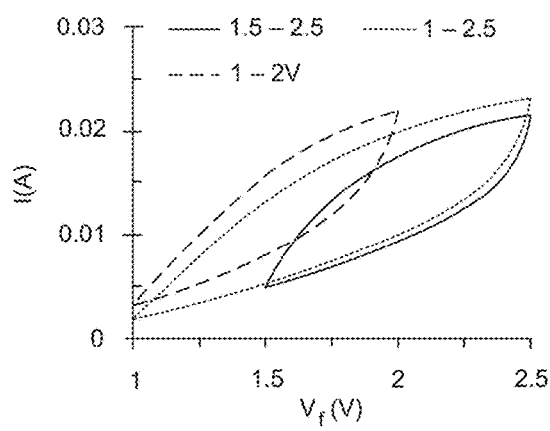
Figure 21D:
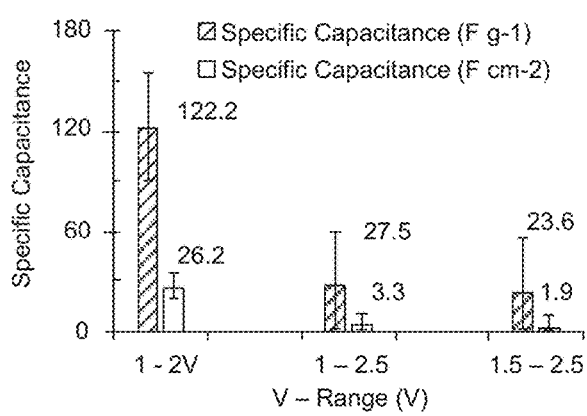
Figure 21E:
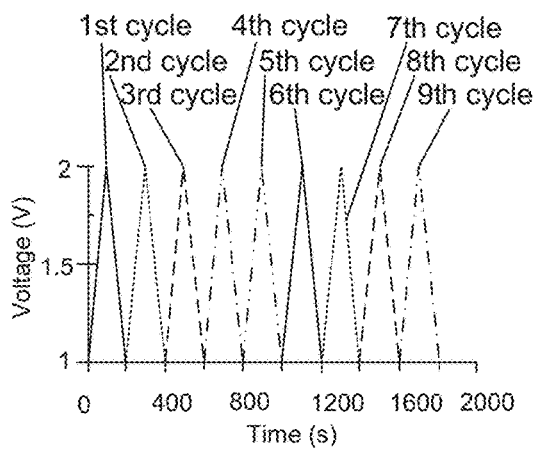
Figure 21F:
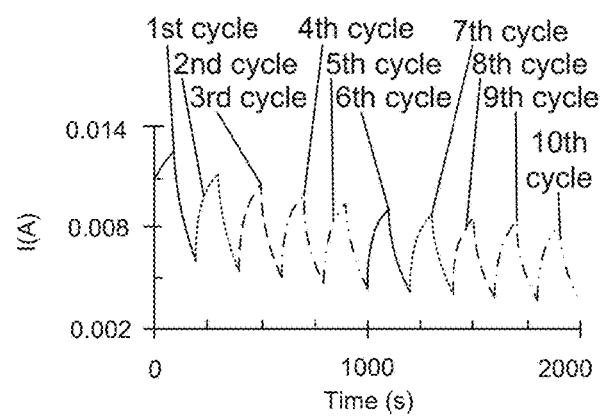

For testing the capacitive performance, CCD, and CV experiments were run. For cyclic voltammetry, the assembled supercapacitor was first tested at decreasing scan rates of 50, 25, 10, and 5 mVs$^{-1}$ (FIG. 21A). For rates of scan voltage above 10 mVs$^{-1}$, the voltage scan appeared fast, resulting in a low specific capacitance. At rates of the scan voltage below 10 mVs$^{-1}$, the system was unstable, despite a higher specific capacitance. Thus, the cyclic voltammetry was done at the optimal rate of scan voltage 10 mVs$^{-1}$. Due to unprocessed lignin in the composite lig-MnO$_2$ electrode, there is a possibility of many chemical impurities present. These varied chemical entities lead to many side surface electrode reactions which may be coupled with charge transfer kinetics. This leads to the occurrence of multiple side reaction peaks and consequently a high degree of noise (instability) in the system. It has been observed that, in case of slow irreversible chemical reactions, the thickness of the diffusion layer is dependent on the applied potential (proportional to scan rate) and it is smaller at a higher applied potential. Thus, at higher scan rates, the slow irreversible reactions are predominantly favored leading to high current. This leads to the absence of side reaction peaks and consequent noise from the system leading to a smoother CV curve. This phenomenon is, however, a complex one and dependent on multiple factors like the choice of electrode material, chemical species present, competing chemical reactions, diffusion coefficients, kinetics, and thermodynamics of reactions in question. Therefore, there is no general rule that can, as such, be provided here for the instability and noise in the system. This fact is also corroborated in FIG. 21B. The average specific capacitance of the supercapacitor is 122.21 $Fg^{-1}$ (26.19 mF $cm^{-2}$) at 10 $mVs^{-1}$ and 71.58 $Fg^{-1}$ (15.34 mF $cm^{-2}$) at 50 $mVs^{-1}$. Since it is important to determine an optimal operating voltage range, CV plots were also obtained at different voltage ranges (FIG. 21C). In FIG. 21D, the specific capacitances for the different voltage ranges can be seen (optimal scan rate of 10 $mVs^{-1}$). For the voltage window of 1-2 V, the highest specific capacitance (122.21 F $g^{-1}$) was obtained. The lowest average value of specific capacitance (23.59 $Fg^{-1}$) was obtained for a voltage range of 1.5-2.5 V. Therefore, the supercapacitor displayed optimal performance in the potential window of 1 V-2 V and 10 $mVs^{-1}$ scan rate. Based on similar earlier works that used $MnO_2$ based active material, it is reasoned that $MnO_2$ displays the pseudocapacitance property via reactions that occur in the positive potential window in which $Mn^{+4}$ is reduced to $Mn^{+2}$ oxidation state. As such, in the negative potential window, the supercapacitor's CV plot does not show considerable capacity retention. In those ranges, the CV curves appear almost as straight lines which is indicative of no charge storage within the supercapacitor. This is because of the choice of material (lig-$MnO_2$) and the pseudocapacitance potential window. The voltage-time and current-time plots (FIG. 21E and FIG. 21F) were obtained for further analysis. The variation in the voltage, for each cycle (FIG. 21E), is constant. Each charge cycle starts at 1 V and ends at 2 V. For the discharge cycle, the polarity of the electrode is reversed. A negative slope showing the voltage decay can be seen until 1 V. For the voltage variation at each cycle, a current developed correspondingly. This current is reliant on the material of the electrode, the electrolyte, the design, and the assembly of the supercapacitor. In FIG. 21F, the current vs. time plot obtained is almost similar to the voltage-time plot. However, the current variation is nonlinear, unlike the voltage variation. The slope of the discharge current is observed to be steeper than that of the charge current. This shows that supercapacitor has a tendency to get discharged faster compared to getting charged. It can also be seen that the current, highest in the first cycle, falls gradually in succeeding cycles. This can be attributed to the electrochemical reactions causing the eventual decay of the electroactive material.

To assess the capacitance performance of the electroactive material, 500 cycles of CCD were run for each at 40 mA $g^{-1}$ current density for the three-electrode samples with varied lig:$MnO_2$ ratios. The variation of specific capacitance (areal) for 500 cycles, is obtained (FIG. 22A). The specific capacitance (areal) retention can be seen in FIG. 22B. From FIG. 22A and FIG. 22B, it is observed that the specific capacitance (about 379 mF $cm^2$), and areal specific capacitance retention, for the 500 cycles is highest for sample X:Y. However, final retention is in the order X:Y>X:0.5Y>2X:Y as observed from FIG. 22B After the comparison of X:Y and 2X:Y samples, it was observed that both the retention and the specific capacitance decreases when the lignin weight % is increased or a lower concentration of $KMnO_4$ is used. Thus, the sample X:Y had the optimal lig:$MnO_2$ ratio which showed high specific capacitance and high retention. Researchers reasoned that due to the heterogeneous nature of the biomass morphology, there is greater variability in the diffusion of ionic species which is used to functionalize the biomass molecules. As such, it was found that the X:Y sample, in this case, performs the best compared to other samples. The sample (X:Y) was further run up to 3000 cycles (FIG. 22C). The specific capacitance (areal) initially was 379 mF $cm^{-2}$ (FIG. 22C), while after 3000 cycles it was 304 mF $cm^{-2}$ (80% retention, FIG. 22D). Researchers used Kraft lignin fibers and obtained specific capacitance in the range 147-350 mF $cm^{-2}$. Thus, the obtained result with alkali lignin in this Example is optimal. Furthermore, the fabricated supercapacitor shows characteristics of being highly efficient, economy-friendly, and more environmentally friendly in comparison to many others (Table 6). The maximum values of power and energy density obtained were 355 $Wkg^{-1}$ and 6 Wh $kg^{-1}$, respectively. Researchers have used polyacrylonitrile fibers (PAN) to produce nanofiber mats in symmetric pseudocapacitor applications. However, PAN production uses many hazardous chemicals. Also, the power density achieved was only 160 W $kg^{-1}$, which is lower than this report (355 W $kg^{-1}$). Considering the cost and carbon footprint involved in fiber production, the fabricated asymmetric supercapacitor reported in this Example is much simpler and cost-effective which is much more appealing for scalability and commercialization. An EIS experiment was run to understand the impedance characteristic of sample X:Y and Nyquist plots were obtained which can be seen in FIG. 22E. At the 0th cycle, the impedance is 40Ω and after the 2000th cycle is 7930Ω. The trend of the impedance values goes from the lowest value to the highest value, as expected. This behavior indicates that, with increasing cycle numbers, the impedance also increases. This leads to a lesser flow of current resulting in lower retention. However, the initial impedance rate is relatively slow (beginning to 570th cycle). The impedance after that increases faster between the 570th cycle and the 2000th cycle. For comparison, the initial (0th cycle) EIS curves (Nyquist) of the samples 2X:Y and X:Y are shown in FIG. 22F. The initial impedance for sample 2X:Y is 49Ω which is higher than that for sample X:Y (40Ω). This accounts for higher current flow and charge storage (specific capacitance) initially in sample X:Y when compared to the sample 2X:Y. Similarly, after 500 cycles (FIG. 22G), the total impedance of sample X:0.5Y (1590Ω) is greater than that of sample X:Y (1300Ω) indicating higher charge storage (specific capacitance) in sample X:Y.

TABLE 6

Comparison of capacitive performances of the current Example with those currently available.

| Material of Substrate | Electrode Materials | Maximum Specific Capacitance (SPC) | SCP/ SCL[a] | Energy Density (Wh kg$^{-1}$) | Power Density (Wkg$^{-1}$) |
|---|---|---|---|---|---|
| Al | Lignin/MnO$_2$ | 379 mF cm$^{-2}$, 3000 Cycles, at 40 mAg$^{-1}$ | 1 | 6 | 355 |
| Au | MnO$_2$ | 12 mF cm$^{-2}$, 2000 Cycles, at 0.3 mA cm$^{-2}$ | 31.58 | — | — |
| PET | Graphene/MWNT | 0.74 mF cm$^{-2}$, 20 000 Cycles at 1 μA cm$^{-2}$ | 505.33 | — | — |
| mCel-Membrane | Activated Carbon | 153 mF cm$^{-2}$, 1000 Cycles at 10 mVs$^{-1}$ | 2.5 | 4.37 | 249 |
| PET | SnSe$_2$ | 0.406 mF cm$^{-2}$, 1000 Cycles at 20 mA m$^{-2}$ | 933.5 | — | — |
| Carbon Fabric | MnO$_2$//MoO$_3$ | 3.2 mF cm$^{-2}$, 3000 Cycles at 5 mA cm$^{-2}$ | 118.44 | — | — |
| Carbon Fabric | MnO$_2$ | 42.4 mF cm$^{-2}$, 2000 Cycles at 5 mVs$^{-1}$ | 8.94 | — | 25 |
| FTCF | rGO/PANI | 6.4 mF cm$^{-2}$, 2000 Cycles at 0.08 mA cm$^{-2}$ | 59.22 | 7.07 | 707 |
| Xerox Printing Paper | MnO$_2$/Au/MnO$_2$ | 8.14 mF cm$^{-2}$, 5000 Cycles at 0.2 mA cm$^{-2}$ | 46.56 | — | — |
| PET | N-Doped rGo | 3.4 mF cm$^{-2}$ at 20 μA cm$^{-2}$, 2000 Cycles | 111.48 | — | — |
| A4 Commercial Paper | Graphene Sheets | 11.3 mFcm$^{-2}$ for Scan Rate at 1 mVs$^{-1}$ | 33.53 | — | — |
| Ti | CNT | 1.84 mF cm$^{-2}$, 1000 Cycles at 1 mA | 206 | | |
| PET | β-Ni(OH)$_2$/Graphene | 2.57 mF cm$^{-2}$, 2000 Cycles at 0.2 mA$^{-1}$ | 147.5 | — | — |
| PET | SnS/S Doped Graphene | 2.98 mF cm$^{-2}$, 10 000 Cycles at 60 mA cm$^{-2}$ | 127.18 | — | — |

[a]SCP/SCL is the ratio of specific capacitance of the current work (SCP) and specific capacitance of those currently available (SCL).

A detailed comparison of the lig/MnO$_2$ supercapacitor's capacitive performance with those currently available is presented in Table 6. The fourth column presents the ratio of current work's specific capacitance (SCP) to that of those currently available (SCL). The ratio ranges from 2-900 which is remarkable and significant.

The influence of different current densities on the discharge voltage is shown in FIG. 23A. The resulting voltage curves are plotted for changing current densities. It is observed that as the current density rises, the voltage vs time curve's slope gets steeper. Hence, the voltage drop rate is the highest at the highest value of current density (3.7 Ag$^{-1}$). FIG. 23B shows the current density (discharge) effect on the areal specific capacitance (for charge current=1 mA). The specific capacitance drops hyperbolically as the discharge current density increases which is the expected behavior of a supercapacitor. A Ragone plot is shown in FIG. 23C. The relative change in energy density corresponding to power density, for different current densities, can be observed in this plot. The Ragone plot obtained for the MnO$_2$ based supercapacitor in this work is similar to those reported. Here, an upward convex part of the curve which is followed by an upwards concave decline of energy density corresponding to an increasing value of power density is observed.

Conclusions. A new class of biomass-derived supercapacitor was successfully fabricated using a facile and low-cost synthesis. The supercapacitor is lightweight, portable, and flexible. In contrast to AC (cathode), the lignin/MnO$_2$ (anode) shows a higher surface packing density. This is confirmed by the "Int. Den." parameter value which is larger for lignin compared to AC. A higher surface packing density resulted in achieving a high value of energy density. The smoother AC electrode surface ensures a stable interface that aids in enhanced charge transport. The AC particles have a high porosity which contributes to the higher contact area between the active material and electrolyte for improved electrochemical reaction. Nanostructured MnO$_2$ was deposited on alkali lignin (lig) to boost the electrochemical reaction. At 40 mAg$^{-1}$ current density, the peak value of areal specific capacitance achieved is 379 mF cm$^{-2}$ (up to 900 times greater than the reported). The highest power and energy densities achieved were 355 W kg$^{-1}$ and 6 Wh kg$^{-1}$, respectively. These values are in the high-value range among the ones reported. The retention of capacitance obtained for the supercapacitor is 80%. The capacitive performance exhibited by the supercapacitor makes it suitable for several real-world applications. Various compositions of lig:MnO$_2$ have been tested in order to obtain optimal quantities of the constituents for the best capacitive performance. Research results revealed three aspects: (a) Alkali lignin can be used as an active material to obtain high-performance electrodes for supercapacitors. (b) An optimal lignin:MnO$_2$ ratio results in a high specific capacitance and high retention. (c) An inexpensive, sustainable, and green chemistry-based design and fabrication strategy for alkali lignin supercapacitors developed in this work shows a significant advance over the traditionally used hazardous and highly expensive processes. Given the challenge of obtaining satisfactory electrochemical performance using a low-cost method focused on sustainability, this Example is exemplary in exploring the future potential of alkali lignin in flexible supercapacitors. On account of the cost-effective method used, the nonhazardous process, superior performance, and the choice of raw materials extracted from biomass, this work will earmark a crucial step in developing electronics from green and sustainable sources.

Example 4: Bimetallic Tungstate Nanoparticle-Decorated-Lignin Electrodes for Flexible Supercapacitors Bimetallic tungstates (M$_2$M$_1$WO$_4$; M=transition metal) are promising candidates for electrochemical energy applications. However, the effects of the secondary metal (M$_2$) on the pseudocapacitance behavior of bimetallic tungstates have not been well understood. Disclosed herein, for the first time, is the effect of a secondary metal (Ni) on the pseudocapacitance of a bimetallic tungstate (NiWO$_4$/CoWO$_4$ composite called as NiCoWO$_4$ hereafter) when used in a quasi-solid-state supercapacitor. Nanoparticles of NiCoWO$_4$ and CoWO$_4$ were prepared using a wet chemical synthesis technique and characterized using scanning electron microscopy (SEM), X-ray photoelectron spectroscopy (XPS), X-ray diffraction (XRD), energy-dispersive X-ray (EDX), and high-resolution resolution transmission electron microscopy (HR-TEM). Lignin/NiCoWO$_4$//AC and lignin/CoWO$_4$//AC supercapacitors were electrochemically tested using Electrochemical Impedance Spectroscopy, cyclic charge-discharge, and cyclic voltammetry. After 2000 charge-discharge cycles, the bimetallic tungstate (NiCoWO$_4$) functionalized lignin supercapacitor shows a specific capacitance (862.26 mF cm$^2$, 96.12% retention) that is 141 times that of the monometallic tungstate (CoWO$_4$) functionalized lignin supercapacitor. The lignin/NiCoWO$_4$ supercapacitor has very high power and energy densities of 854.76 kW kg$^{-1}$ and W h kg$^{-1}$, respectively, due to a synergistic effect of bimetallic tungstate nanoparticles encapsulated in lignin. The supercapacitor design explored detailed aspects of composite electrode constituent optimization, and the effects of discharge time, lignin carbonization, and cathode material on the supercapacitor performance. For an optimal mass ratio of lignin:NiCoWO$_4$:polyvinylidene difluoride (PVDF) (15:75:10), the retention was 100% even after 2000 cycles. In addition to the cathode material's permittivity and surface area, the supercapacitor's electrochemical performance heavily depended on the dominant charge storage regime: an electric double-layered capacitor or pseudocapacitor dominant regime. This Example provides new knowledge to design bimetallic tungstate based high-performance bioelectronics for advanced green technology.

Introduction. To meet the rising demands of energy storage and sustainability, there are impending needs to discover new high-performance eco-friendly materials. Electrochemical energy storage systems, like batteries and supercapacitors, are considered to be excellent options. Supercapacitors exhibit high performance using bio-derived materials and nanomaterials. Recently, oxide/hydroxide based transition metals have garnered extensive attention toward electrochemical applications. But, these materials have poor cyclic stability, electroconductivity, and rapid capacitance degradation. The corrosion resistance and exceptional physiochemical properties of tungsten, combined with the nontoxic and stable multi-functional properties of the metal, make tungsten compounds an attractive choice. Metal tungstates find applications in various fields, for instance, in optical fibers, photoluminescence, and microwave applications, which make them an integral part of the metal oxide family. Metal tungstates with the empirical formula MWO$_4$ (M=Ni, Cu, Co, Mn) are particularly versatile and have found uses in Li-ion batteries and dielectric ceramics as well. CuWO$_4$ crystals are frequently used for a variety of applications such as photo-electrocatalytic water oxidization or magnetism. Precision in the bandgap energy of MWO$_4$ is highly crucial for several applications like the detectors used in the Large Hadron Collider at CERN and Raman lasers which are safe for eyes. CuWO$_4$ nanoparticles (NPs) were synthesized using a sonochemical method which showed that the copper crystals are a favorable material for photocatalytic applications. Researchers in 2017 studied the electrochemical behaviors of CoWO$_4$, NiWO$_4$, and CoWO$_4$@NiWO$_4$-A and suggested that these metal tungstate compounds could be considered as good electrode materials for energy storage applications.

In the design of metal tungstate based electrodes, several aspects are important for consideration: chemical structure, conductivity, charge transport mechanism, nature of transition metals, size, and the temperature range of operation. Tungstates of transition metals such as Co, Ni, Cu, and Zn of the form MWO$_4$ (M=metal), except for CuWO$_4$, are found to possess a monoclinic wolframite-type structure. Wolframite structures (with Zn and Mg) have shown promising electrode material for dye-sensitized solar cells, while the scheelite structure (with Ca and Sr) operated with a lower electron transfer rate. Researchers, have carried out a hybrid density-functional analysis of the electronic structure and established that a polaron was formed through the underlying mechanism for the existence of p-type semiconductivity in CoWO$_4$. The conductance of CuWO$_4$ is attributed to the hopping of small polarons. Researchers conducted a first-principles study of iron tungstate (FeWO$_4$) and manganese tungstate (MnWO$_4$) to attain a detailed understanding of their properties such as lattice parameters, static dielectric constants, and band gaps. In the study, it was found that highly mobile polarons with low energy are formed near the band edges due to localized transition-metal d states. As a result, these materials exhibit high p-type conductivity. Also, WO$_4$ type transition metal tungstates (TMT) are associated with magnetic ordering due to which the conduction electrons have modified energy spectra. This leads to a higher electrical resistivity in TMT than metals. Others, found that the nature of transition metals determines the photocatalytic and optical properties in MWO$_4$ type compounds. Despite having a huge bandgap, ZnWO$_4$ showed the highest photocatalytic activity possibly due to the hybridization of partially empty 3d orbitals with W 5d orbitals that is in the lower level of the conduction band. In 2008, a group determined the bandgap energy (5.26 eV) in some tungstates (MWO$_4$) and reasoned that the hybridization of p, d, and f electronic states of M$^{2+}$ with the O 2p and W 5p orbitals lowered the bandgap energy. The size of the cation in the MWO$_4$ type determines the dielectric permittivity. Others found that excitons were created as a result of transition to the W 5d orbital in CdWO$_4$ at 6-300 K and 3.5-3.0 eV. At energies 1-2 eV higher than the conduction band energy, holes and free electrons were created due to the cation state transition. The temperature range of application plays a fundamental role in the type of transition metal selection for electrodes. Below 455 K, the hopping mechanism involving small polarons leads to extrinsic type conduction behavior in CoWO$_4$, while, above 455 K, an intrinsic behavior was observed due to large polaron hopping. The alternating current and direct current electrical conductance of manganese tungstate (MnWO$_4$) was measured at the given temperatures ranging from 300-1250 K, and it was established that MnWO$_4$ showed a p-type behavior. NiWO$_4$ is a p-type compound under 660 K, n-type between 660 K and 950 K and p-type above 950 K. The dielectric constant of the observed NiWO$_4$ decreased with temperature ranging from 300 K to 350 K. It increased slowly with temperature until about 700 K and increased rapidly after that.

Co and Ni are well complemented by each other, and Co provides good rate capability and cyclic stability while Ni shows high specific capacitance (SPC). A hybrid tungstate of Ni—Co also shows better conductivity due to the incorporation of W atoms. A research group prepared bimetallic Co—Ni tungstate NPs and a composite with P—S co-doped graphene by hydrothermal synthesis and used as an electrode for the supercapacitor. Nickel-based materials possess high theoretical specific capacity but their low rate capability limits their use in supercapacitor applications. In contrast, cobalt-based materials possess good rate capability but possess a low specific capacity. Hence, a combination of these materials would possess the desired characteristics for use as positive electrodes in hybrid supercapacitors. In various studies of NiWO$_4$ and CoWO$_4$ electrodes, high SPC and retention were obtained. In one study, nanocomposites of NiWO$_4$/CoWO$_4$ were synthesized which showed high capacitive performance. Co$^{2+}$ was incorporated into the NiWO$_4$ lattice via a chemical co-precipitation method to manufacture monoclinic wolframite nanosheets of Ni$_{1-x}$Co$_x$WO$_4$. In comparison to NiWO$_4$, the surface area and the electrical conductivity of Ni$_{1-x}$Co$_x$WO$_4$ increased considerably. However, the NiWO$_4$ electrode exhibited better cycle stability. Based on the results obtained so far, it is predicted that the performance can be boosted by mixed transition metal oxides (MTMOs). Previously, a group used this reasoning to synthesize a mesoporous NiWO$_4$@CoWO$_4$ nanocomposite with different Co/Ni molar ratios using a chemical co-precipitation method. It was determined that the supercapacitor fabricated by using this composite exhibited a high energy storage density of 30.1 W h kg$^{-1}$ and a higher power density of 200 W kg$^{-1}$. A recent review focused on the advancement of mixed transition metal oxides and their hybridization with graphene sheets makes active materials for electrodes. Critical factors affecting the electrochemical performance, as well as the low electroconductivity and other limitations of these oxides were highlighted. Graphene sheets hybridized with mixed transition metal oxides resulted in a high specific surface area and good electroconductivity. The mixed transition metal oxides (MTMOs), in comparison to transition metal oxides (TMOs), exhibit better electrochemical properties. This can be attributed to the combined effect of multiple oxidation states in transition metal oxides which gives an ideal pseudocapacitance due to the diverse redox reactions. The number of electroactive sites and electrolyte ion accessibility play a major role in the performance of the electrochemical system along with the porosity, specific surface area, and morphology of the active material. The combined effect of two different TMOs increases the number of electroactive sites as well as the potential window. In addition to their low-cost, abundant availability and eco-friendliness make MTMOs excellent candidates for active electrode materials. Despite the superior electrochemical performance, MTMOs have several limitations as well. These include poor cyclic stability, rate capability and intense volume expansion during the reversible charge-discharge process. To improve this, MTMOs are customized into nanostructures.

Over the years there have been significant advancements in the synthesis of metal tungstates and tungsten oxides. CuWO$_4$ was synthesized using the chemical precipitation method and the parameters were optimized using a Taguchi robust design. The method did not use templates or catalysts which made it very simple and fast in comparison to other methods. Others executed the synthesis of three separate metal tungstate phases using the sucrose templated method. The phase achieved by each metal tungstate, and the relationship between bivalent cation size and the structural properties were dependent on the divalent cation used. Researchers used a co-precipitation method to synthesize CdWO$_4$ crystals. Increasing temperature and frequency were found to have a positive correlation on the electrical conductivity, thus, demonstrating the semiconducting nature of the material. One notable and simple process is the microwave synthesis of a nano-crystalline metal tungstate, investigated through the use of radiation from a cyclic microwave and the organic compound propylene glycol. Previously, a microwave was used to synthesize metal tungstates using a solid-state metathetic (SSM) method. It was found that reaction time, pH, and temperature strongly influenced the synthesis of the single-crystal nanowire of silver tungstates using hydrothermal re-crystallization. Later, the NiWO$_4$ NP was synthesized using the ultrasound method and used it to study the photocatalytic degradation of methyl orange. Researchers have explained the pH- and potential-dependent behavior of tungsten in an aqueous medium, as well as the tungsten oxide crystal structures. Various tungstate trioxide-based materials have been synthesized and tested extensively. However, tungstate trioxide has a low energy density and surface area. Therefore, more research is required to enhance their performance as active electrode materials. Wet chemical synthesis is one of the widely used techniques for the synthesis of NPs, which commonly deals with the chemical reaction occurring in its solution phase. Of the many methods available for the synthesis of NPs such as solvothermal and template synthesis, oriented attachment, self-assembly, etc., the wet chemical synthesis method offers a high degree of material reproducibility and controllability. The uniformity of the produced compounds is also ensured by this route. Recently, lignin-based carbon materials have shown promising activity in supercapacitors. However, challenges exist in terms of achieving high power and energy densities, cyclic stability, and long term cyclic stability for application purposes. Besides, the state-of-art use of lignin emphasizes the use of hazardous processes such as using polyacrylonitrile (PAN) based fibers, or expensive and unsafe techniques like electrospinning. As such, there is a need to design and develop a new lignin-based material and process that is efficient, safe, and reliable for use.

The objectives of this Example are: (1) to understand the effect of the secondary metal (Ni) in the bimetallic tungstate composite (NiCoWO$_4$) in affecting its electrochemical behavior; and (2) to assess and optimize the performance, and layout the design strategy for a synergistic design of the bimetallic tungstate NP functionalized lignin-based supercapacitors based on green chemistry principles. To attain these objectives, a bimetallic tungstate NP functionalized alkali lignin (lignin/NiCoWO$_4$) based supercapacitor is designed. It is then compared for electrochemical performance with a metallic tungstate nanoparticle functionalized alkali lignin (lignin/CoWO$_4$) based supercapacitor. The NiCoWO$_4$ and CoWO$_4$ NP were prepared by using a wet chemical synthesis technique. NP characterization was done using XRD, XPS, EDX, and SEM. A supercapacitor study was done by using the electrochemical tests mentioned earlier. Effects of the secondary metal (Ni) in the bimetallic tungstate, discharge time, carbonized alkali lignin, and the cathode material were investigated. The design strategy explored in detail the aspects of composite electrode constituent optimization, and the effects of discharge time, lignin carbonization, and cathode material on the super capacitance performance.

Synthesis of CoWO$_4$. For this synthesis procedure, a simple wet chemical route was opted. 0.05 M of cobalt acetate salt was added to distilled water (50 ml) and stirred for 15 min; this solution was denoted as solution A. Likewise, 0.1 M of Na$_2$WO$_4$ salt is mixed with 100 ml of DI water, which was then stirred for 30 min which was labeled as solution B. After that, solution A was added dropwise to solution B, followed by stirring it for 6 h. A pink colored precipitate was formed which was centrifuged and dried.

Synthesis of Ni—CoWO$_4$. The mixture of Ni and Co bimetallic tungstates was prepared via a wet chemical approach. Then, 0.9 g of nickel acetate was mixed with 50 ml of water (distilled) and the solution was stirred for 15 min until the homogeneity was observed. This solution was denoted as Solution A. 0.3 g of cobalt acetate was added to 50 ml of DI water in a beaker and stirred for 15 min. This solution was denoted as solution B. Likewise, 0.1 M Na$_2$WO$_4$ was added to DI water (100 ml) and then stirred for 30 min. This was labeled as solution C. Finally, solutions A and B were mixed dropwise into solution C simultaneously.

The resultant solution was stirred for 6 h under magnetically stirred conditions. After that, the solution was centrifuged and dried. The final product was collected and annealed at 600 1 C for 2 h with a temperature ramping rate of 5 1 C min$^{-1}$. The end product was denoted as Ni—CoWO$_4$.

Fabrication of the Lignin/Ni—CoWO$_4$ and CoWO$_4$ Composite Electrodes. To study the novel NP, three ratios of varying wt % were synthesized and analyzed via electrochemical testing. The ratios were prepared in the form Lig:Ni—CoWO$_4$:PVDF. The first sample was prepared in the ratio of 80:10:10. 0.015 g of novel Ni—CoWO$_4$ NPs were added to 0.12 g alkaline lignin (TCI Chemicals). A slurry of the obtained compound was made by using polyvinylidene difluoride (PVDF) as the binder and 3 ml of NMP (N-methyl-2-pyrrolidone) as the solvent, both obtained from Sigma Aldrich. An aluminum foil of diameter 40 mm, 0.98 mm thick, and with adjacent strips of 10 mm×30 mm was used as the substrate. The slurry obtained earlier was coated on the Al substrate. The coated substrate was thermally treated at 70° C. in a vacuum environment of −21 Hg vacuum pressure. Similarly, the other two samples of the ratios 75:15:10 and 15:75:10 were made and studied to arrive at the optimal performance. The same method was implemented to synthesize the CoWO$_4$ electrode of the ratio 80:10:10 and the NiWO$_4$ electrode of ratio 10:80:10. Regarding the fabrication of the electrolyte, the PVA/H$_3$PO$_4$ electrolyte gel was prepared in the same manner as explained in previous work. For carbonized lignin, a carbonization procedure was followed: alkali lignin was heated at 300-400° C. in an argon atmosphere for 24 hours. The remaining fabrication process was the same as for the alkali lignin-based supercapacitor.

Assembly of the Asymmetric Supercapacitors. Two supercapacitor assemblies with different negative electrodes were prepared as shown in FIG. 24. The negative electrodes were Al foils coated with activated carbon (AC) and a graphene sheet. Porous commercial paper was used as a separator in the supercapacitor assembly. The paper was completely immersed in the PVA/H$_3$PO$_4$ electrolyte gel. The separator was then placed on the lignin-based composite electrode. The negative electrode was placed over the separator, effectively sandwiching the separator between the two electrodes to form the asymmetric supercapacitor assembly.

Characterizations. XPS was studied using a Theta Probe AR-XPS system (Thermo Fisher Scientific, UK). For the XRD evaluation, a Bruker X-ray diffractometer was used. A sweeping rate of 51 min$^{-1}$ (2θ range 10-90°) and 1=0.154 nm (Cu K$_\alpha$ radiation) was implemented. The Hitachi model S-3000H with a 30× to 300 k× magnification and an accelerating voltage of −0.3 to 30 kV was used for the EDS as well as SEM evaluation. The Olympus Leco PMG3 optical microscope (OM) at the Texas A&M Materials Science Engineering Facility was used to obtain high contrast images. The interferometer model was a Zygo NewView 600 type (Zygo Corporation, CT). All electrochemical characterizations were performed using a Gamry version 6.33 potentiostat (Gamry Instruments, USA). Electrochemical impedance spectroscopy (EIS) was carried out in the frequency range of 10$^6$-0.1 Hz, and AC of 1 V.

X-Ray Diffraction (XRD) Pattern of Nanoparticles. To understand the nature exhibited by the materials, XRD studies were carried out. XRD studies reveal that CoWO$_4$ is semi-crystalline in nature. There are some sharp peaks observed and these peaks correspond with the JCPDS (Joint Committee on Powder Diffraction Standards) number 00-015-0867 which reveals the formation of CoWO$_4$. The distinct peak observed at the position of 35.7° corresponds to the oxide of tungsten. The corresponding XRD spectrum is shown in FIG. 25A.

The synthesized Ni—CoWO$_4$ powder was subjected to X-ray diffraction studies (XRD). The subsequent XRD spectrum is shown in FIG. 25B. The sharp peak reveals that the formed materials are crystalline. This pattern exactly matches the JCPDS reference number of 00-015-0867 and 00-015-0755 which corresponds to a mixture of cobalt and nickel tungstates, respectively. Other distinct peaks of 17.09, 27.88, and 32.731 correspond to tungsten oxides ($W_xO_y$) which matched with the reference number of 00-005-0392.

Scanning Electron Microscopy (SEM) Images of Nanoparticles. To know the morphological aspects, scanning electron microscopy (SEM) analysis was performed.

The low and high magnification images of CoWO$_4$ show a disordered plate-like morphology. In the same way, the low and high magnification images of Ni—CoWO$_4$ were reviewed. In both cases, the observed materials are uniformly distributed all over the surface.

Energy-Dispersive X-Ray (EDS) Spectroscopy Analysis of Nanoparticles. To confirm the elemental composition, EDS was carried out. The corresponding plots are shown in FIG. 26A and FIG. 26B. The observed elements like cobalt, tungsten, and oxygen in CoWO$_4$ have been shown in FIG. 26A. The presence of elements in NiCoWO$_4$ such as nickel, cobalt, tungsten, and oxygen has been confirmed; the corresponding EDS spectrum is shown in FIG. 26B.

High-Resolution Transmission Electron Microscopic (HR-TEM) Analysis of Nanoparticles. To provide a deeper insight into the morphological analysis, low and high magnified HR-TEM images were taken. Herein, the above-mentioned morphology of the nanoparticle has been confirmed once again. For the uniform distribution of elemental confirmation, high angle annular dark-field (HAADF) imaging and color mapping were performed and the corresponding results reviewed. The HAADF image and a mixed elemental distribution image were studied, and the expected elements such as cobalt, nickel, tungsten, and oxygen were observed. The mapping results reveal that the expected elements are uniformly distributed all over the catalyst surface.

Figure 27A:
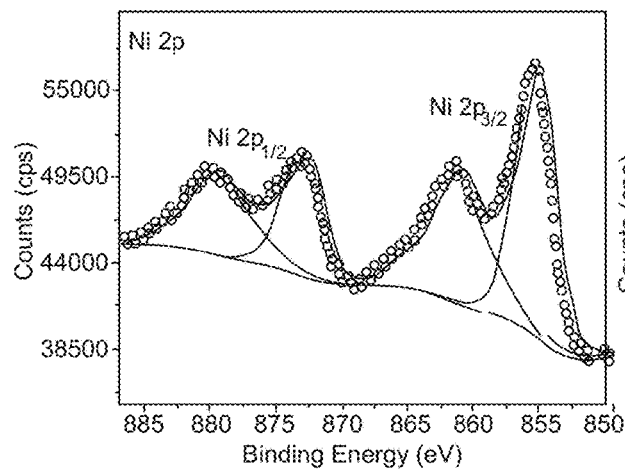
Figure 27B:
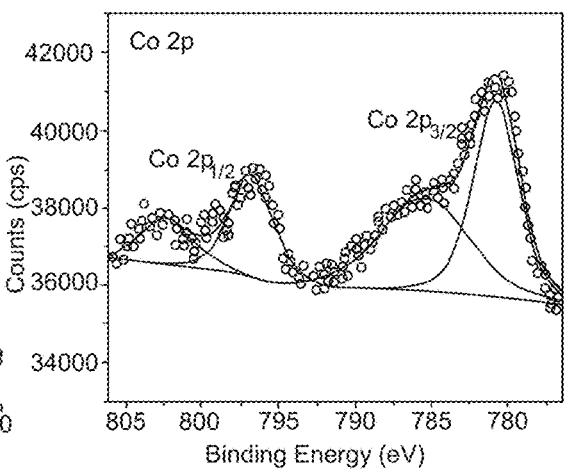
Figure 27C:
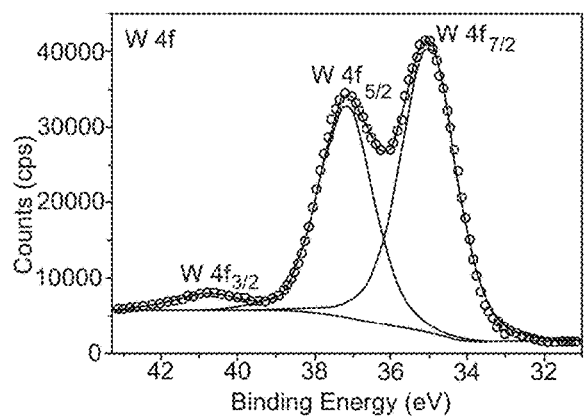
Figure 27D:
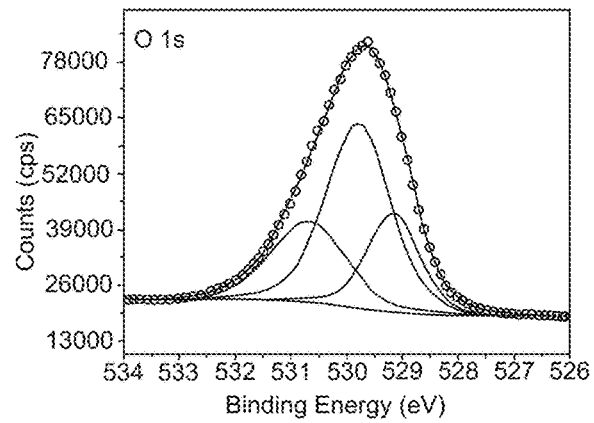

X-Ray Photoelectron Spectroscopy (XPS) of Nanoparticles. For identifying the nature of the elements, X-ray photoelectron spectroscopy (XPS) was carried out. FIG. 27A shows the high-resolution XPS spectrum of Ni 2p. Herein, the binding energy values are observed at 873.3, 855.5 eV and 879.7, 861.54 eV corresponding to Ni 2p$_{1/2}$, and Ni 2p$_{3/2}$ and the corresponding satellite peaks respectively. Similarly, FIG. 27B shows the high-resolution spectrum of Co 2p showing the binding energy values of 796.74, 780.86 eV, and 802.46, 785.64 eV, corresponding to Ni 2p$_{1/2}$ and Ni 2p$_{3/2}$ and the corresponding satellite peaks, respectively. Both nickel and cobalt possess an oxidation state of +2. FIG. 27C shows the high-resolution spectrum of W 4f where the observed binding energies are 40.82, 35.02, and 37.15 eV corresponding to W 4f$_{3/2}$, W 5p$_{7/2}$, and W 4f$_{5/2}$, respectively. The high-resolution spectrum of O 1s shows the corresponding peaks at 529.17, 529.7, and 530.7 eV which signifies the metal oxide bond and the lattice oxygen of the material. The corresponding spectrum is shown in FIG. 27D.

Optical microscopy (OM) was performed to observe the surface features of the electrodes and the interface of the supercapacitor. The carefully prepared cathodes of AC and graphene were studied for surface roughness profiles using an interferometer.

Electrical Performance. To understand the effect of the secondary metal ($M_2$) of a bimetallic tungstate on its pseudocapacitance behavior, the electrochemical performance of a bimetallic tungstate ($M_2M_1WO_x$, $M_2$=Ni, $M_1$=Co, X=4) was compared to that of a metal tungstate ($M_1WO_x$, $M_1$=Co, X=4). For this, two cyclic charge-discharge (CCD) experiments (current density=0.8 mA $cm^2$, 2000 cycles, AC cathode) were performed: one having lignin/$NiCoWO_4$ as the composite anode, and the other having lignin/$CoWO_4$ as the composite anode. As observed in FIG. 28A and FIG. 28B, the initial and final areal SPC values for the lignin/$NiCoWO_4$ pseudocapacitor (1st cycle SPC=862.26 mF $cm^{-2}$, 2000th cycle SPC=828.82 mF $cm^{-2}$) are 141 and 1726 times higher, respectively, than those of the lignin/$CoWO_4$ pseudocapacitor (1st cycle SPC=6.1 mF $cm^{-2}$, 2000th cycle SPC=0.48 mF $cm^{-2}$). Thus, it is observed that the areal SPC of lignin/$NiCoWO_4$ is consistently higher than that of the lignin/$CoWO_4$ pseudocapacitor. Also, the final retention (FIG. 28B) for the lignin/$NiCoWO_4$ supercapacitor (96.12%) is 12.16 times that of the lignin/$CoWO_4$ supercapacitor (7.90%). Similarly, the SPC of the lignin/$NiWO_4$ supercapacitor for the best ratio (10:80:10) is 32.90 mF $cm^{-2}$ (98.2% retention, 2000 cycles), that is 26.20 times smaller than that of the lignin/$NiCoWO_4$ supercapacitor. Thus, the secondary metal (Ni) of the bimetallic tungstate ($NiCoWO_4$) has a tremendous effect in enhancing both the SPC and retention. This enhanced performance can be attributed to the synergistic effect of a highly disordered plate-like morphology of the bimetallic tungstate NP, obtained through the wet chemical synthesis approach that provides an enhanced surface area for electrochemical reactions; multiple available oxidation states of the transition metals (Ni and Co) resulting in a range of redox reactions leading to higher electronic conduction and charge transport; higher access of electrolyte ions and electroactive sites due to inherent defects in the lignin matrix; and a high surface area (S) to volume (V) ratio (S/V) of the NP due to nanostructuring. These results overcome the limitations of poor cyclability and performance stability of earlier works.

Figure 28A:
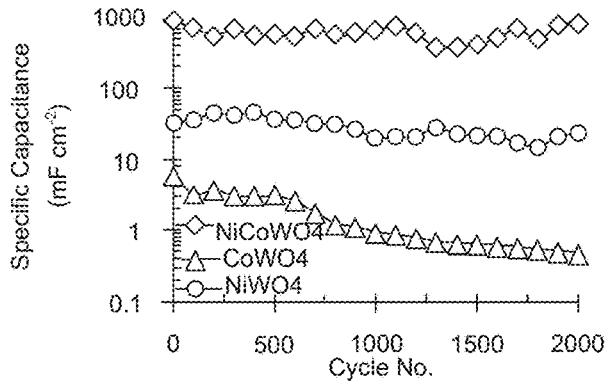
Figure 28B:
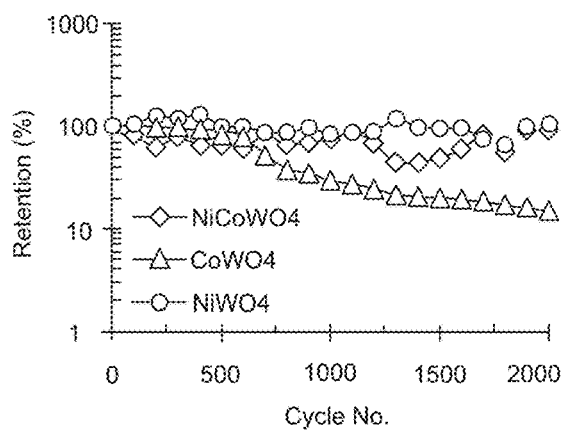
Figure 28C:
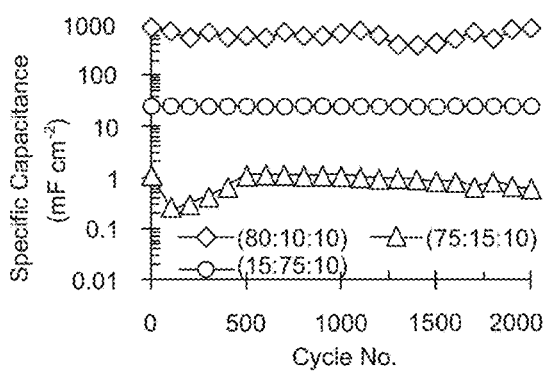
Figure 28D:
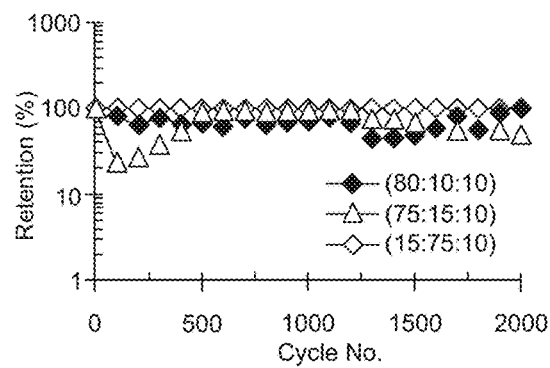
Figure 28E:
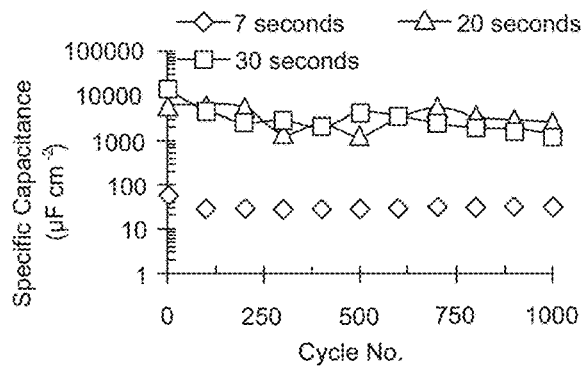
Figure 28F:
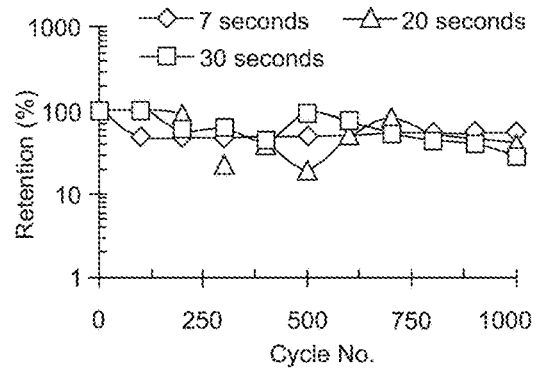

The effects of different constituent mass ratios of the lignin/$NiCoWO_4$ composite electrode on the electrochemical performance of the pseudocapacitor were studied. This is important to ascertain the contribution from individual constituents (in this case: lignin, $NiCoWO_4$ NPs, and PVDF) to the electrochemical performance which enables the effective design of the pseudocapacitor. Accordingly, three different constituent weight ratios of the composite electrode in the order lignin:$NiCoWO_4$:PVDF were used and tested in cyclic charge-discharge experiments for 2000 cycles (FIG. 28C and FIG. 28D). Of the three samples, sample 80:10:10 has the consistently highest SPC with a maximum value of 862.26 mF $cm^2$. When the relative percentage of lignin was reduced (sample 75:15:10), compared to sample 80:10:10, the specific capacitance (SPC) dropped by 416 times (1.14 mF $cm^{-2}$). On the other hand, when the relative percentage of the $NiCoWO_4$ NP was significantly increased to 75% by weight (sample 15:75:10), compared to sample 75:15:10, the SPC increased by 21 times (23.87 mF $cm^{-2}$). Thus, the effect of lignin is predominant in affecting the SPC of the pseudocapacitor, and the SPC reduces on reducing the relative weight percent of lignin. This is so because, with a reduction in lignin, the number of active sites is reduced which lowers the charge storage capability of the electro-active material. In comparison, when the relative percentage of the NP is increased, there is an enhancement in the pseudocapacitance due to an increased oxidation-reduction site leading to enhanced charge storage by the active material. However, this change in SPC due to the NP is less pronounced than due to lignin. The retention plot (FIG. 30D) reveals that with a high percentage of the NP (sample 15:75:10), capacitance retention is the highest (100%). This is on account of the pseudocapacitance property of the NP. The retention of other samples drops since the active sites on lignin get consumed with the progression of cycles. Thus, the mass ratio experiment reveals that while a higher percentage of lignin is required for achieving high SPC, a high relative percentage of the NP is required for attaining high capacitance retention. An optimal value of these constituents can meet the requirement for a high SPC and retention.

The electrochemical performance of a supercapacitor, against varying discharge times (FIG. 28E and FIG. 28F), gives an indication of its usability under varied load conditions. The conventional discharge time of a supercapacitor may lie in the range of 1-30 s. To maximize the energy density of a supercapacitor, it is desired that a supercapacitor can deliver sustained high performance for a longer discharge time. But, at higher discharge times, the cycle life of a supercapacitor is curtailed. This is due to the more rapid consumption of the active sites and a faster generation of decomposition side products that adversely affect its charge storage ability. Thus, the challenge is to obtain a high and sustained electrochemical performance for a longer discharge time. To this effect, the capacitance performance of the lignin/$NiCoWO_4$//graphene supercapacitor was evaluated corresponding to the discharge times of 7, 20, and 30 s. The constituent weight ratio (lignin:$NiCoWO_4$:PVDF) was 75:15:10 in each case. It was observed that the average SPC at 7 s (FIG. 28E and FIG. 28F) was the least, and for 30 s, it was the highest of the three. At the end of 1000 cycles, the SPC for 20 s (2.6 mF $cm^{-2}$) was twice that at 30 s (1.3 mF $cm^{-2}$). Also, the final retention followed the trend 30 s<20 s<7 s. However, the difference in the retention between the highest (7 s) and the lowest (30 s) was only about 11%. Thus, the bimetallic tungstate NP supercapacitor can perform appreciably well even at high discharge times. When the supercapacitor is made to discharge for a longer time, it engages more redox-active sites leading to a larger charge transfer accountable for a higher SPC (as at 30 s). However, a higher engagement of the redox-active sites, at longer discharge times, also leads to a faster depletion of newly available redox sites due to reaction products. Thus, at longer discharge times (as at 30 s), the supercapacitor has, gradually, a lower ability to store or transfer charge due to a lower availability of new redox-active sites for charge transfer. This leads to poor retention at higher cycles.

Figure 29A:
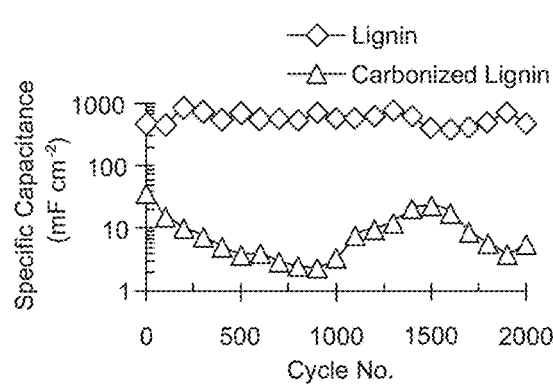
Figure 29B:
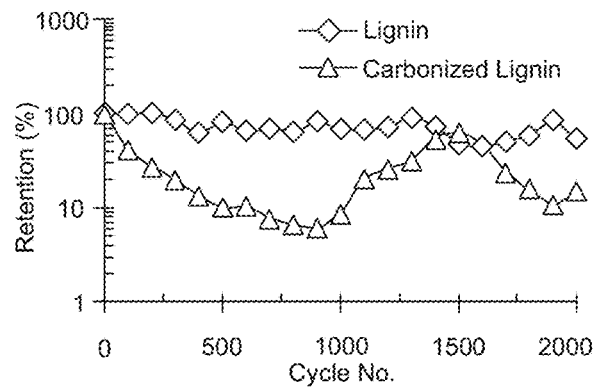
Figure 29C:
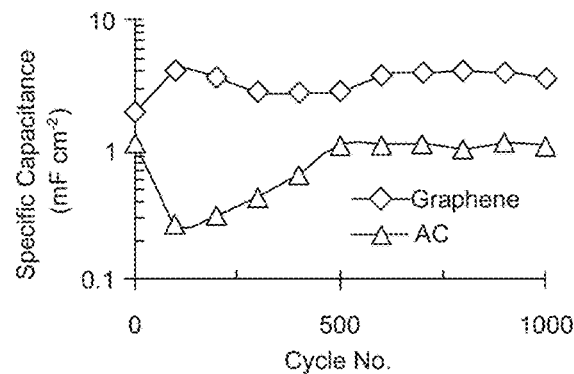
Figure 29D:
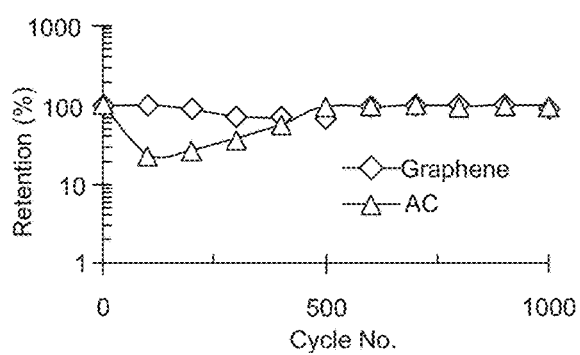
Figure 29E:
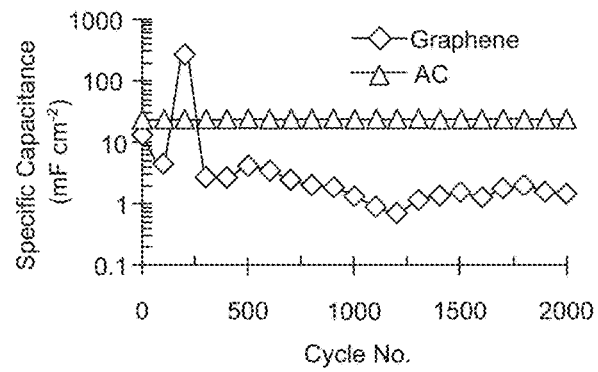
Figure 29F:
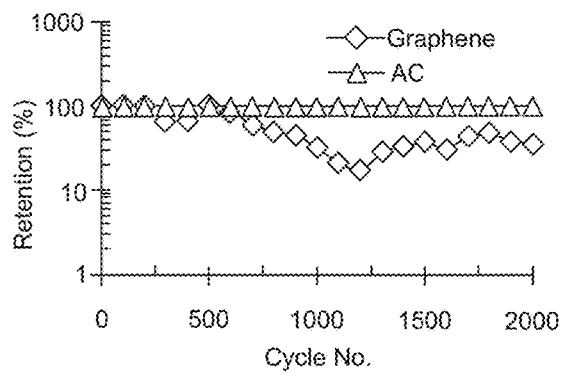

The 3D network of carbon chains in lignin molecules plays a role in impacting its capacitance property. It is intriguing to know how electrochemical performance is affected when these molecular chains are broken into smaller fragments. The carbonization of lignin breaks the long carbon chains in lignin into smaller fragments. It also induces some degree of oxidation. To understand the effect of smaller fragments of the lignin structure and partially oxidized lignin on its capacitance performance, the electrochemical performance of carbonized lignin/$NiCoWO_4$ was assessed using the graphene cathode. It is observed, in FIG. 29A, that the SPC of carbonized lignin/$NiCoWO_4$ (1st cycle SPC=38.09 mF $cm^{-2}$, 2000th cycle SPC=5.08 mF $cm^{-2}$) is consistently low compared to non-carbonized lignin/$NiCoWO_4$ (1st cycle SPC=474.68 mF $cm^{-2}$, 2000th cycle SPC=456.68 mF $cm^{-2}$). Thus, the initial and final values of SPC of the carbonized lignin/$NiCoWO_4$ are only 8% and 1.2% as compared to those of non-carbonized lignin/$NiCoWO_4$, respectively. The final retention of carbonized lignin/NiCoWO$_4$ as shown in FIG. 29B is 29% as compared to that of non-carbonized lignin. Thus, the electrochemical performance of carbonized lignin is inferior to that of non-carbonized lignin. This can be explained by the fact that with the fragmentation of larger lignin chains into smaller chains in carbonized lignin, there is a considerable increase in disorder in the chain structure and arrangement. This leads to greater impedance to charge transfer resulting in a lesser charge storage ability by the carbonized lignin. Also, carbonized lignin has a greater number of unreactive constituents that do not contribute to any capacitance. This results in a faster fading of capacitance.

The type of cathode material, its conductivity, and surface characteristics play a critical role in a supercapacitor design. The influence of the negative electrode on the electrochemical performance of the bimetallic tungstate supercapacitor was analyzed (FIG. 29C-FIG. 29F) and this revealed some interesting trends. Two sets of experiments were performed: in experiment set I (FIG. 29C and FIG. 29D), the lignin:NiCoWO$_4$:PVDF mass ratio was 75:15:10, while in experiment set II (FIG. 29E and FIG. 29F), it was 15:75:10. Thus, in experiment set I, the capacitance was electric double-layered capacitor (EDLC) type dominated (due to the higher proportion of lignin) and it was pseudocapacitance dominated in experiment set II (due to a higher proportion of NiCoWO$_4$). It was observed that in the EDLC dominated regime (experiment set I), the SPC of the supercapacitor, with graphene as the negative electrode (4.03 mF cm$^{-2}$), was 3.5 times that with AC as the negative electrode (1.14 mF cm$^{-2}$). This can be explained based on a higher value of the dielectric constant of graphene compared to that of AC which accounts for a higher SPC (capacitance, C=$\epsilon$A/d, where A=contact surface area, $\epsilon$=dielectric constant, and d=distance between electrodes) in an EDLC dominated regime. In contrast, in the pseudocapacitance dominated regime (experiment set II), there is a greater degree of charge transfer and storage due to the pseudocapacitance behavior of the NiCoWO$_4$ NPS, in addition to the EDLC behavior of lignin. The pseudocapacitance charge transfer heavily depends on the available contact surface area of the electrode-electrolyte at both electrodes of the supercapacitor. Since the AC electrode has a much higher available surface area (A) than the graphene electrode, there is 1.8 times higher charge transfer and storage in the case of the AC electrode (23.88 mF cm$^{-2}$) compared to the graphene electrode (13.13 mF cm$^{-2}$) in experiment set II. In this case, the higher pseudocapacitance charge transfer contribution in the AC electrode, due to its higher surface area, overpowers the effect of a greater dielectric constant of the graphene electrode. Thus, the electrochemical performance of the bimetallic tungstate supercapacitor was found to be heavily dependent not only on the choice of the negative electrode but also on the type of the dominant regime of charge storage i.e. the EDLC dominated or pseudocapacitance dominated regime.

To determine the optimal voltage window for the lignin/NiCoWO$_4$ supercapacitor (15:75:10), it was subjected to cyclic voltammetry (CV) as shown in FIG. 30A. The CV curves in the range 1-2 V and 1.5-2.5 V are more rectangular compared to the 1-2.5 V curve, thus, resembling a capacitor behavior more closely. A larger SPC (FIG. 30B) value of 6.5 mF cm$^{-2}$ (for 1-2 V) compared to 4.8 mF cm$^{-2}$ (for 1.5-2.5 V) suggests that 1-2 V is an optimal voltage range of operation. Accordingly, the supercapacitor was cycled at varying scan rates in the 1-2 V voltage range (FIG. 30C) to evaluate the capacitance response (FIG. 30D) under dynamic voltage conditions. SPC followed the order 25 4 50 4 75 4 100 mV s$^{-1}$ from the greatest (33.2 mF cm$^{-2}$) to the least (6.5 mF cm$^{-2}$). This is consistent with the fact that at lower scan rates, there are more instances of reversible charge transfer at the electrode-electrolyte interface that leads to a higher SPC. To account for the loss of capacitance at higher cycles, Electro Impedance Spectroscopy (EIS) was performed and Nyquist plots are obtained as shown in FIG. 30E for the 80:10:10 sample. The total impedance of the supercapacitor at the beginning (0th cycle) is about 50 Ohm while it is about 1.5 kilo-Ohms after 1500 cycles as seen by the intersection of the semicircle on the X-axis. A higher impedance to charge transfer at a higher cycle number accounts for diminishing charge storage ability. The slope of the V-t plot in FIG. 30F reveals that at a higher applied discharge current density, the decay of voltage is steeper which is a typical characteristic of a supercapacitor. The negative slope of the SPC vs. current density plot in FIG. 30G reveals that at a higher discharge current density, the SPC decreases. This too is a typical supercapacitor behavior. The Ragone plot (FIG. 30H) shows very high values of energy and power densities due to the synergistic effect of bimetallic tungstate NPs encapsulated in lignin.

Conclusions. In this Example, the role of the secondary metal (M$_2$) in the pseudocapacitance of bimetallic tungstate type compounds (M$_2$M$_1$WO$_4$, M$_2$=Ni, M$_1$=Co) was studied. It was discovered that the bimetallic tungstate (NiCoWO$_4$) functionalized lignin supercapacitor displayed a high SPC value of 862.26 mF cm$^{-2}$ that was 141 times higher than that of the monometallic tungstate CoWO$_4$ (6.1 mF cm$^{-2}$) functionalized lignin supercapacitor. The secondary metal M$_2$ in the bimetallic tungstate (M$_2$M$_1$WO$_4$, M$_2$=Ni, M$_1$=Co) significantly enhances the pseudocapacitance due to a higher available oxidation state leading to high electronic conduction. The lignin/NiCoWO$_4$ supercapacitor also shows a very high-power density of 854.76 kW kg$^1$ and a maximum energy density of 5.75 W h kg$^{-1}$ due to the synergistic effect of the bimetallic tungstate NP encapsulated in lignin. With a higher proportion of the bimetallic tungstate NP in the composite electrode, the capacitance retention increased. For an optimal mass ratio of lignin:NiCoWO$_4$:PVDF (15:75:10), the retention was 100% even after 2000 cycles. The study on supercapacitor discharge time showed a higher SPC at higher discharge times while higher retention at lower discharge times. Thus, the rate of consumption of electroactive sites of the pseudocapacitance nanomaterial (NiCoWO$_4$) was linear with discharge time. Carbonization breaks down the lignin molecular structure which creates a high impedance to charge transport and diminished electrochemical performance. The capacitive performance of the bimetallic tungstate supercapacitor was found to heavily depend on the choice of the negative electrode's dielectric permittivity and surface area, and on the type of the dominant regime of charge storage i.e. the EDLC dominated or pseudocapacitance dominated regime. Thus, this Example provides a new knowledge base for the effective use and design of bimetallic tungstate-based nano-bioelectronic devices which will promote green technology.

Example 5: Microwave Synthesis of MnO$_2$-Lignin Composite Electrodes for Supercapacitors The demand for energy storage devices made from biodegradable materials has increased significantly due to sustainability. Currently, such devices possess vital issues, such as high manufacturing costs and toxicity, low reliability, as well as poor electrochemical performance. In this Example, microwave synthesis was conducted to fabricate a low-cost, high-performing, plant-based electroactive material. $MnO_2$ microparticles fabricated via microwave irradiation were deposited on two plant-based materials as substrates made of Al/lignin and Al/AC/lignin. The quasi-solid-state supercapacitors were assembled using a polymeric gel electrolyte of PVA/H3PO4. Scanning electron microscopy was performed to examine the polydispersity, morphology, and porosity of the micro-$MnO_2$ deposited materials. FTIR and UV-vis spectroscopy were performed to study the composition and verify deposition of micro-$MnO_2$ on the lignin-based matrixes. Cyclic voltammetry (CV) was employed to study the polarization resistance of the system. The cyclic charge-discharge (CCD) and electrochemical impedance spectroscopy (EIS) were performed to observe cyclic performance and interfacial resistances. Electrochemical tests showed that after 700 cycles of charge-discharge, both the supercapacitors exhibited high capacitance retention above 90%. Compared to the existing technology, this method enables consistent material structurization with tunable properties due to the controlled heating time and exposure to radiation with minimal waste. This Example provides an alternative approach to synthesize low-cost and scalable green composite electrodes for flexible supercapacitors.

Introduction. The advancement in energy storage demands innovation for sustainability. The rapid technological development of consumer electronics with multiple applications has motivated research to develop high-performing, flexible, and eco-friendly energy storage devices. These electrochemical devices are categorized as supercapacitors, batteries, and fuel cells. Supercapacitors are high-power-density storage systems with the ability to rapidly charge-discharge in an extended lifecycle. Owing to this, supercapacitors have wide applications in industry, healthcare, and daily life. However, due to their low energy densities, their applications are restricted.

Many electronic devices manufactured today use hazardous materials that pose a risk to the environment. To avoid the detrimental impacts of spent energy storage systems, they must be processed and properly disposed of. The presence of toxic materials poses a major challenge in the disposal of these systems. With an increasing demand for mobile computing and portable electronics, eco-friendly and biodegradable energy storage devices are of vital importance. For this purpose, green materials such as carbon-based electroactive materials and biomaterials are being considered. These materials are cost-effective, have an adaptable morphology, and are biodegradable, making them excellent candidates. Lignin, an abundantly available biomaterial, is acquired as a waste product from the paper and pulping industries. The porous structure and defects present in lignin make it a favorable candidate for use as an electroactive material. In order to improve the performance of lignin, it has been doped with transition metal oxides, conduction polymers, and other carbonaceous materials. Lignin has been used as a precursor to developing hierarchical porous carbons as electrode materials. Transition metal oxides (TMOs) such as NiO, $RuO_2$, $Co_2O_3$, and $MnO_2$ have been incorporated into the matrix of lignin. This has proven to be a successful method to boost the capacitive performance of the supercapacitor. Owing to its synergistic behavior, ideal capacitive behavior, abundant availability, and low cost, $MnO_2$ is considered the most favorable candidate to improve the electrochemical performance of lignin.

Efficient charging/discharging requires electroactive materials with designated pores to increase the surface area. The reduced time of fabrication, enabling rapid nucleation and deep penetration, make microwave irradiation an attractive option to make electrode materials. Due to those characteristics, structural uniformity of metal oxides has been achieved. However, few studies have performed microwave irradiation for the synthesis of $MnO_2$ particles. In addition, most of these methods are coupled with the template method or with hydrothermal conditions. The specific effect of microwave irradiation cannot be examined clearly when coupled with hydrothermal conditions. This is because the reaction conditions of the additional hydrothermal method alter the kinetics of crystal growth. For instance, some researchers have used an ultrasound-microwave method for polymer P123 and acetylene black for a supercapacitor electrode. The distinct advantage of microwaves on electrode properties could not be deciphered. Similarly, others have used a potassium-based catalyst and microwave radiation to make electrodes using corn straw. This method creates a problem of catalyst poisoning and environmental disposal issues. Others have also used a potassium citrate-based synthesis method that utilized microwave radiation to obtain a hierarchical porous carbon electrode. Not only was the process expensive but also the chemicals used pose health hazards to humans. Moreover, the effect of microwaves on the pseudo-capacitance could not be established. There is no report about decorating lignin with $MnO_2$ microparticles. It is necessary to understand the surface morphology, composition, and electrochemical performance of the $MnO_2$ particles fabricated via microwave synthesis deposited on green materials.

In this Example, microwave irradiation was used to synthesize micro-$MnO_2$ particles, which were then deposited onto the lignin matrix via hydrothermal treatment. A solid-state asymmetric supercapacitor with an AC-Lig-$MnO_2$ composite electrode as an anode was fabricated. SEM was performed to study morphology, porosity, and polydispersity of the lignin-based matrix. Cyclic voltammetry (CV) was employed to study the polarization resistance of the system. The cyclic charge-discharge (CCD) and electrochemical impedance spectroscopy (EIS) were performed to observe cyclic performance and interfacial resistances. This Example provides new insights into the synthesis of low-cost and scalable plant-based flexible supercapacitors.

Microwave-Irradiated Green Composite Electrode Preparation. To fabricate the green composite AC/Lig-$MnO_2$ electrode, 1 g of AC (Sigma Aldrich MW=12.01 g $mol^{-1}$) was mixed with 0.5 g of alkali lignin (TCI) powder and DI water. This solution was then sonicated for 5 min. To prepare the $MnO_2$ particles, 22.2 mmol of 37% HCl (Sigma Aldrich, MW=36.46 g $mol^{-1}$, density=1.2 g $mL^{-1}$) was added to 5.5 mmol of $KMnO_4$ purchased from Sigma Aldrich (99%, MW=158.03 g $mol^{-1}$, density=2.7 g $mL^{-1}$). This solution was then placed in a 1000 W microwave for 4 min. The AC/Lignin solution was then mixed with the microwaved $KMnO_4$ solution and stirred magnetically for 15 min. After hydrothermal treatment at 160° C. for 1 h, the solution was centrifuged, washed with ethanol and DI water, and dried overnight. The final powder obtained was mixed with NMP (Sigma Aldrich, MW=99.13 g $mol^{-1}$, density=1.028 g $mL^{-1}$, 99%) and PVDF (Sigma Aldrich, MW=275,000 by GPC) to form a slurry, which was then coated on an Al foil (thickness=0.98 mm) and dried in a vacuum furnace at 100° C. for 4 h. The substrate was cut in a circular plate with a diameter of 4 cm. The supercapacitor's interface thickness was 100 μm. The green composite Lig-$MnO_2$ electrode was fabricated in a similar manner. The schematic for the preparation method is shown in FIG. 31.

Preparation of PVA/H$_3$PO$_4$ Gel Electrolyte. The gel electrolyte was prepared in a similar method as previously described.

Materials' Characterization. The scanning electron microscopy was performed using a VEGA/TESCAN SEM, using an SE detector at scanning voltage of 5 KV and magnification of 300×. The elemental composition analysis was performed using an Oxford EDS detector on FEI Quanta 600 SEM, and results were investigated using AZtec software offered by Oxford Instruments. EDS mapping was performed at 20 kV acceleration voltage. For XRD, a Bruker D8 Advanced Powder Diffractometer was deployed. FTIR was performed using a Shimadzu FTIR Spectrophotometer IR Affinity-1, while UV spectroscopy was performed using a Shimadzu UV-2450 Spectrophotometer.

Scanning Electron Microscope (SEM). SEM analysis was performed to gauge the electrode surface and particle distribution. Uniform distribution of electroactive AC/Lig-MnO$_2$ and Lig-MnO$_2$ on the electrode surface was observed. Micron-size MnO$_2$ particles can be seen embedded in the AC/lignin and lignin matrices. The electrode surfaces appear intact without any sign of wear or damage. This is assists in good contact with the electrolyte and ensuring smooth charge transfer. The supercapacitor interface was observed. The quasi-solid gel electrolyte can be seen placed between the outer Al electrodes. The interface appears mechanically stable and intact. The interface thickness is about 0.1 mm. A stable interface helps with the consistent performance of the supercapacitor.

FTIR Spectroscopy. The FTIR spectra are shown for both the composite electrodes in FIG. 32. Peaks 1 and 2 at 526 and 536 cm$^{-1}$ represent the Mn—O bond stretch. This demonstrates the successful deposition of micro-MnO$_2$ particles on the lignin and AC/lignin matrices. Peak 3 at 1031.79 and peak 4 at 1257.36 correspond with O—H bending vibrations bonded with Mn atoms. The peaks at 1614.15 (on the Lig-MnO$_2$ line) and 1720.19 (on the AC/Lig-MnO line) correspond to the C═C bond stretch, indicating the presence of aromatic rings. The presence of OH bonds indicates absorbed molecules of water in the MnO$_2$ structure. These water molecules enhance the diffusion of ions and improve the overall capacitance performance of the materials.

UV-Vis Spectroscopy. The UV-Vis spectroscopy is shown for both the composite electrodes in FIG. 33. A characteristic broad peak of absorption can be seen in the range 300-350 nm. This confirms the successful deposition of the micro-MnO$_2$ particles onto the lignin and AC/lignin matrices.

Powder X-ray Diffraction. The XRD plot in FIG. 34A for AC-lignin-MnO$_2$ shows a broad diffraction peak (002) in the range 2θ=15-30°, which indicates that the amorphous AC particles dominate in the structure. Lignin-MnO$_2$ (FIG. 34B) showed a broad peak in the range 2θ=20-25°, indicating its highly amorphous nature. However, another set of peaks is indicative of the MnO$_2$, which particularly fits the γ-MnO$_2$ XRD pattern by matching of the main peak between 30° and 35°. The same peak is also observed in the powder X-ray diffraction (PXRD) pattern of AC with a lower intensity. Combining all proof, it is safe to say that both AC-lignin and non-AC-lignin maintain the crystallinity of MnO$_2$, while the latter does so to a higher degree.

Energy Dispersive X-ray Spectroscopy. EDS mapping indicates an elemental composition for Sample 1 (Lig/MnO$_2$) and sample 2 (AC/Lig/MnO$_2$) of C/O/Mn/S=66:27.4:5.5:1.1 (wt. %) and C/O/Mn/S=36.8:30.7:28.8:3.8 (wt. %), respectively. Element mappings reveal that C, O, Mn, and S atoms are uniformly distributed throughout the entire structure.

Figure 35A:
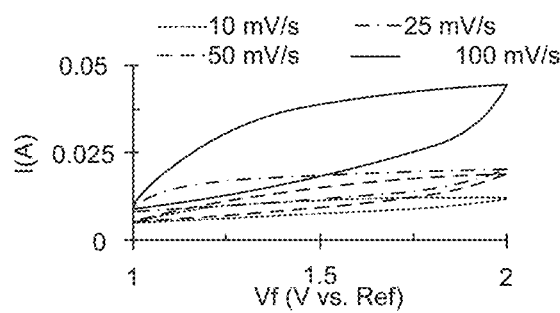
Figure 35B:
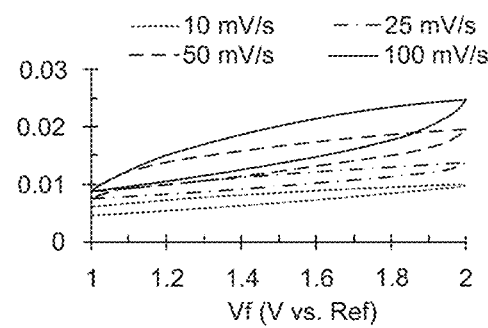
Figure 35C:
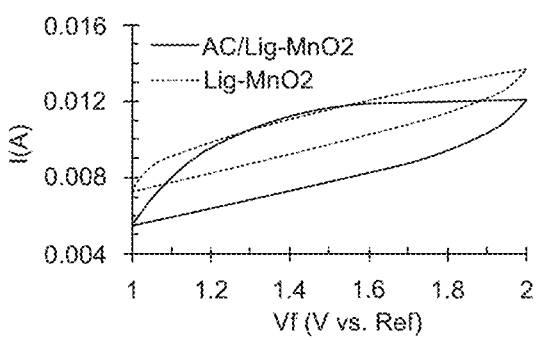
Figure 35D:
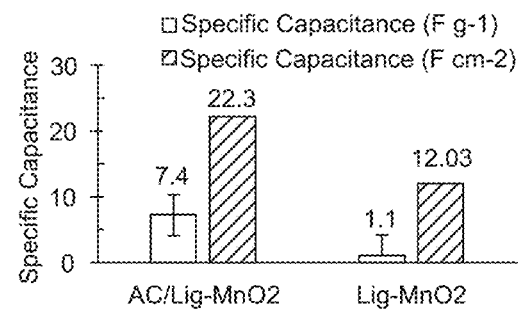

Electrochemical Analysis. Electrochemical testing is performed to compare and analyze the stability and cycling life of the microwave synthesis-based green composite electrodes. Cyclic voltammetry (CV), cyclic charge-discharge (CCD), and impedance tests were run to explore their potential for supercapacitor applications. CV responses of the AC/Lig-MnO$_2$ and Lig-MnO$_2$ samples performed at multiple scan rates are shown in FIG. 35A and FIG. 35B. A polymer-gel electrolyte of PVA/H$_3$PO$_4$ is used. The operating potential range for both samples is 1.0-2.0 V. The different scan rates implemented are 10, 25, 50, and 100 mV s$^{-1}$. The rate of diffusion was observed to increase for larger scan rates, and the specific capacitance decreased. This can be attributed to diffusion limitations leading to an ineffective interaction between the electro-active material and the electrolyte. Hence, the scan rate of 10 mV s$^{-1}$ was selected for further CV testing. The CV plots at 10 mV s$^{-1}$ for AC/Lig-MnO$_2$ and Lig-MnO$_2$ can be seen in FIG. 35C. FIG. 35D displays a comparative histogram of the obtained specific capacitance for both materials. The highest specific capacitance obtained for AC/Lig-MnO$_2$ is 7.4 F g$^{-1}$ (22 mF cm$^{-2}$), and for Lig-MnO$_2$ is 1.1 F g$^{-1}$ (12.03 mF cm$^{-2}$). Initially, during the CV tests, the AC/Lig-MnO$_2$ supercapacitor displays a higher specific capacitance as compared to Lig-MnO$_2$. This can be attributed to the higher surface area as well as the high porosity of AC.

The cycling life and stability of the system are requirements for a supercapacitor. To study the pseudo-capacitance behavior further, cyclic charge-discharge (CCD) tests were carried out for 750 cycles at 0.26 A g$^{-1}$ current density. FIG. 36A compares the specific capacitance performance of both materials. The initial specific capacitance for Lig-MnO$_2$ is 16.22 mF cm$^{-2}$, and for AC/Lig-MnO$_2$ is 14.03 mF cm$^{-2}$. After 750 cycles, the final specific capacitance of the Lig-MnO$_2$ supercapacitor is 16.18 mF cm$^{-2}$, and of the AC/Lig-MnO$_2$ supercapacitor is 12.64 mF cm$^{-2}$. Lig-MnO$_2$ displays a better specific capacitance performance in comparison to AC/Lig-MnO$_2$. This is due to the presence of a higher number of functional groups in lignin. While AC has a very high surface area and porosity, it does not have as many functional groups present. Therefore, lignin has a comparatively higher pseudo-capacitance than AC. FIG. 36B displays the capacitance retention for both supercapacitors. Lig-MnO$_2$ exhibits a high retention performance of ~99.7%, while AC/Lig-MnO$_2$ has a retention of ~90%. The lower number of functional groups in AC causes a comparatively quick degradation of the material as compared to lignin. Due to this, AC will degrade quicker than lignin, leading to lower retention. The impact of current density on the discharge voltage and the subsequent variation in specific capacitance can be seen in FIG. 36C. As the current density increases from 0.03 to 0.26 mA g$^{-1}$, the specific capacitance for both supercapacitors decrease. This depicts the general characteristics of a supercapacitor. FIG. 36D shows a Ragone plot obtained from the CCD experiment. The Ragone plot depicts the relationship between the energy and power densities at different current densities. The shape of the curve corresponds to those reported in the literature for MnO$_2$ supercapacitors.

Figure 36H:
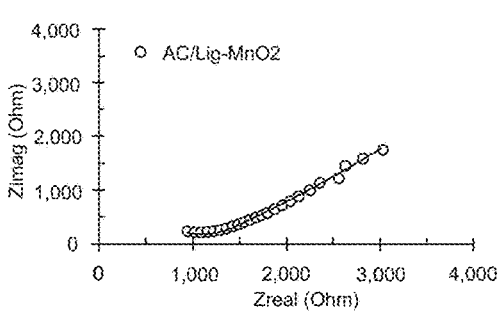
Figure 36I:
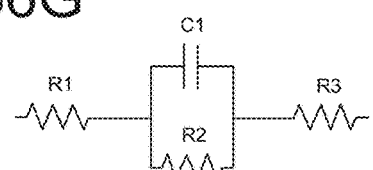

The electrical double-layer impedance behavior of the supercapacitor was studied via the electrochemical impedance spectroscopy (EIS) test. A frequency range of 0.1-106 Hz, AC Volts=10 mV, and DC Volts=1 V was applied. Nyquist plots were obtained at the 0th and the 750th cycle for both supercapacitors, as shown in FIG. 36E and FIG. 36F. In FIG. 36E, the initial and final impedance were almost the same. For the Lig-MnO$_2$ supercapacitor, a very small increase in impedance was observed even after 750 cycles. This is in line with the retention performance of the system. The initial impedance was 5945 ohms, and the final impedance was 6493 ohms. The impedance performance of AC/Lig-MnO$_2$ is shown in FIG. 36F. Here, an increase in the impedance can be observed. The initial impedance was 310.8 ohms, and the final impedance was 1089 ohms. As the impedance of the system increases, subsequently, the current flow decreases, leading to lower capacity retention. FIG. 36G shows EIS fitted curve at 500 cycles for Lig-MnO$_2$ supercapacitor, and FIG. 36H shows EIS fitted curve at 500 cycles for AC/Lig-MnO$_2$ supercapacitor. An equivalent circuit is presented in FIG. 36I. The electrolyte resistance (R1), double-layer capacitance (C1), resistance (R2, in parallel with C1), and the electrode diffusion resistance (R3) are shown.

Conclusions. In this Example, two types of green composite electrodes were successfully synthesized via microwave synthesis. MnO$_2$ microparticles were synthesized via microwave irradiation. Due to the high penetration depth and rate of nucleation of microwave irradiation, uniform surface morphology and particle distribution of microMnO$_2$ particles on the lignin and AC/lignin matrices were successfully achieved. The electrochemical evaluation showed the high capacitive performance of lignin-based materials deposited with the microwave-synthesized microMnO$_2$ particles, as compared to that of pure lignin materials. Among the two materials, Lig-MnO$_2$ exhibited better performance, with a specific capacitance of 16.22 mF cm$^{-2}$ and a ~99.7% capacitance retention. Both materials exhibited capacitance retention of ~90% or higher. In comparison to the reported literature, these materials performed with higher stability and exhibited consistent material structurization with tunable properties. As a result, the high-performing, quasi-solid-state supercapacitors with reduced synthesis time have been successfully fabricated from biomaterials. This Example provided a simple and low-cost approach in synthesizing green composite electrodes for supercapacitor applications via microwave irradiation.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A supercapacitor comprising:
   an anode comprising a first substrate comprising Al (aluminum)/AC (activated carbon)/ lignin-MnO$_2$;
   a cathode comprising a second substrate comprising Al/AC; and
   an electrolyte coated separator sandwiched between the anode and the cathode.

2. The supercapacitor of claim 1, wherein the anode comprises an alkali lignin.

3. The supercapacitor of claim 1, wherein the electrolyte coated separator comprises an electrolyte gel.

4. The supercapacitor of claim 3, wherein the electrolyte gel comprises poly(vinyl alcohol) (PVA) and H$_3$PO$_4$.

5. The supercapacitor of claim 1, wherein the supercapacitor is at least one of flexible, asymmetrical, or coaxial.

6. An electrode comprising:
   a particle-decorated lignin,
   wherein the particle-decorated lignin comprises particles selected from the group consisting of NiWO$_4$, NiCoWO$_4$, CoWO$_4$, and combinations thereof.

7. The electrode of claim 6, wherein the lignin is an alkali lignin.

8. The electrode of claim 6, wherein the electrode is selected from the group consisting of Al/lig-NiWO$_4$, lig/NiCoWO$_4$, lig/CoWO$_4$, and combinations thereof.

9. The electrode of claim 6, further comprising a substrate.

10. The electrode of claim 9, wherein the particle-decorated lignin is coated on the substrate.

11. The electrode of claim 6, wherein the electrode is at least one of flexible, asymmetrical, or coaxial.

12. A method of creating a supercapacitor, the method comprising:
    forming an anode comprising a first substrate comprising Al (aluminum)/AC (activated carbon)/lignin-MnO$_2$;
    forming a cathode comprising a second substrate comprising Al/AC; and
    sandwiching an electrolyte coated separator between the anode and the cathode.

13. The method of claim 12, wherein the electrolyte coated separator comprises an electrolyte gel comprising poly(vinyl alcohol) (PVA) and H$_3$PO$_4$.

14. The method of claim 12, wherein the forming an anode and the forming a cathode comprises microwave irradiation.

* * * * *